(12) United States Patent
So

(10) Patent No.: US 11,473,959 B2
(45) Date of Patent: Oct. 18, 2022

(54) INUNDATION DETECTION DEVICE, INUNDATION DETECTION SYSTEM, AND INUNDATION DETECTION METHOD

(71) Applicant: KOYO Musen Corporation, Fukuoka (JP)

(72) Inventor: Satoshi So, Fukuoka (JP)

(73) Assignee: KOYO MUSEN CORPORATION, Fukuoka (JP)

( * ) Notice: Subject to any disclaimer, the term of this patent is extended or adjusted under 35 U.S.C. 154(b) by 0 days.

(21) Appl. No.: 17/433,125

(22) PCT Filed: Apr. 20, 2020

(86) PCT No.: PCT/JP2020/017092
§ 371 (c)(1),
(2) Date: Aug. 23, 2021

(87) PCT Pub. No.: WO2020/218258
PCT Pub. Date: Oct. 29, 2020

(65) Prior Publication Data
US 2022/0042838 A1   Feb. 10, 2022

(30) Foreign Application Priority Data

Apr. 24, 2019 (JP) .............................. JP2019-082791
Jun. 21, 2019 (JP) .............................. JP2019-115927

(51) Int. Cl.
*G01F 23/28* (2006.01)
*G01F 23/284* (2006.01)
*G08B 21/10* (2006.01)

(52) U.S. Cl.
CPC ........ *G01F 23/282* (2013.01); *G01F 23/2845* (2013.01); *G08B 21/10* (2013.01)

(58) Field of Classification Search
CPC .... G01F 23/282; G01F 23/2845; G08B 21/10
See application file for complete search history.

(56) References Cited

U.S. PATENT DOCUMENTS 6,586,760 B1    7/2003  Ross
7,458,260 B2 *  12/2008 Roesner ............. G01F 23/2845
                                                 73/290 V
(Continued)

FOREIGN PATENT DOCUMENTS

DE   102007027171 A1 *  1/2009 ......... G01F 23/2845
JP       2000-298055 A   10/2000
(Continued)

OTHER PUBLICATIONS

International Search Report for International Application No. PCT/JP2020/017092 dated Jun. 16, 2020 (3 sheets, 2 sheets translation, 5 sheets total).

*Primary Examiner* — John Fitzgerald
(74) *Attorney, Agent, or Firm* — Kratz, Quintos & Hanson, LLP

(57) ABSTRACT

To provide a flood detection technique with which a breakdown is less likely to occur over a long period, maintenance costs are low, and the occurrence of an abnormal water level is less likely to be erroneously determined. An inundation detection device detects a received signal strength that is the strength of a received response signal received from an RF sensor installed at a flood detection location, detects a dispersion within a specific time, detects a normal reception rate, and outputs a flood detection signal in a case where the dispersion is greater than or equal to a specific threshold and the normal reception rate is less than or equal to a specific threshold.

12 Claims, 47 Drawing Sheets

(56) References Cited

U.S. PATENT DOCUMENTS

| | | | | |
|---|---|---|---|---|
| 7,808,426 B1 * | 10/2010 | Smith, Jr. | ............ | G01S 13/003 |
| | | | | 342/123 |
| 7,830,302 B1 * | 11/2010 | Smith, Jr. | ................. | G01S 7/41 |
| | | | | 342/26 B |
| 8,854,227 B2 * | 10/2014 | Chishima | ............... | G01G 17/04 |
| | | | | 455/523 |
| 9,752,917 B2 * | 9/2017 | Weber | ................. | G01F 23/2845 |
| 2014/0210670 A1 * | 7/2014 | Weber | .................... | G01V 8/005 |
| | | | | 342/385 |

FOREIGN PATENT DOCUMENTS

| | | | |
|---|---|---|---|
| JP | 2010-156672 | A | 7/2010 |
| JP | 2010-170190 | A | 8/2010 |
| JP | 2013-109558 | A | 6/2013 |
| JP | 2015-129709 | A | 7/2015 |
| JP | 2016-065824 | A | 4/2016 |
| JP | 2017-227485 | A | 12/2017 |
| WO | WO-2021229789 | A1 * | 11/2021 |

\* cited by examiner

Fig. 1
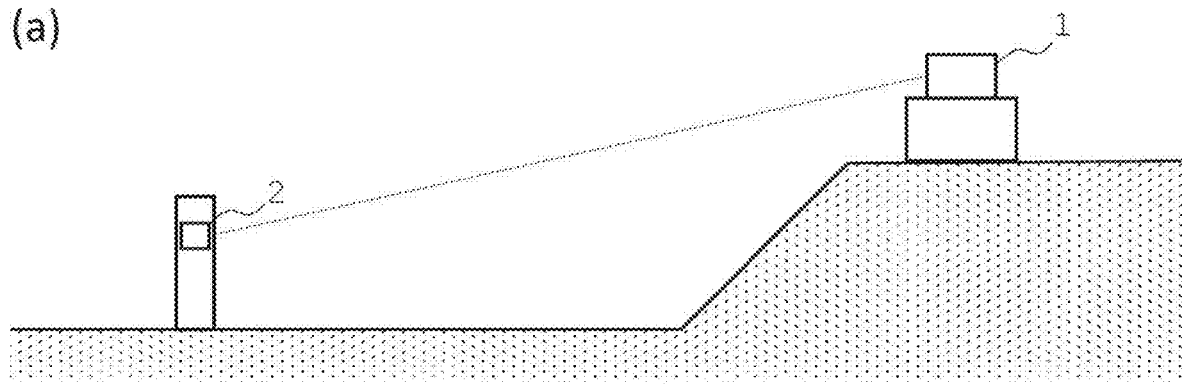
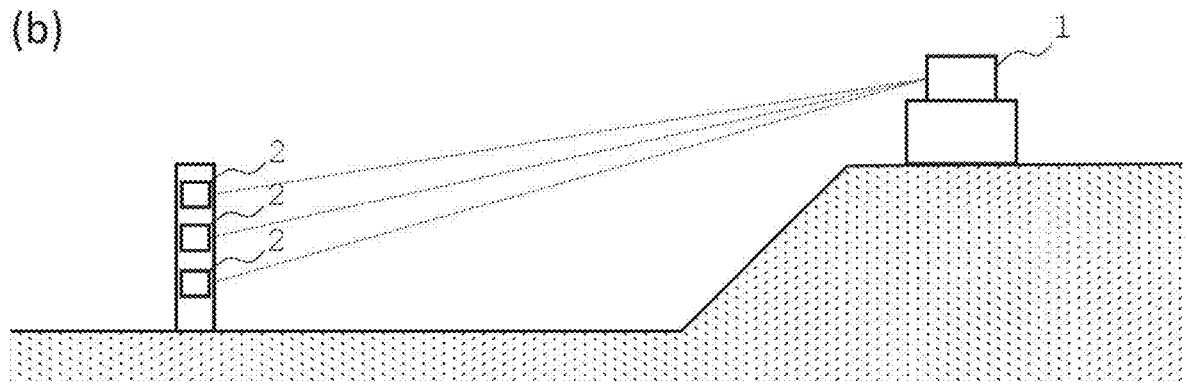
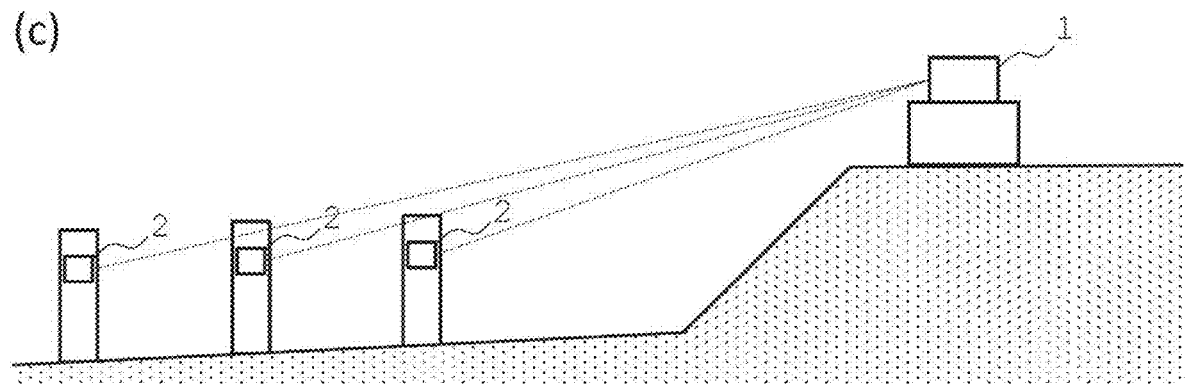

Fig. 8
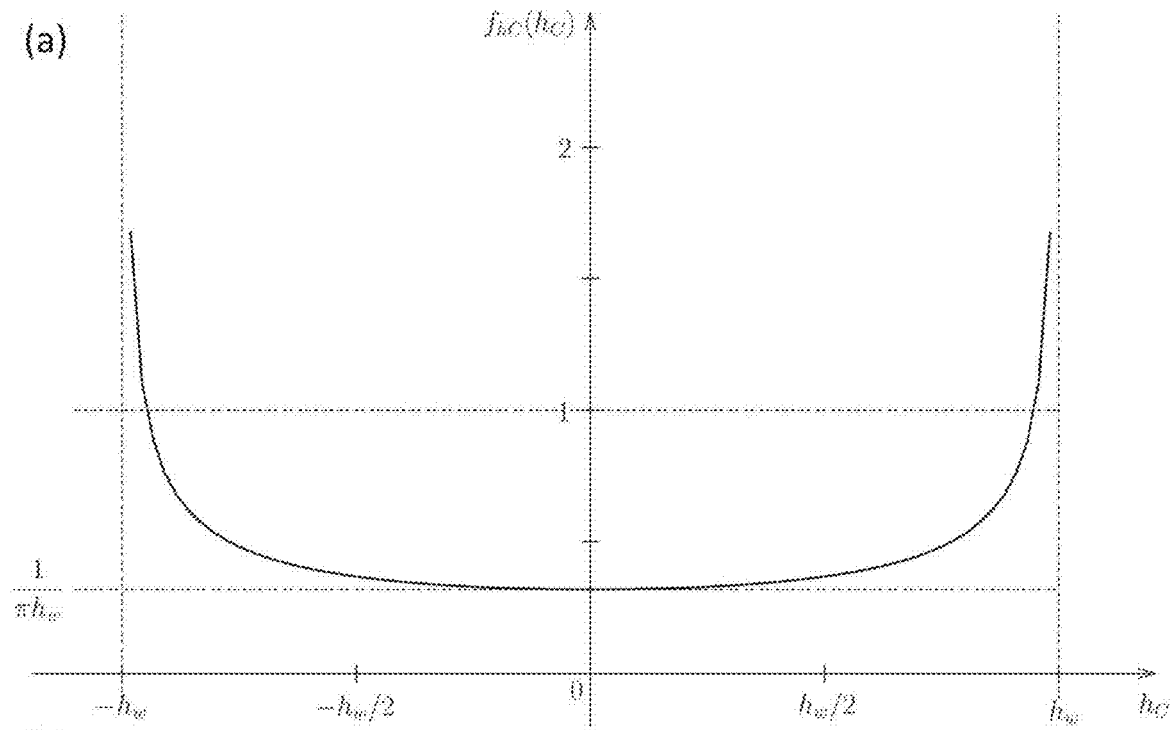
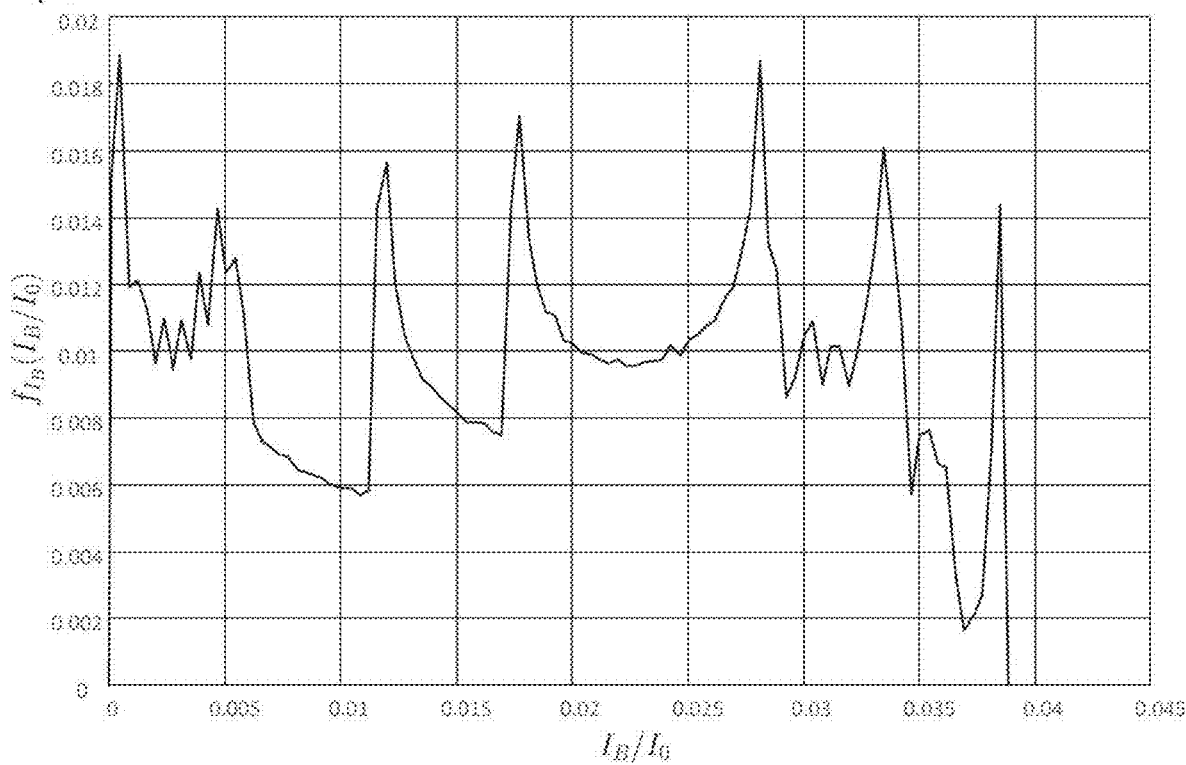

(a) $h_A - y_{w0} = 4.0$ [m]  (b) $h_A - y_{w0} = 3.0$ [m]

(c) $h_A - y_{w0} = 2.0$ [m]  (d) $h_A - y_{w0} = 1.0$ [m]

(e) $h_A - y_{w0} = 0.5$ [m]  (f) $h_A - y_{w0} = 0.2$ [m]

Fig. 15
(a) *P*-POLARIZATION
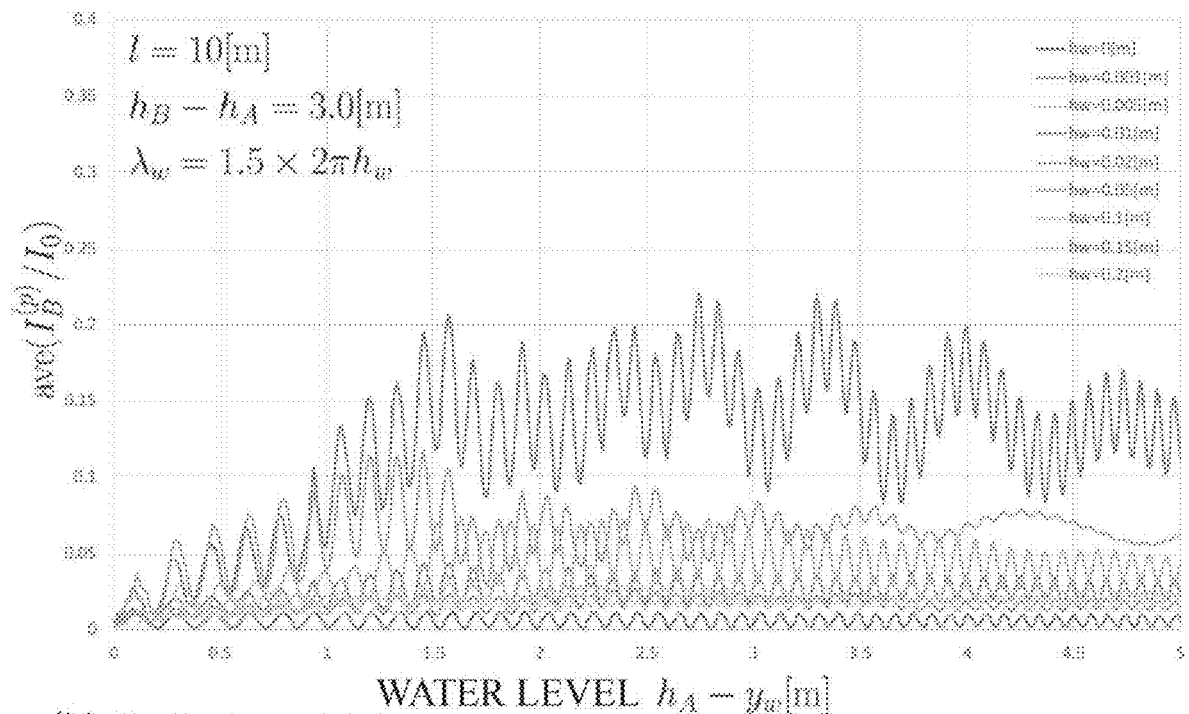
(b) *S*-POLARIZATION
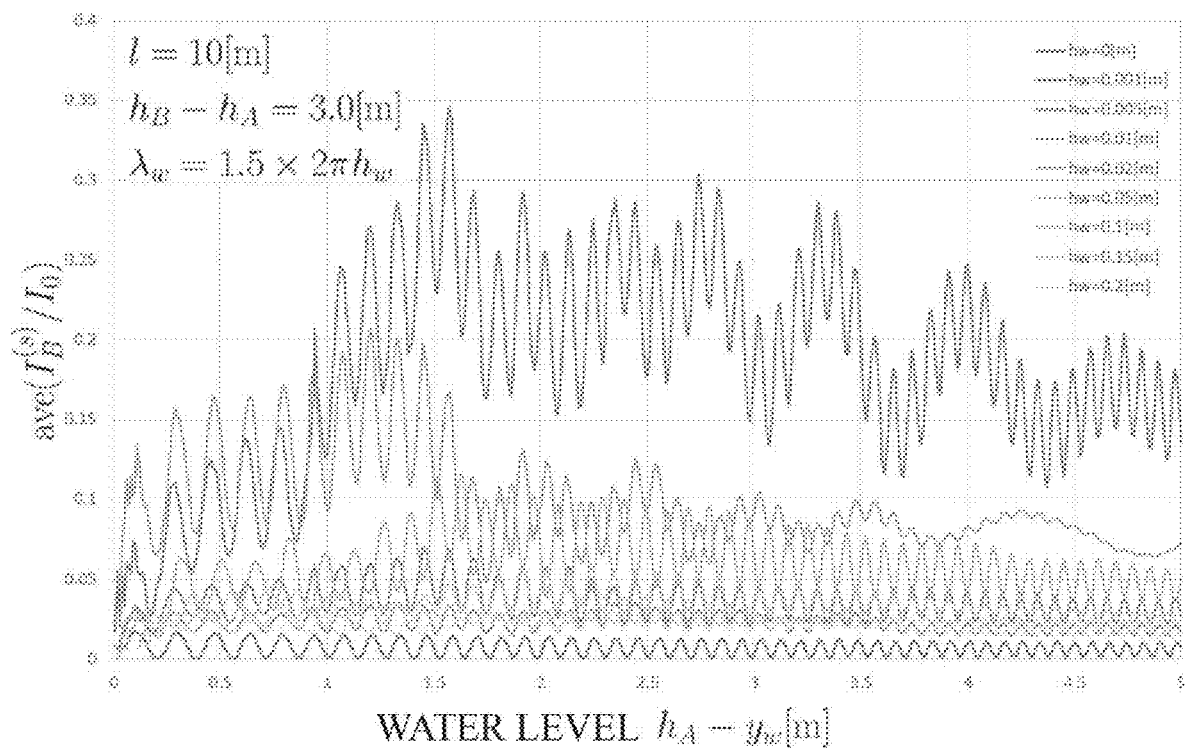

Fig. 16
(a) *P*-POLARIZATION
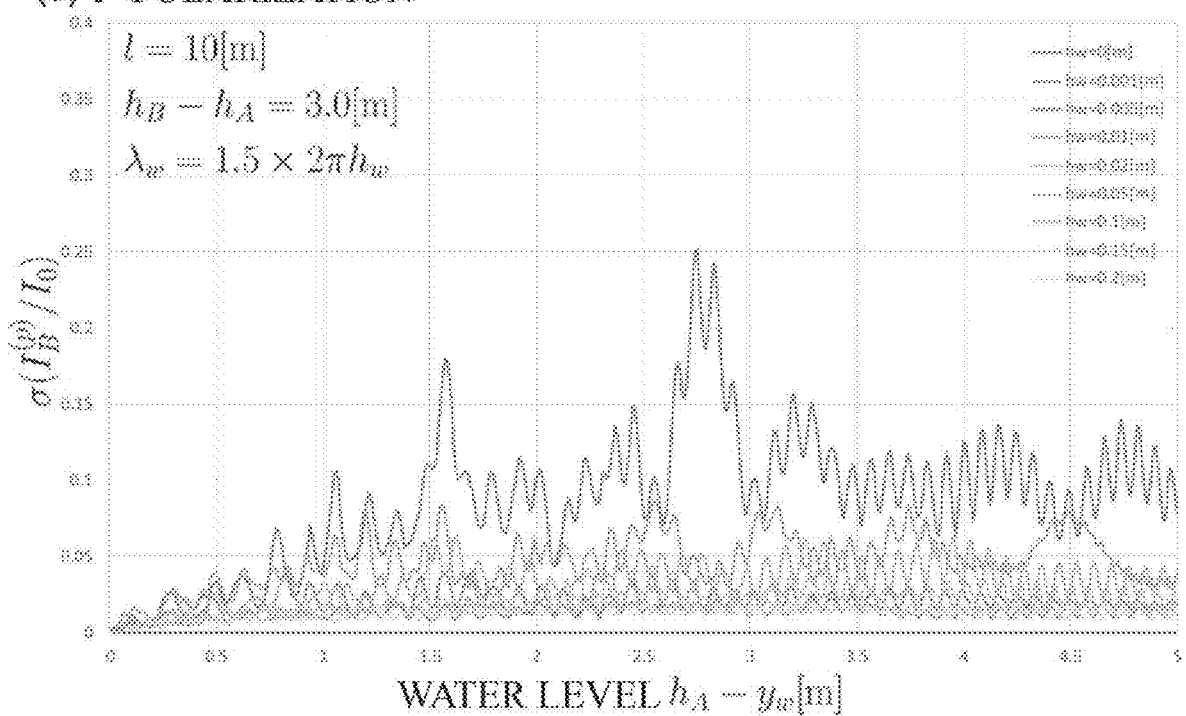
(b) *S*-POLARIZATION
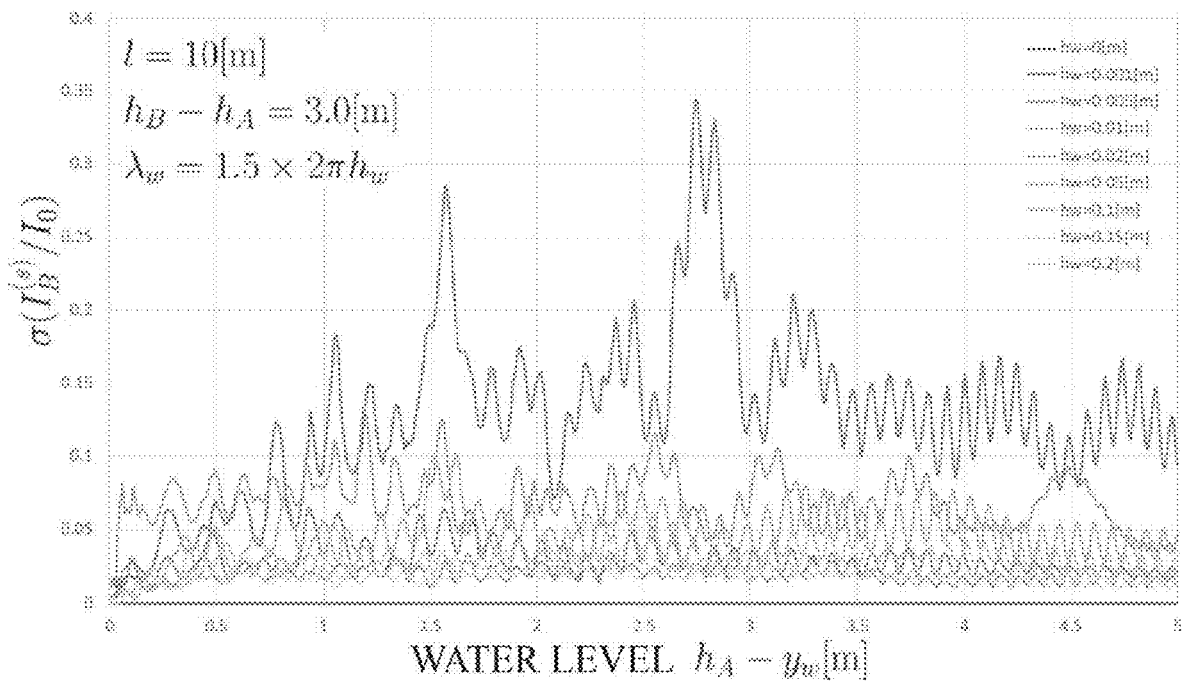

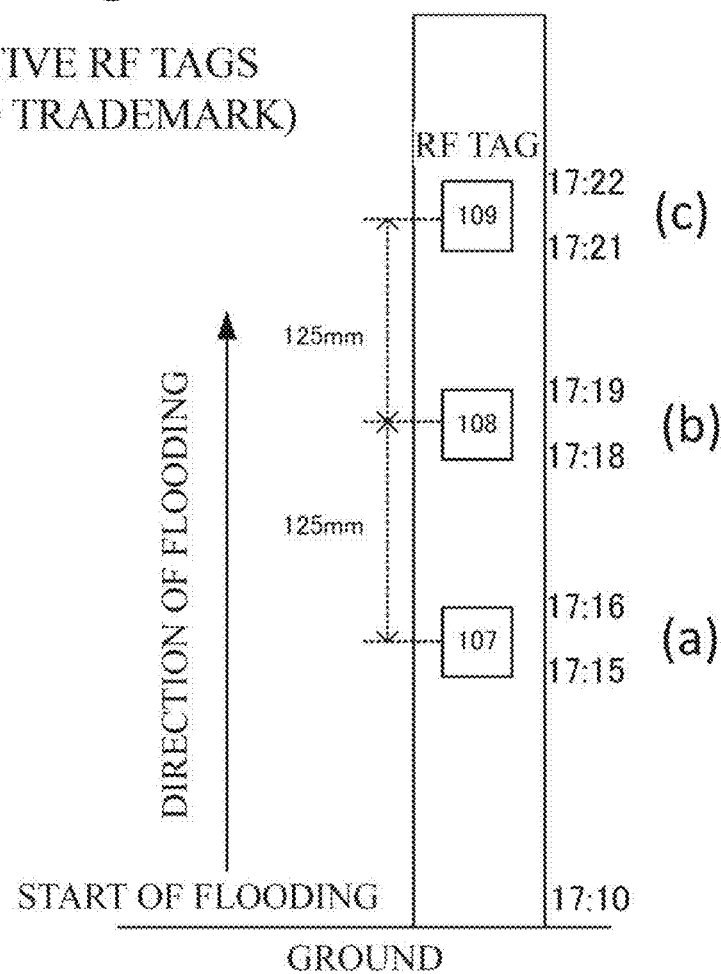

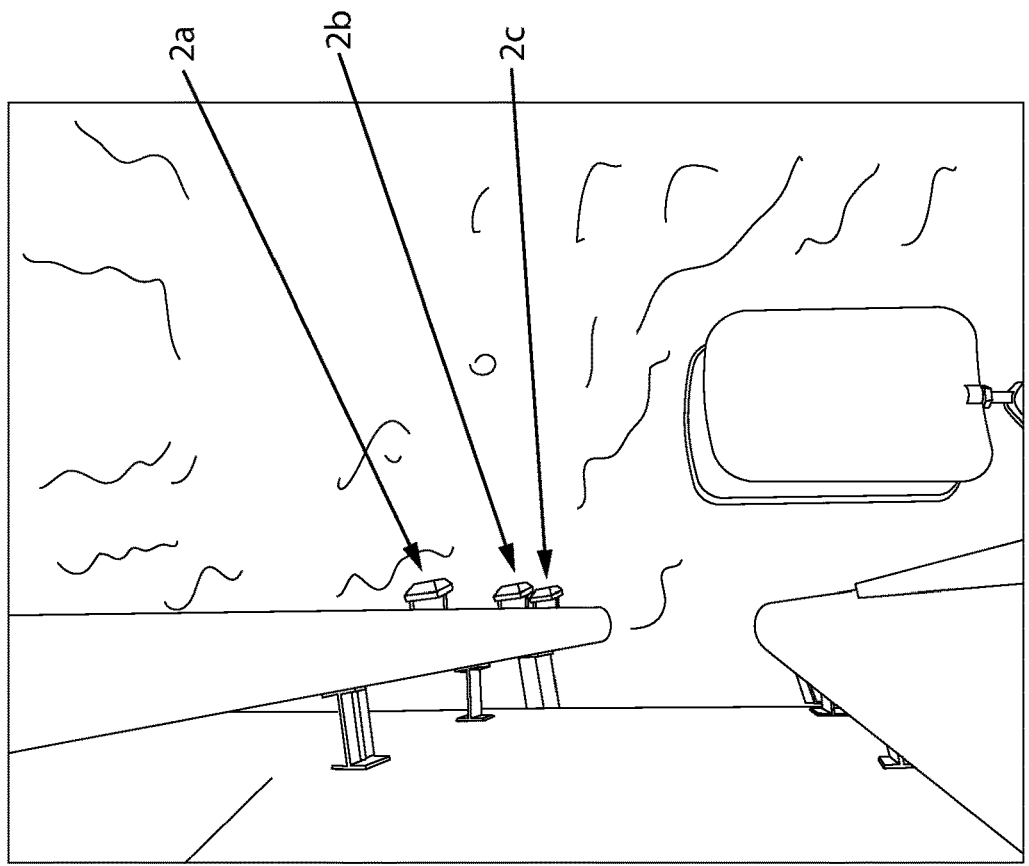
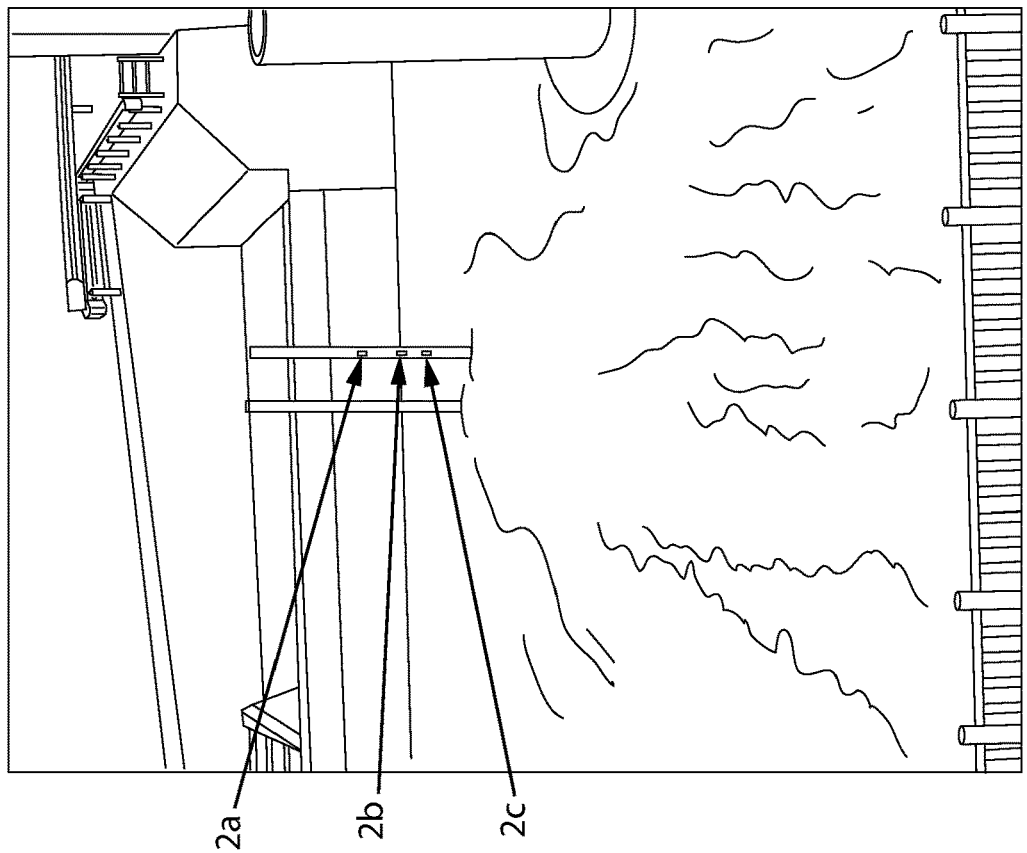

Fig. 42
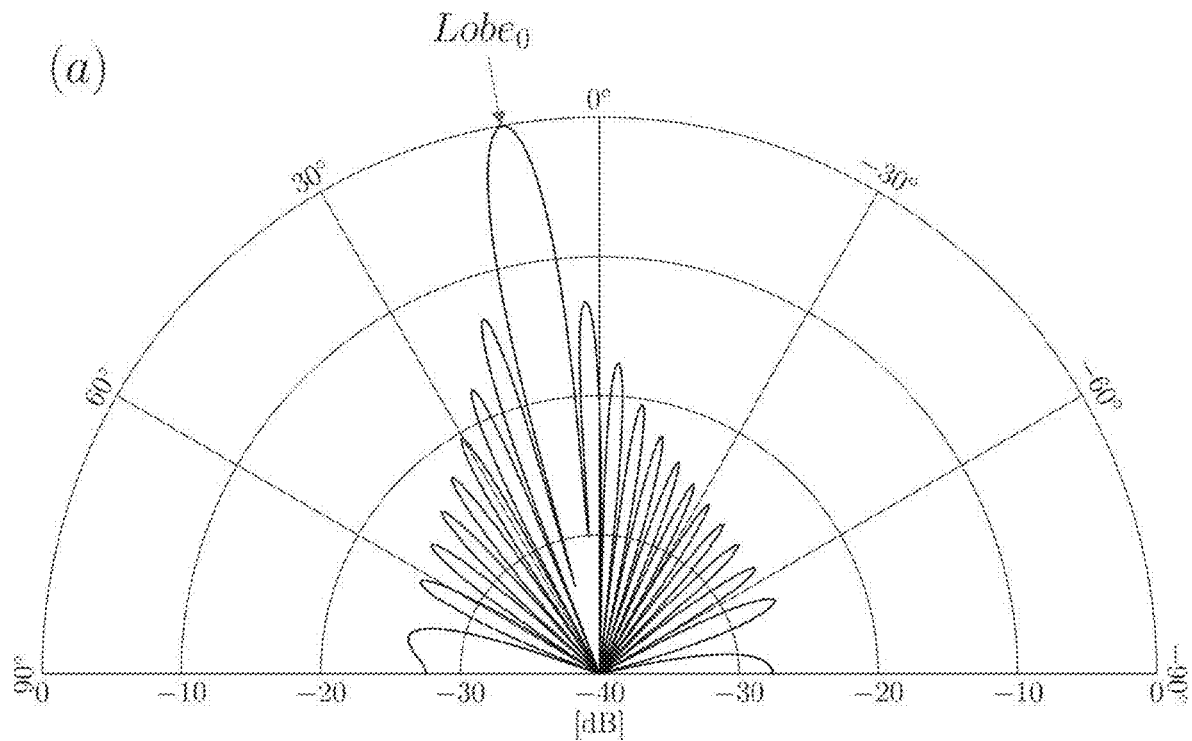
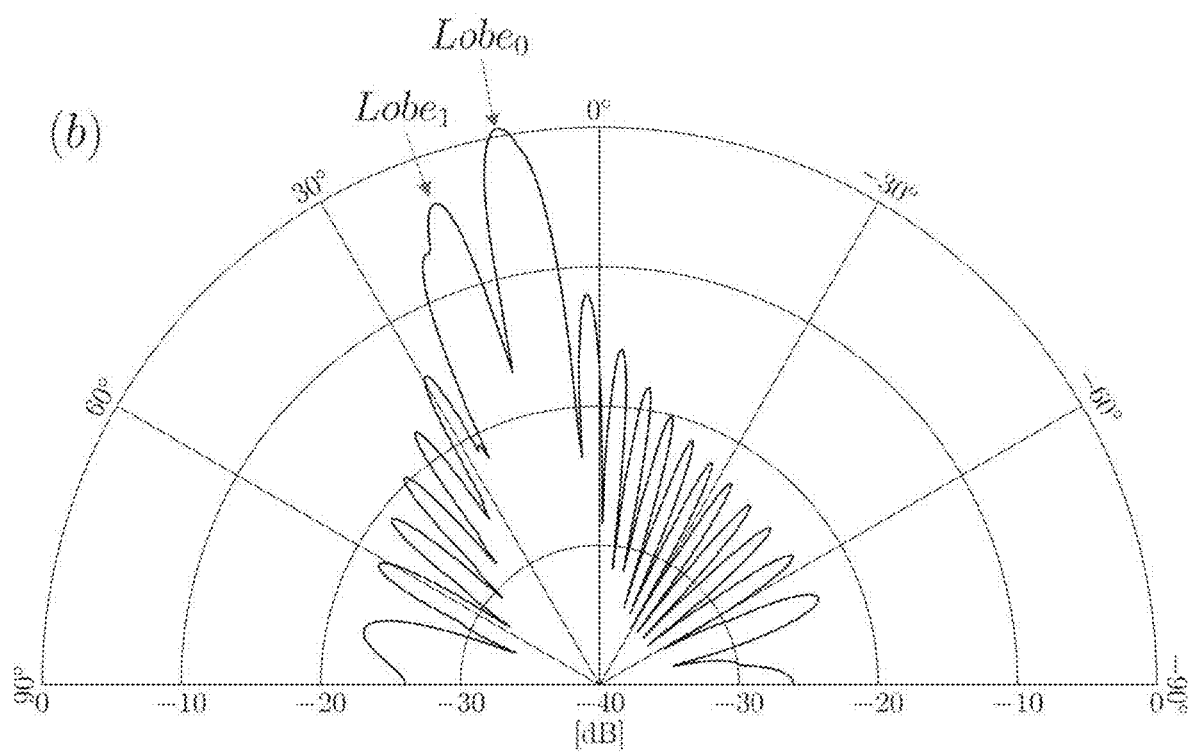

INUNDATION DETECTION DEVICE, INUNDATION DETECTION SYSTEM, AND INUNDATION DETECTION METHOD

TECHNICAL FIELD

The present invention relates to a flood detection technique for detecting the occurrence of flooding such as, swollen or flooded rivers or lakes, storm surges, or flooded roads.

BACKGROUND ART

As the above-described technique, techniques described in PTL 1 to PTL 3 are publicly known.

PTL 1 describes an abnormal water level warning device for warning a vehicle crossing a bridge over, for example, a river or a lake of an abnormal water level, the abnormal water level warning device including an interrogator that is capable of transmitting a microwave interrogation signal and receiving a microwave response signal, a transponder that is installed at the position of a water surface to be detected and returns the microwave response signal in response to reception of the interrogation signal from the interrogator, and a determiner that determines a water level on the basis of whether the interrogator receives the response signal (Claim 1 in PTL 1). This abnormal water level warning device is a water level detection device that transmits and receives data using a microwave while taking advantage of a property that microwaves are absorbed by water ([0011] in PTL 1). The interrogator and the transponder are each operated on an internal battery and installed in the vicinity of the water surface that is to be detected. The transponder is installed at a position at which the transponder is not flooded at normal times but is flooded due to a swell (See FIG. 8 and FIG. 9 in PTL 1). In a state where the transponder is not submerged, an interrogation signal transmitted by the interrogator is received by the transponder, and the transponder returns a response signal corresponding to stored data. Therefore, the interrogator can receive the response signal, and the determiner determines that the water level is not abnormal. When the water surface rises due to a swell and the transponder is submerged, an interrogation signal transmitted by the interrogator using a microwave is absorbed by water and is not received by the transponder any more, and a response signal is not returned to the interrogator. Accordingly, the determiner can determine that the water level is abnormal ([0022] to [0025] in PTL 1).

A flood occurrence warning system described in PTL 2 is a system in which flood occurrence warning devices are installed at the foundations, the gates, the stone walls, or the concrete block walls of houses (paragraph [0022] in the specification and FIG. 1 in PTL 2) at locations corresponding to land altitude levels from a river (paragraph [0037] in the specification and FIG. 4 in PTL 2), and each of the flood occurrence warning devices detects a water level, issues a warning with a warning buzzer or a warning lamp (paragraph [0034] in the specification in PTL 2), and transmits a flood warning to a warning management center via a transmission means in the device (paragraph [0038] in the specification in PTL 2). Here, each of the flood occurrence warning devices is provided with a main circuit unit including a float switch that detects water and a sub-circuit unit including a warning means (the warning buzzer or the warning lamp) that issues a warning. In the main circuit unit, an actuating relay is disposed so as to be electrically connected in series to the float switch, and a first set relay is disposed so as to be electrically connected in parallel to the float switch. In the sub-circuit unit, a second set relay is disposed so as to be electrically connected in series to the warning means. When the float switch detects water and is turned on, the actuating relay is energized, the first and second set relays are energized accordingly, the actuating relay is kept energized by the energized first set relay, and the warning means is actuated by the energized second set relay (paragraphs [0028] to [0034] in the specification in PTL 2). Accordingly, a means is devised to detect, over a long period, the occurrence of a flood while saving power consumption to the extent possible (paragraph [0019] in the specification in PTL 2).

PTL 3 describes, as a river water level warning unit for detecting the water level of a river, a unit that is attached to, for example, a bridge, and includes a water level measuring sensor that is installed on the bottom of the unit so as to face a water surface under the bridge and measures the height from the water surface of the river (see paragraph [0020] in the specification and FIG. 2 in PTL 3).

CITATION LIST

Patent Literature

PTL 1: Japanese Unexamined Patent Application Publication No. 2000-298055
PTL 2: Japanese Unexamined Patent Application Publication No. 2013-109558
PTL 3: Japanese Unexamined Patent Application Publication No. 2010-170190

Non Patent Literature

NPL 1: Nobuyoshi Kikuma, "Adaptive signal processing with array antenna", First Edition, Kagaku Gijutsu Shuppan, Inc., 1998, pp. 173 to 246

SUMMARY OF INVENTION

Technical Problem

An abnormal water level is not an event that frequently occurs a number of times a year but an event that is less likely to occur, such as once a year or once per several years. In the water level detection device described in PTL 1, the interrogator installed in the vicinity of a water surface is operated on an internal battery, and therefore, in a case where the interrogator is left installed over a long period, the interrogator runs out of battery at certain intervals. Further, the interrogator is left exposed to an external environment, and therefore, is highly likely to be broken down. In these cases, a case is likely to occur where the transponder does not return a response signal even though the transponder is not submerged, and this is erroneously determined as an abnormal water level, which is a problem.

In the flood occurrence warning system described in PTL 2, a float-type water level detection switch is used in water level detection. If maintenance is not performed over a long period, the float-type water level detection switch is likely to malfunction when clogged with, for example, waste or a nest made by living things, such as ants, spiders, or mud daubers, and therefore, has problems in terms of reliability concerning guaranteed operations and maintenance costs.

The river water level warning unit of PTL 3 is a unit that is attached to a bridge and measures the height from the water surface of the river to the bridge with the water level measuring sensor, and therefore, is a unit that is basically installed for a river. However, in recent flood disasters, water has overflowed from culverts or irrigation canals to roads, which has often made evacuation difficult. The river water level warning unit of PTL 3 is not adequate for application to a system that issues a warning regarding the danger of a flood to residents in the vicinity at the time of a flood disaster.

Accordingly, an object of the present invention is to provide a flood detection technique with which a breakdown is less likely to occur even in a case of installation over a long period, maintenance costs are low, and the occurrence of an abnormal water level is less likely to be erroneously determined.

Solution to Problem

A first configuration of an inundation detection device according to the present invention includes: a reception antenna that receives, from an RF sensor installed at a location where flood detection is performed and transmitting a radio signal intermittently by radio, the transmitted radio signal and outputs a received signal;

received signal strength detection means for detecting, at each time t, a received signal strength $I(t)$ that is a strength of the received signal output from the reception antenna;

received signal strength dispersion detection means for detecting, at each time t, a dispersion $D(I;[t-\Delta t_1, t])$, within a specific time $\Delta t_1$, of the received signal strength $I(t)$ detected by the received signal strength detection means;

normal reception rate detection means for detecting, at each time t, a normal reception rate $R[(t-\Delta t_2, t])$ that is a rate of normal reception of the received signal within a specific time $\Delta t_2$; and flood detection determination means for outputting a flood detection signal in a case where the dispersion $D(I; [t-\Delta t_1, t])$ output by the received signal strength dispersion detection means is greater than or equal to a specific threshold $D_{th1}$ and the normal reception rate $R[(t-\Delta t_2, t])$ output by the normal reception rate detection means is less than or equal to a specific threshold $R_{th1}$.

With this configuration, with the flood detection signal output by the flood detection determination means, the RF sensor that is flood can be detected with high accuracy. That is, in a case where a location below the RF sensor is flooded, regarding the radio signal transmitted from the RF sensor, a component that directly reaches the reception antenna (a component of a direct wave) and a component that is reflected on the water surface and reaches the reception antenna (a component of a reflected wave) interfere with each other, and the strength of the radio signal received by the reception antenna oscillates in accordance with the height of the water surface. The reflected component is extremely larger in a case where the component is reflected on the water surface than in a case where the component is reflected on the ground on which no water is present, and therefore, interference oscillation of the strength of the radio signal becomes very large in a case of flooding. Usually the water surface is choppy, and therefore, the interference oscillation of the strength of the radio signal is observed as an increase in the dispersion of the received signal strength $I(t)$ on the reception side. As the distance between the RF sensor and the water surface decreases, the optical path difference between the direct wave and the reflected wave decreases, large interference oscillation appears, and the dispersion $D(I;[t-\Delta t_1, t])$ of the received signal strength $I(t)$ increases accordingly. Therefore, when changes in the dispersion $D(I;[t-\Delta t_1, t])$ of the received signal strength $I(t)$ are observed, the presence or absence of flooding can be detected. As interference between the direct wave and the reflected wave becomes large, a reception error caused by multi-path fading is likely to occur. Therefore, the normal reception rate $R[(t-\Delta t_2, t])$ decreases as interference between the direct wave and the reflected wave increases. When the distance between the RF sensor and the water surface becomes less than or equal to one wavelength, the normal reception rate $R[(t-\Delta t_2, t])$ sharply decreases. When the RF sensor is submerged, the normal reception rate $R[(t-\Delta t_2, t])$ becomes extremely small due to attenuation of the radio wave under the water and reflection and refraction of the radio wave on the water surface. Therefore, when such an increase in the dispersion $D(I;[t-\Delta t_1, t])$ and a decrease in the normal reception rate $R[(t-\Delta t_2, t])$ are appropriately determined on the basis of the thresholds, the RF sensor that is flooded can be detected with high accuracy.

When both the dispersion $D(I;[t-\Delta t_1, t])$ and the normal reception rate $R[(t-\Delta t_2, t])$ are used, a case where the RF sensor is broken down or the RF sensor runs out of battery and a case where the RF sensor is actually flooded can be clearly distinguished from each other. Therefore, the occurrence of erroneous determination due to the RF sensor being broken down or running out of battery can be prevented.

Here, "dispersion" is a statistic that indicates the degree of dispersion of data. Specifically, as "dispersion", for example, a variance, a standard deviation, an unbiased variance, an average deviation, or a range of data can be used. A case where "a received signal is normally received" is a case where a specific signal pattern of a radio signal transmitted in the specific signal pattern is normally reconstructed from a received signal. For example, a case is assumed where a signal pattern A that includes an identification code of an RF sensor is periodically transmitted from the RF sensor at regular intervals together with an error correction code. In a case where the inundation detection device can normally decode the signal pattern A from a received signal received from the RF sensor, it is determined that "the received signal is normally received". In a case where a reception error occurs, it is not determined that "the received signal is normally received".

The RF sensor may be a spontaneous-transmission-type RF sensor that spontaneously and periodically transmits a radio signal by radio or may be a passive-transmission-type RF sensor that transmits a radio signal by radio in response to an interrogation signal transmitted from the inundation detection device. In a case where a passive-transmission-type RF sensor is used, the inundation detection device is configured to periodically transmit an interrogation signal.

A configuration can be employed that includes dispersion threshold setting means for learning the average $D_{av0}$ of the dispersion $D (I; [t-\Delta t_1, t])$ of the received signal strength $I(t)$ at normal times when the ground is not flood by machine learning and setting a value obtained by multiplying the average $D_{av0}$ by a predetermined coefficient $r_\sigma$ ($r_\sigma>1$) as the specific threshold $D_{th1}$. A configuration can be employed that includes normal reception rate threshold setting means for learning the average $R_{av0}$ of the normal reception rate $R[(t-\Delta t_2, t])$ at normal times when the ground is not flooded by machine learning and setting a value obtained by multiplying the average $R_{av0}$ by a predetermined coefficient $r_R$ ($0<r_R<1$) as the specific threshold $R_{th1}$.

In general, the dispersion $D(I;[t-\Delta t_1, t])$ of the received signal strength $I(t)$ and the normal reception rate $R[(t-\Delta t_2, t])$ at normal times when the ground is not flooded differ depending on the surrounding environment in which the RF sensor and the reception antenna are installed. When the dispersion threshold setting means and the normal reception rate threshold setting means described above are provided, the thresholds $D_{th1}$ and $R_{th1}$ that are appropriate for flood detection can be set so as to be adapted to the surrounding environment in which the RF sensor and the reception antenna are installed. In a case of causing the dispersion threshold setting means or the normal reception rate threshold setting means to learn the average $D_{av0}$ or $R_{av0}$ by machine learning, a method can be employed in which, for example, at normal times when the ground is not flooded, the administrator inputs a learning instruction via an initialization switch to cause the dispersion threshold setting means or the normal reception rate threshold setting means to learn over a specific period.

A second configuration of an inundation detection device according to the present invention is the first configuration, including flood caution determination means for outputting a flood caution signal in a case where the dispersion D(I; [t−Δt$_1$, t]) output by the received signal strength dispersion detection means is greater than or equal to a specific threshold $D_{th2}$.

With this configuration, with the flood caution signal output by the flood caution determination means, a state where the RF sensor is not flooded but a location below the RF sensor is flooded can be detected. Accordingly, the RF sensor that is shortly flooded can be detected in advance.

Here, the threshold $D_{th2}$ and the threshold $D_{th1}$ need not be the same values and can be different values. Further, as for the threshold $D_{th1}$, the threshold $D_{th2}$ may be determined by the dispersion threshold setting means performing machine learning so as to be adapted to the surrounding environment.

A third configuration of an inundation detection device according to the present invention is the first configuration, including: received signal strength variation detection means for detecting, at each time t, a received signal strength variability |DI(t)| that is an absolute value of a temporal change value DI(t)=I(t)−I(t−δt) or I(t)/I(t−δt) of the received signal strength I(t); and flood caution determination means for outputting a flood caution signal in a case where the number of times $N_{DI}$ the received signal strength variability βDI(t)| exceeds a specific threshold $DI_{th}$ within a specific time $\Delta t_3$ exceeds a specific threshold $N_{DIth}$.

With this configuration, with the flood caution signal output by the flood caution determination means, a state where "the RF sensor is not flooded but a location below the RF sensor is flooded" can be detected. Accordingly, the RF sensor that is shortly flooded can be detected in advance.

Here, a configuration can be employed that includes received signal strength variation threshold setting means for learning the average $DI_{av0}$ of the temporal change value DI(t) of the received signal strength I(t) at normal times when the ground is not flooded by machine learning and setting a value obtained by multiplying the average $DI_{av0}$ by a predetermined coefficient $r_{DI}$ ($r_{DI}$>1) as the specific threshold $DI_{th}$. Accordingly the threshold $DI_{th}$ that is appropriate for flood detection can be set so as to be adapted to the surrounding environment in which the RF sensor and the reception antenna are installed.

A fourth configuration of an inundation detection device according to the present invention includes: an array antenna that is a reception antenna that receives, from an RF sensor installed at a location where detection of a flood occurrence is performed and transmitting a radio signal intermittently by radio, the transmitted radio signal, the array antenna being provided with a plurality of antenna elements arranged in an array, phase shifters provided for the respective antenna elements and shifting phases of received signals of the antenna elements, and an adder outputting an added signal obtained by adding up phase shifter output signals output from the respective phase shifters;

reception means for generating received signals from the radio signal received by the array antenna;

received signal strength detection means for detecting received signal strengths I that are strengths of the received signals output from the reception means;

azimuth spectrum detection means for controlling maximum reception sensitivity directions θs of the array antenna by controlling phase shift amounts of the respective phase shifters of the array antenna, and obtaining reception strength signals I(θs), in the respective maximum reception sensitivity directions θs, output by the received signal strength detection means and calculating an angular power spectrum of the received signals from the reception strength signals I(θs); and flood detection determination means for detecting, in the angular power spectrum, among the received signals, a main lobe indicating a direct wave that directly reaches the array antenna from the RF sensor and a second lobe indicating a reflected wave that reaches the array antenna from the RF sensor after reflected on a flooded surface, and in a case where the second lobe in the angular power spectrum is detected, outputting a flood detection signal.

With this configuration, when generation of the second lobe that indicates a reflected wave is detected in the angular power spectrum detected by the azimuth spectrum detection means, the occurrence of flooding can be accurately detected. The second lobe indicating a reflected wave is generated due to a large increase in the reflectivity of the ground as a result of the ground being wet. Therefore, the second lobe is generated also in a case where the ground becomes wet with usual rain. The strength of the second lobe increases as the reflectivity of the ground increases, and therefore, a degree to which the ground is wet can be detected on the basis of the relative strengths of the main lobe and the second lobe. Although a reflected wave of a radio signal reflected on the ground is generated also in a case where the ground is dry, the relative dielectric constant of water in a radio frequency range is extremely larger than the relative dielectric constant of the dry ground, and therefore, the strength of the reflected wave differs to a large degree in a case where the ground is dry and in a case where the ground is wet. When the strength of the second lobe is determined on the basis of a threshold, whether the ground is flooded or not can be easily determined.

A fifth configuration of an inundation detection device according to the present invention is the fourth configuration, including water level estimation means for estimating, in a case where both the main lobe and the second lobe are detected by the flood detection determination means, a water level of flooding on the basis of an antenna angle of incidence $\phi_0$ of the main lobe, an antenna angle of incidence $\phi_1$ of the second lobe, and a distance $l_0$ from the array antenna to the RF sensor, the distance $l_0$ being a measurement value set in advance.

With this configuration, when the ground around the RF sensor is flooded and the water level of flooding rises, the reflection surface (water surface) rises, the antenna angle of incidence $\phi_1$ at which the reflected wave is incident on the array antenna changes, and this change is detected as the position of the second lobe in the angular power spectrum. Therefore, on the basis of the antenna angle of incidence $\phi_1$ of the second lobe, the antenna angle of incidence $\phi_0$ of the main lobe, and the distance $l_0$ from the array antenna to the RF sensor, the water level of flooding can be estimated by simple geometric calculation (see expression (30)). Accordingly, the inundation detection device can detect the degree of flooding.

A sixth configuration of an inundation detection device according to the present invention includes: a reception antenna that receives, from a plurality of transmission antennas arranged in a vertical direction at a location where flood detection is performed and transmitting radio signals intermittently by radio at different timings, the transmitted radio signals and outputs received signals;

received signal strength detection means for detecting received signal strengths (I) that are strengths of the received signals output from the reception antenna; and flood detection determination means for detecting an interference waveform representing a variation of the received signal strengths corresponding to heights of the respective transmission antennas from the received signal strengths output by the received signal strength detection means, and in a case where an amplitude of the interference waveform exceeds a specific threshold, outputting a flood detection signal.

With this configuration, the plurality of transmission antennas are arranged in the vertical direction at the flood detection location, and in a case where the ground at the flood detection location is flooded, the distances from the water surface to the respective transmission antennas become different. Therefore, regarding the radio signal from each transmission antenna received by the reception antenna, the phase difference between a direct wave (the radio signal that directly reaches the reception antenna from the transmission antenna) and a reflected wave (the radio signal that reaches the reception antenna from the transmission antenna after reflected on the water surface) differs depending on the transmission antenna, and the strength of the received signals output from each reception antenna varies depending on the height of the transmission antenna. The flood detection determination means detects this variation as an interference waveform and determines the amplitude of the interference waveform on the basis of the threshold. Accordingly, the occurrence of flooding can be detected.

A seventh configuration of an inundation detection device according to the present invention is the sixth configuration, including: interference waveform shift amount detection means for detecting, in a case where the amplitude of the interference waveform exceeds the specific threshold, a shift amount, relative to a position of the interference waveform at a time t0 when the amplitude of the interference waveform exceeds the specific threshold, of the interference waveform at a subsequent time t in a height direction of the transmission antennas; and water level estimation means for estimating a water level of flooding at the time t on the basis of the shift amount detected by the interference waveform shift amount detection means.

With this configuration, when the flooded water surface rises, the distance from the water surface to each of the transmission antennas decreases, and therefore, a rise or a fall of the water surface is detected as a shift of the interference waveform. Therefore, when the shift amount is detected, the water level of flooding can be estimated. Accordingly, the inundation detection device can detect the degree of flooding.

A first configuration of an inundation detection system according to the present invention includes: an RF sensor that is installed at a location where flood detection is performed and transmits a radio signal intermittently by radio or transmits a radio signal by radio in response to an interrogation signal; and the inundation detection device according to any one of Claims 1 to 3, the inundation detection device being installed apart from the RF sensor at a height higher than the RF sensor.

A second configuration of an inundation detection system according to the present invention is the first configuration, in which the reception antenna is installed in an orientation in which a received signal strength of an electric field component in a horizontal direction is maximized.

With this configuration, the reception antenna of the inundation detection device mainly receives a polarized component having a horizontal electric field (an S-polarized component relative to a horizontal boundary plane) among polarized components of the radio signal transmitted from the RF sensor. According to the equations of the Fresnel coefficient concerning the amplitude reflectivity, reflection of an electromagnetic wave on the water surface is small for the P-polarized component and large for the S-polarized component. The relative dielectric constant of water is about 80 in a frequency range of about 1 GHz, and the refractive index relative to air is about 9, and therefore, reflection on the water surface is significantly large. Thereafter, when the RF sensor in a frequency range in which dielectric relaxation occurs starts to be gradually submerged, reception of a radio wave fails as the water depth increases. Therefore, when the reception antenna is installed in an orientation in which the received signal strength of an electric field component in the horizontal direction is maximized, a state where a location below the RF sensor is flooded or a state where the RF sensor is submerged can be detected with high accuracy.

A third configuration of an inundation detection system according to the present invention includes: an RF sensor that is installed at a location where flood detection is performed and transmits a radio signal intermittently by radio; and the inundation detection device according to the fourth or fifth configuration, the inundation detection device being installed apart from the RF sensor at a height higher than the RF sensor.

A fourth configuration of an inundation detection system according to the present invention is the third configuration, in which each of the antenna elements of the array antenna is installed in an orientation in which a received signal strength of an electric field component in a horizontal direction is maximized.

A fifth configuration of an inundation detection system according to the present invention includes: an RF sensor that includes a plurality of transmission antennas arranged in a vertical direction at a location where flood detection is performed and transmitting radio signals intermittently by radio; and the inundation detection device according to the sixth or seventh configuration, the inundation detection device being installed apart from the RF sensor at a height higher than the RF sensor.

A sixth configuration of an inundation detection system according to the present invention is the fifth configuration, in which the reception antenna is installed in an orientation in which a received signal strength of an electric field component in a horizontal direction is maximized.

A first configuration of an inundation detection method according to the present invention is an inundation detection method for detecting whether a flood detection location is flooded, the inundation detection method including:

receiving a radio signal transmitted from an RF sensor installed at the flood detection location, by a reception antenna installed at a height higher than the RF sensor;

generating a received signal that is an electric signal from the radio signal;

detecting, at each time, a received signal strength $I(t)$ that is a strength of the received signal, a dispersion $D(I;[t-\Delta t_1, t])$, within a specific time $\Delta t_1$, of the received signal strength $I(t)$, and a normal reception rate $R[(t-\Delta t_2, t])$ that is a rate of normal reception of the received signal within a specific time $\Delta t_2$; and determining that flooding is detected in a case where the dispersion $D(I;[t-\Delta t_1, t])$ is greater than or equal to a specific threshold $D_{th1}$ and the normal reception rate $R[(t-\Delta t_2, t])$ is less than or equal to a specific threshold $R_{th}$.

Accordingly, the RF sensor that is flooded can be detected with high accuracy.

A second configuration of an inundation detection method according to the present invention is the first configuration, including determining that the flooding reaches a flood caution level in a case where the dispersion $D(I;[t-\Delta t_1, t])$ is greater than or equal to a specific threshold $D_{th2}$.

Accordingly, a state where the RF sensor is not flooded but a location below the RF sensor is flooded can be detected, and the RF sensor that is shortly flooded can be detected in advance.

A third configuration of an inundation detection method according to the present invention is the first configuration, including: detecting, at each time t, a received signal strength variability $|DI(t)|$ that is an absolute value of a temporal change value $DI(t)=I(t)-I(t-\delta t)$ or $I(t)/I(t-\delta t)$ of the received signal strength $I(t)$; and determining that the flooding reaches a flood caution level in a case where the number of times $N_{DI}$ the received signal strength variability $\oplus DI(t)|$ exceeds a specific threshold $DI_{th}$ within a specific time $\Delta t_3$ exceeds a specific threshold $N_{DIth}$.

Accordingly, a state where the RF sensor is not flooded but a location below the RF sensor is flooded can be detected, and the RF sensor that is shortly flooded can be detected in advance.

A fourth configuration of an inundation detection method according to the present invention is an inundation detection method for detecting whether a flood detection location is flooded, the inundation detection method including:

receiving a radio signal transmitted from an RF sensor installed at the flood detection location, by an array antenna installed at a height higher than the RF sensor;

a step of detecting received signals of the radio signal received by the array antenna while scanning in maximum reception sensitivity directions $\theta_s$ of the array antenna to calculate an angular power spectrum of the received signals; and a step of detecting, in the angular power spectrum, among the received signals, a main lobe indicating a direct wave that directly reaches the array antenna from the RF sensor and a second lobe indicating a reflected wave that reaches the array antenna from the RF sensor after reflected on a flooded surface, and in a case where the second lobe in the angular power spectrum is detected, outputting a flood detection signal.

A fifth configuration of an inundation detection method according to the present invention is the fourth configuration, including a step of estimating, in a case where both the main lobe and the second lobe are detected, a water level of flooding on the basis of an antenna angle of incidence $\phi_0$ of the main lobe, an antenna angle of incidence $\phi_1$ of the second lobe, and a distance $l_0$ from the array antenna to the RF sensor, the distance $l_0$ being a measurement value set in advance.

A sixth configuration of an inundation detection method according to the present invention is an inundation detection method for detecting whether a flood detection location is flooded, the inundation detection method including:

a step of receiving, from a plurality of transmission antennas arranged in a vertical direction at a location where flood detection is performed and transmitting radio signals intermittently by radio at different timings, the transmitted radio signals and generating received signals; and a step of detecting, from strengths of the respective received signals, an interference waveform representing a variation of the strengths of the received signals corresponding to heights of the respective transmission antennas, and in a case where an amplitude of the interference waveform exceeds a specific threshold, outputting a flood detection signal.

A seventh configuration of an inundation detection method according to the present invention is the sixth configuration, including: a step of detecting, in a case where the amplitude of the interference waveform exceeds the specific threshold, a shift amount, relative to a position of the interference waveform at a time t0 when the amplitude of the interference waveform exceeds the specific threshold, of the interference waveform at a subsequent time t in a height direction of the transmission antennas; and a step of estimating a water level of flooding at the time t on the basis of the shift amount.

Advantageous Effects of Invention

As described above, according to the present invention, the RF sensor that is an electromagnetic wave transmitter is used as a sensor for water level detection. Therefore, unlike a float switch, the RF sensor is not mechanically broken down and normally operates even if some dirt is adhered to the RF sensor. Accordingly, maintenance costs can be reduced. To determine whether the RF sensor is flooded, two types of data, namely, the dispersion $D(I;[t-\Delta t_1, t])$ of the received signal strength $I(t)$ of the radio signal transmitted from the RF sensor and the normal reception rate $R[(t-\Delta t_2, t])$ of the radio signal are used as data for determination. Therefore, in a case where the RF sensor is installed over a long period and no radio signal is transmitted because the RF sensor runs out of battery or is broken down, such a case can be clearly distinguished from a case where the RF sensor is flooded. Accordingly, the RF sensor is not erroneously determined to be flooded, and erroneous determination is less likely to occur. In a case where no radio signal is transmitted for a reason other than the RF sensor being flooded, it can be determined that some sort of abnormality, such as running out of battery, occurs. Therefore, the occurrence of abnormality in the RF sensor can be automatically detected from the inundation detection device.

When the dispersion $D(I;[t-\Delta t_1, t])$ of the received signal strength $I(t)$ and the received signal strength variability $|DI(t)|$ are used, even in a state where the RF sensor is not flooded, the flooded ground around a place where the RF sensor is installed can also be detected. When the flooded ground is detected, the inundation detection device outputs a flood caution signal, which can call attention earlier at the time of the occurrence of, for example, a flooded road or a flood.

When the array antenna is used as the reception antenna, the angular power spectrum of received signals from the RF sensor is detected by the azimuth spectrum detection means, and generation of the second lobe indicating a reflected wave is detected in the angular power spectrum, the occurrence of flooding can be accurately detected. With this method, the degree to which the ground around the RF sensor becomes wet can be detected. On the basis of the position of the second lobe in the angular power spectrum, the water level of flooding around the RF sensor can also be estimated.

The plurality of transmission antennas are arranged in the vertical direction at a flood detection location, an interference waveform that represents a variation of received signal strengths corresponding to the heights of the respective transmission antennas is detected from received signals from the transmission antennas, and a flood detection signal is output in a case where the amplitude of the interference waveform exceeds a specific threshold. Accordingly, the occurrence of flooding can be detected. Further, when a shift amount of the interference waveform at each time t from the time point t0 when the amplitude of the interference waveform exceeds the specific threshold is detected, the water level of flooding can also be estimated.

BRIEF DESCRIPTION OF DRAWINGS

FIG. 1 includes diagrams illustrating example overall arrangements of an inundation detection system according to embodiment 1 of the present invention.

FIG. 8 includes diagrams illustrating results of calculating (a) a probability distribution function $f_{hC}(h_C)$ of the height $h_C$ of a reflection point C and (b) a probability distribution function $f_{IB}(I_B/I_0)$ (S-wave) of the relative reception strength $I_B/I_0$ at the reception point B in a case where a water surface has a wave.

FIG. 15 includes diagrams illustrating relationships between a water level and the averages ave $(I_B/I_0)$ of a relative reception strength.

FIG. 16 includes diagrams illustrating relationships between a water level and the standard deviations $\sigma(I_B/I_0)$ of a relative reception strength.

FIG. 18 is a diagram illustrating measurement conditions for measurement illustrated in FIG. 17.

FIG. 27 includes diagrams illustrating the state of installation of the RF sensors 2 in the external environment test II, where (a) is a diagram of the RF sensors 2 when viewed from the opposite bank and (b) is a diagram of the RF sensors 2 when viewed from diagonally above.

FIG. 29 is a diagram illustrating actual measurement values of temporal changes in a water level and in the RSS for an RF sensor 2a.

FIG. 30 is a diagram illustrating actual measurement values of temporal changes in the water level and in the normal reception count for the RF sensor 2a.

FIG. 31 is a diagram illustrating actual measurement values of temporal changes in the water level and in the variance of the RSS for the RF sensor 2a.

FIG. 41 is a diagram for explaining the principle of an array antenna 11a.

FIG. 42 includes diagrams illustrating the APSs of radio waves obtained by the array antenna 11a, where (a) illustrates a case where a water surface reflected wave is not present and (b) illustrates a case where a water surface reflected wave is present.

FIG. 47 is a diagram illustrating another example configuration of the array RF sensor 2a.

DESCRIPTION OF EMBODIMENTS

Figure 2:
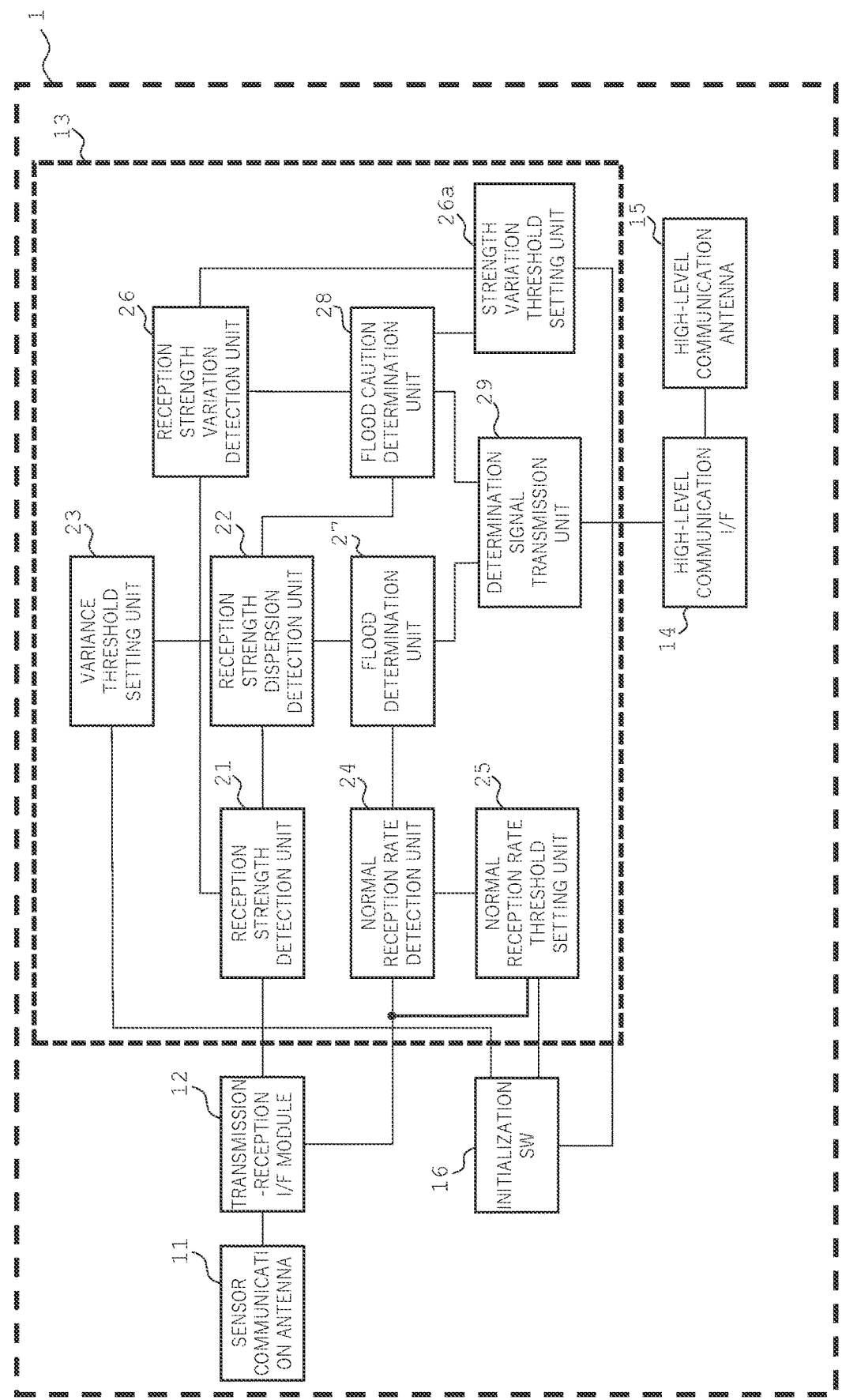
FIG. 2 is a block diagram illustrating a configuration of an inundation detection device 1.

Hereinafter, embodiments of the present invention will be described with reference to the drawings.

First, main terms used herein are defined as follows.

An "RF sensor" (radio-frequency sensor) is a radio module that periodically transmits a response signal in a radio frequency band. A "sensor ID" is an identification code of an RF sensor. A "radio response signal" is a radio signal transmitted by an RF sensor and is a signal that includes the sensor ID of the RF sensor. A "received response signal" is an electric signal generated by performing a demodulation process and a decoding process for a radio response signal. A "received signal strength" (hereinafter referred to as "RSS") is the strength of a received response signal. A "received signal strength variability" (the variability of an RSS, hereinafter referred to as "VRSS") is the absolute value of a temporal change value of an RSS. Here, the temporal change value of an RSS may be defined as follows. When the RSS of an (n-1)-th received response signal is denoted by I(n-1) and the RSS of an n-th received response signal is denoted by I(n), an n-th temporal change value DI(n) may be defined as DI(n)=I(n)−I(n-1) or DI(n)=I(n)/I(n-1). The latter definition is used in a case where the value of the RSS is treated as a logarithm (decibel). A "normal reception rate" is a rate of normal reception of a received response signal within a specific time. A "flood detection signal" is a signal indicating whether a flooded RF sensor is detected. A "flood caution signal" is a signal indicating whether a state where an RF sensor is not flooded but a location therebelow is flooded is detected.

Embodiment 1

(1) Overall Arrangement of Inundation Detection System

FIG. 1 includes diagrams illustrating example overall arrangements of an inundation detection system according to embodiment 1 of the present invention. The inundation detection system of embodiment 1 includes an inundation detection device 1 and one or more RF sensors 2.

The RF sensor 2 is a radio module that periodically transmits a radio response signal having a specific signal pattern by radio. This embodiment illustrates, as the RF sensor 2, for example, a spontaneous-transmission-type RF sensor that spontaneously transmits a radio response signal periodically (at one-second intervals) by radio. The radio response signal includes an identification code (hereinafter referred to as "sensor ID") for identifying the RF sensor 2.

As the RF sensor 2, a passive-transmission-type RF sensor, such as an RF tag used in an RFID system (Radio Frequency IDentification System), can be used that transmits, by radio, a radio response signal in response to an interrogation signal periodically transmitted from the inundation detection device 1.

The inundation detection device 1 is a device that receives a radio response signal transmitted from the RF sensor 2 and determines the presence or absence of flooding around the RF sensor 2 on the basis of the reception state of the radio response signal. The details of the inundation detection device 1 will be described below. As illustrated in FIG. 1, the inundation detection device 1 is installed at a height higher than the RF sensor 2 so as not to be flooded at the time of a swell.

One inundation detection device 1 may be provided with one RF sensor 2 as illustrated in FIG. 1(a) or one inundation detection device 1 can be provided with a plurality of RF sensors 2 as illustrated in FIGS. 1(b) and 1(c), and the heights at which the respective RF sensors 2 are installed or the places where the respective RF sensors 2 are installed can be made different. In a case where one inundation detection device 1 is provided with the plurality of RF sensors 2, a radio response signal from each of the RF sensors 2 received by the inundation detection device 1 can be identified by referring to a sensor ID included in the radio response signal to thereby determine from which RF sensor 2 the radio response signal is transmitted.

(2) Configuration of Inundation Detection Device 1

FIG. 2 is a block diagram illustrating a configuration of the inundation detection device 1. The inundation detection device 1 of this embodiment includes a sensor communication antenna 11, a transmission-reception interface module 12 (hereinafter referred to as "transmission-reception I/F module 12"), a computer 13, a high-level communication interface module 14 (hereinafter referred to as "high-level communication I/F module 14"), a high-level communication antenna 15, and an initialization switch 16.

The sensor communication antenna 11 is an antenna for transmitting and receiving radio waves to and from the RF sensor 2. For size reduction, it is preferable to use a flat antenna formed on, for example, a printed circuit board. The transmission-reception I/F module 12 is a module that performs a process for communicating with the RF sensor 2 via the sensor communication antenna 11. In this embodiment, as the transmission-reception I/F module 12, for example, a communication interface module using spread spectrum communication for attaining a long communication range is used. The transmission-reception I/F module 12 generates a received response signal from a radio response signal received from the RF sensor 2 via the sensor communication antenna 11 by performing a demodulation process and a decoding process. The received response signal includes the sensor ID described above. The computer 13 controls operations of the inundation detection device 1. As the computer 13, for example, a microcomputer or a reconfigurable computer, such as a PLD (programmable logic device) or an FPGA (field-programmable gate array), can be used. The high-level communication I/F module 14 is a module that performs communication to transmit a flood detection signal indicating detection of a flooded RF sensor and a flood caution signal detecting a state where an RF sensor is not flooded but a location therebelow is flooded, to a high-level server or a high-level network, such as the Internet. In this embodiment, a highly versatile communication interface module, such as Bluetooth (registered trademark) (IEEE 802.15 standard) or Wi-Fi (registered trademark) (IEEE 802.11 standard), is used. This embodiment illustrates an example where, as a means for connecting the inundation detection device 1 to a high-level network, a radio connection means using the high-level communication I/F module 14 is used. However, a configuration using a wired connection by a cable can be employed. The high-level communication antenna 15 is an antenna used in radio communication for connecting the high-level communication I/F module 14 to a high-level network. As the high-level communication antenna 15, it is preferable to use a flat antenna formed on, for example, a printed circuit board for size reduction. The initialization switch 16 is a switch for inputting an initialization instruction for setting various thresholds used to determine whether an RF sensor is flooded or a location below the RF sensor is flooded, by machine learning.

The computer 13 described above includes, as illustrated in FIG. 2, a received signal strength detection unit 21, a reception strength dispersion detection unit 22, a variance threshold setting unit 23, a normal reception rate detection unit 24, a normal reception rate threshold setting unit 25, a received signal strength variation detection unit 26, a strength variation threshold setting unit 26a, a flood determination unit 27, a flood caution determination unit 28, and a determination signal transmission unit 29. These constituent units are functional modules functionally configured in the computer 13 by causing the computer 13 to read and execute a program.

The received signal strength detection unit 21 is a module that performs a process for detecting, at each time t, a received signal strength (RSS) I(t), which is the strength of a received response signal output from the transmission-reception I/F module 12. To reduce an effect of noise generated by water surface waves, the received signal strength detection unit 21 may be configured to output the average (moving average) of the RSS within a specific time before time t as I(t). The reception strength dispersion detection unit 22 is a module that performs a process for detecting, at each time t, the variance $\sigma^2(I;[t-\Delta t_1, t])$ of the RSS I(t), within a specific time $\Delta t_1$, detected by the received signal strength detection unit 21. The variance threshold setting unit 23 is a module that performs a process for learning the average $\sigma^2_{av0}$ of the variance $\sigma^2(I;[t-\Delta t_1, t])$ of the RSS I(t) at normal times when the ground is not flooded by machine learning, and setting a value obtained by multiplying the average $\sigma^2_{av0}$ by a predetermined coefficient $r_\sigma$ ($r_\sigma>1$) as a threshold $\sigma^2_{th1}$.

The normal reception rate detection unit 24 is a module that performs a process for detecting, at each time t, a normal reception rate $R[(t-\Delta t_2, t])$, which is a rate of normal reception of a received response signal within a specific time $\Delta t_2$. The normal reception rate threshold setting unit 25 is a module that performs a process for learning the average $R_{av0}$ of the normal reception rate $R[(t-\Delta t_2, t])$ at normal times when the ground is not flooded by machine learning, and setting a value obtained by multiplying the average $R_{av0}$ by a predetermined coefficient $r_R$ ($0<r_R<1$) as a threshold $R_{th1}$.

The received signal strength variation detection unit 26 is a module that performs a process for detecting, at each time t, the variability of the RSS (VRSS) $|DI(t)|$, which is the absolute value of a temporal change value $DI(t)=I(t)-I(t-\delta t)$ or $I(t)/I(t-\delta t)$ of the RSS I(t). Here, $\delta t$ denotes a time from when the previous radio response signal is received to when the present radio response signal is received (time t). The strength variation threshold setting unit 26a is a module that performs a process for learning the average $|DI|_{av0}$ of the VRSS $|DI(t)|$ at normal times when the ground is not flooded by machine learning, and setting a value obtained by multiplying the average $|DI|_{av0}$ by a predetermined coefficient $r_{DI}$ ($r_{DI}>1$) as a threshold $DI_{th}$.

The flood determination unit 27 is a module that performs a process for outputting a flood detection signal in a case where the variance $\sigma^2(I;[t-\Delta t_1, t])$ output by the reception strength dispersion detection unit 22 is greater than or equal to the threshold $\sigma^2_{th1}$ and the normal reception rate $R[(t-\Delta t_2, t])$ output by the normal reception rate detection unit 24 is less than or equal to the specific threshold $R_{th1}$.

The flood caution determination unit 28 is a module that performs a process for generating and outputting a flood caution signal indicating whether a state where an RF sensor is not flooded but a location therebelow is flooded is detected. The flood caution determination unit 28 outputs a flood caution signal in a case where the variance $\sigma^2(I;[t-\Delta t_1, t])$ output by the reception strength dispersion detection unit 22 is greater than or equal to a threshold $\sigma^2_{th2}$ or in a case where the number of times $N_{DI}$ the VRSS $|DI(t)|$ exceeds the threshold $DI_{th}$ within a specific time $\Delta t_3$ exceeds a specific threshold $N_{DIth}$.

The determination signal transmission unit 29 is a module that performs a process for transmitting the flood detection signal output by the flood determination unit 27 or the flood caution signal output by the flood caution determination unit 28 to a high-level network via the high-level communication I/F module 14.

In this embodiment, although an example where the variance $\sigma^2(I;[t-\Delta t_1, t])$ is used as the "dispersion" of the RSS I(t) is illustrated, in the present invention, for example, the standard deviation, the unbiased variance, the average deviation, or the range of data can also be used as the "dispersion".

(3) Principle of Flood Detection

Now, the principle for detecting, in the inundation detection system of this embodiment, an RF sensor that is flooded or a state where an RF sensor is not flooded but a location therebelow is flooded is described.

Figure 3:
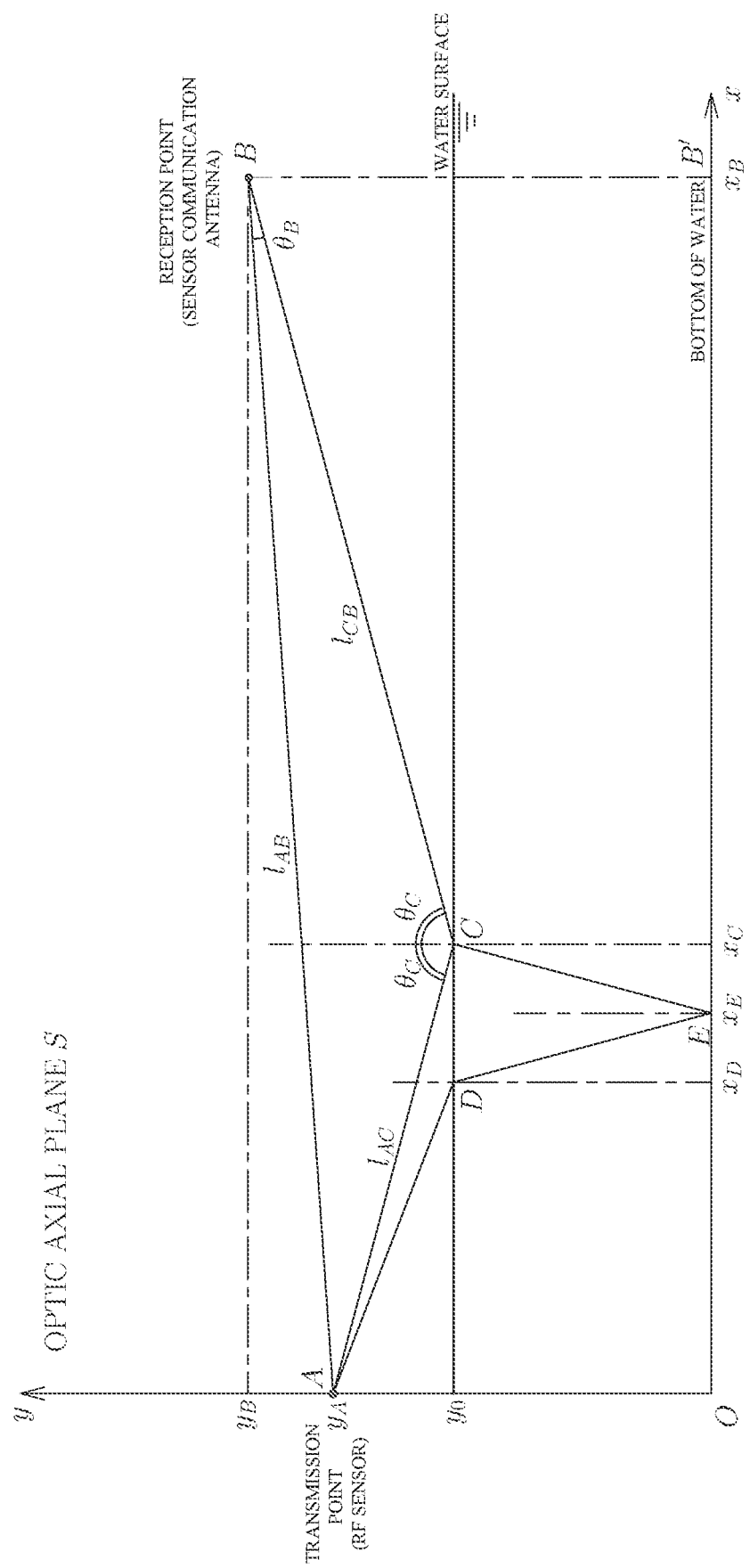
FIG. 3 is a diagram illustrating transmission paths of a radio signal from an RF sensor 2 to a sensor communication antenna 11.

First, a relationship between the RSS I(t) of a radio response signal received by the inundation detection device 1 and a water level around the RF sensor 2 is described. A case is assumed where a radio response signal is transmitted from the RF sensor 2 to the sensor communication antenna 11 of the inundation detection device 1 and where a water surface is present below the RF sensor 2. A description of the principle is given here, and therefore, to facilitate understanding, it is supposed that the water surface is a still water surface having no waves at all. In this case, the propagation paths of the radio response signal are as illustrated in FIG. 3. In FIG. 3, it is assumed that the RF sensor 2 is the transmission point A, the sensor communication antenna 11 is the reception point B, and the points A and B are above the still water surface. As illustrated in FIG. 3, an x-y coordinate system in which an x axis is set in the horizontal direction and a y axis is set in the vertical direction is set in a vertical plane that includes the points A and B. The coordinates of the transmission point A are denoted by (0, $y_A$), the coordinates of the reception point B are denoted by ($x_B$, $y_B$), and the water surface is denoted by $y=y_0$. When it is supposed that an electromagnetic wave (radio response signal) emitted from the transmission point A is a spherical wave that radially spreads, as paths of the electromagnetic wave that reaches the reception point B, for example, the following are possible: (1) a path $p_{AB}$ along which the electromagnetic wave from the transmission point A directly reaches the reception point B, (2) a path $p_{ACB}$ along which the electromagnetic wave from the transmission point A is reflected at the reflection point C on the water surface and reaches the reception point B, and (3) a path $p_{ADECB}$ along which the electromagnetic wave from the transmission point A is refracted at the refraction point D on the water surface and enters the water, is reflected at the reflection point E on the bottom of the water, is refracted at the refraction point C on the water surface, and reaches the reception point B. The frequency of the electromagnetic wave assumed here is within a frequency range (900 MHz to ten-odd GHz) that is used in usual radio wireless communication, such as RFID or Bluetooth (registered trademark). In this frequency range, the relative dielectric constant of water is about 80, and the refractive index of water is about 8 to 9 and very large. Therefore, it is considered that the reflectivity of the electromagnetic wave on the water surface is large and the electromagnetic wave is attenuated under the water to a very large degree due to dielectric loss. Accordingly, only the paths $p_{AB}$ and $p_{ACB}$ are considered here. The distance from the water surface to the transmission point A is denoted by $y_{A0}$, the distance from the water surface to the reception point B is denoted by $y_{B0}$, and $h_{BA}=y_B-y_A$ is defined. At this time, the path length $l_{AB}$ of the path $p_{AB}$, the path length $l_{ACB}$ of the path $p_{ACB}$, the x coordinate $x_C$ of the reflection point C of the path $p_{ACB}$, the angles of incidence and reflection $\theta_C$ at the reflection point C, and the angle $\theta_B$ made by the paths $p_{AB}$ and $p_{ACB}$ at the reception point B are respectively expressed as follows.

[Math. 1]

$$l_{AB} = \sqrt{x_{AB}^2 + h_{BA}^2} \tag{1a}$$

$$l_{ACB} = \sqrt{x_C^2 + y_{A0}^2} + \sqrt{(x_B - x_C)^2 + y_{B0}^2}$$

$$= \frac{1}{h_{BA}} \left\{ y_{A0}\sqrt{x_B^2 + h_{BA}^2} + \sqrt{x_B^2(h_{BA} - y_{A0})^2 + h_{BA}^2 y_{B0}^2} \right\} \tag{1b}$$

$$x_C = \frac{y_{A0}}{y_{A0} + y_{B0}} x_B, \tag{1c}$$

$$\theta_C = a\tan\left(\frac{x_C}{y_{A0}}\right) = a\tan\left(\frac{x_B}{y_{A0} + y_{B0}}\right) \tag{1d}$$

$$\theta_B = a\tan\frac{x_B}{h_{BA}} - \theta_C \tag{1e}$$

Figure 4:
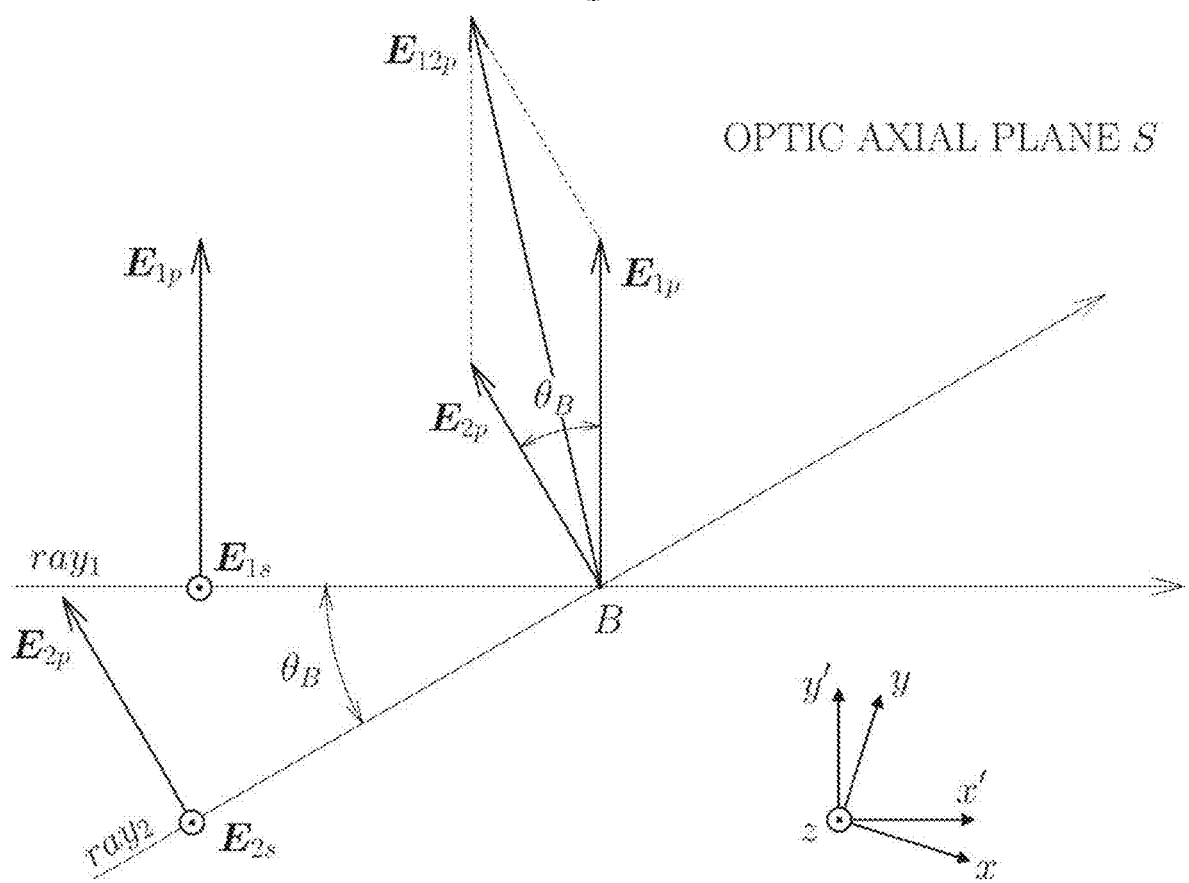
FIG. 4 is a diagram illustrating an electromagnetic wave incident on a reception point B.

The electric field components of the electromagnetic waves that pass through the paths $p_{AB}$ and $p_{ACB}$ and are incident on the reception point B are respectively denoted by $E_1$ and $E_2$, the magnetic field components thereof are respectively denoted by $H_1$ and $H_2$, p-polarized components of the electric fields $E_1$ and $E_2$ are respectively denoted by $E_{1p}$ and $R_{2p}$, p-polarized components of the magnetic fields $H_1$ and $H_2$ are respectively denoted by $H_{1p}$ and $H_{2p}$, s-polarized components of the electric fields $E_1$ and $E_2$ are respectively denoted by $E_{1s}$ and $E_{2s}$, and s-polarized components of the magnetic fields $H_1$ and $H_2$ are respectively denoted by $H_{1s}$ and $H_{2s}$. Then, $E_{1p}$, $E_{2p}$, $E_{1s}$, $E_{2s}$, $H_{1p}$, $H_{2p}$, $H_{1s}$, and $H_{2s}$ are respectively expressed as follows (see FIG. 4).

[Math. 2]

$$E_{1p}(t)=i_1 E_{10p} \cos \omega t, H_{1p}(t)=i_z H_{10p} \cos \omega t$$

$$E_{2p}(t)=i_2 E_{20p} \cos(\omega t+\phi_{12}), H_{2p}(t)=i_z H_{20p} \cos(\omega t+\phi_{12})$$

$$E_{1s}(t)=i_z E_{10s} \cos \omega t, H_{1s}(t)=i_1 H_{10s} \cos \omega t$$

$$E_{2s}(t)=i_z E_{20s} \cos(\omega t+\phi_{12}), H_{2s}(t)=i_2 H_{20s} \cos(\omega t+\phi_{12}) \tag{2}$$

Here, $i_1$ and $i_2$ denote unit vectors that express the orientations of the electric fields $E_1$ and $E_2$, $i_s$ is a unit vector in an orientation perpendicular to the x-y plane, $\omega$ denotes the angular frequency of the electromagnetic waves, and $\phi_{12}$ denotes the phase shift amount of the electromagnetic wave ($E_2$, $H_2$) relative to the electromagnetic wave ($E_1$, $H_1$) at the reception point B.

At this time, the time averages $\langle U_p \rangle$ and $\langle U_s \rangle$ of the energy densities of the p-polarized electromagnetic wave and the s-polarized electromagnetic wave at the reception point B are respectively expressed as follows. Here, $\langle U_{1p} \rangle$ and $\langle U_{1s} \rangle$ denote the time averages of the energy densities of the p-polarized component and the s-polarized component of the electromagnetic wave (direct wave) emitted from the transmission point A, passing through the path $p_{AB}$, and reaching the reception point B, and $\langle U_{2p} \rangle$ and $\langle U_{2s} \rangle$ denote the time averages of the energy densities of the p-polarized component and the s-polarized component of the electromagnetic wave (reflected wave) emitted from the transmission point A, passing through the path $p_{ACB}$, and reaching the reception point B.

[Math. 3]

$$\langle U_p \rangle = \frac{1}{2}\left[ \langle U_{1p} \rangle + \langle U_{2p} \rangle + \sqrt{\langle U_{1p} \rangle \langle U_{2p} \rangle} \right.$$
$$\left. (1 + \cos\theta_B)\cos\phi_{12} \right] \tag{3a}$$

$$\langle U_{1p} \rangle = \epsilon_0 E_{10p}^2 = \mu_0 H_{10p}^2, \tag{3b}$$
$$\langle U_{2p} \rangle = \epsilon_0 E_{20p}^2 = \mu_0 H_{20p}^2$$

$$\langle U_s \rangle = \frac{1}{2}\left[ \langle U_{1s} \rangle + \langle U_{2s} \rangle + \sqrt{\langle U_{1s} \rangle \langle U_{2s} \rangle} \right.$$
$$\left. (1 + \cos\theta_B)\cos\phi_{12} \right] \tag{3c}$$

$$\langle U_{1s} \rangle = \epsilon_0 E_{10s}^2 = \mu_0 H_{10s}^2, \tag{3d}$$
$$\langle U_{2s} \rangle = \epsilon_0 E_{20s}^2 = \mu_0 H_{20s}^2$$

When the wavelength of the electromagnetic waves is denoted by λ, the phase shift amount $\phi_{12}$ is expressed as follows.

[Math. 4]

$$\phi_{12} = \phi_2 - \phi_1 \tag{4a}$$

$$\phi_1 = 2\pi \frac{l_{AB}}{\lambda}, \phi_2 = 2\pi \frac{l_{ACB}}{\lambda} + \pi \tag{4b}$$

It is supposed here that the electromagnetic wave emitted from the transmission point A is a spherical wave. Therefore, when the optical path length from the transmission point A is denoted by l, the energy density of the electromagnetic wave is attenuated in proportion to $1/l^2$. Therefore, when the time averages of the energy densities of the p-polarized electromagnetic wave and the s-polarized electromagnetic wave emitted from the transmission point A are respectively denoted by $\langle U_{p0} \rangle$ and $\langle U_{s0} \rangle$, $\langle U_{1p} \rangle$, $\langle U_{1s} \rangle$, $\langle U_{2p} \rangle$, and $\langle U_{2s} \rangle$ are expressed as follows.

[Math. 5]

$$\langle U_{1p} \rangle = \frac{\langle U_{p0} \rangle}{l_{AB}^2}, \langle U_{1s} \rangle = \frac{\langle U_{s0} \rangle}{l_{AB}^2} \tag{5a}$$

$$\langle U_{2p} \rangle = R_p \frac{\langle U_{p0} \rangle}{l_{ACB}^2}, \langle U_{2s} \rangle = R_s \frac{\langle U_{s0} \rangle}{l_{ACB}^2} \tag{5b}$$

Here, $R_p$ and $R_s$ respectively denote the strength reflectivities of p-polarization and s-polarization on the water surface and are expressed as follows when the refractive index of water is denoted by n (n=8.94 at a frequency 2.4 GHz (water temperature 10° C.)).

[Math. 6]

$$R_p = \frac{\left| n^2 \cos\theta_C - \sqrt{n^2 - \sin^2\theta_C} \right|^2}{\left| n^2 \cos\theta_C + \sqrt{n^2 - \sin^2\theta_C} \right|^2} \tag{6a}$$

$$R_s = \frac{\left| \cos\theta_C - \sqrt{n^2 - \sin^2\theta_C} \right|^2}{\left| \cos\theta_C + \sqrt{n^2 - \sin^2\theta_C} \right|^2} \tag{6b}$$

Figure 5:
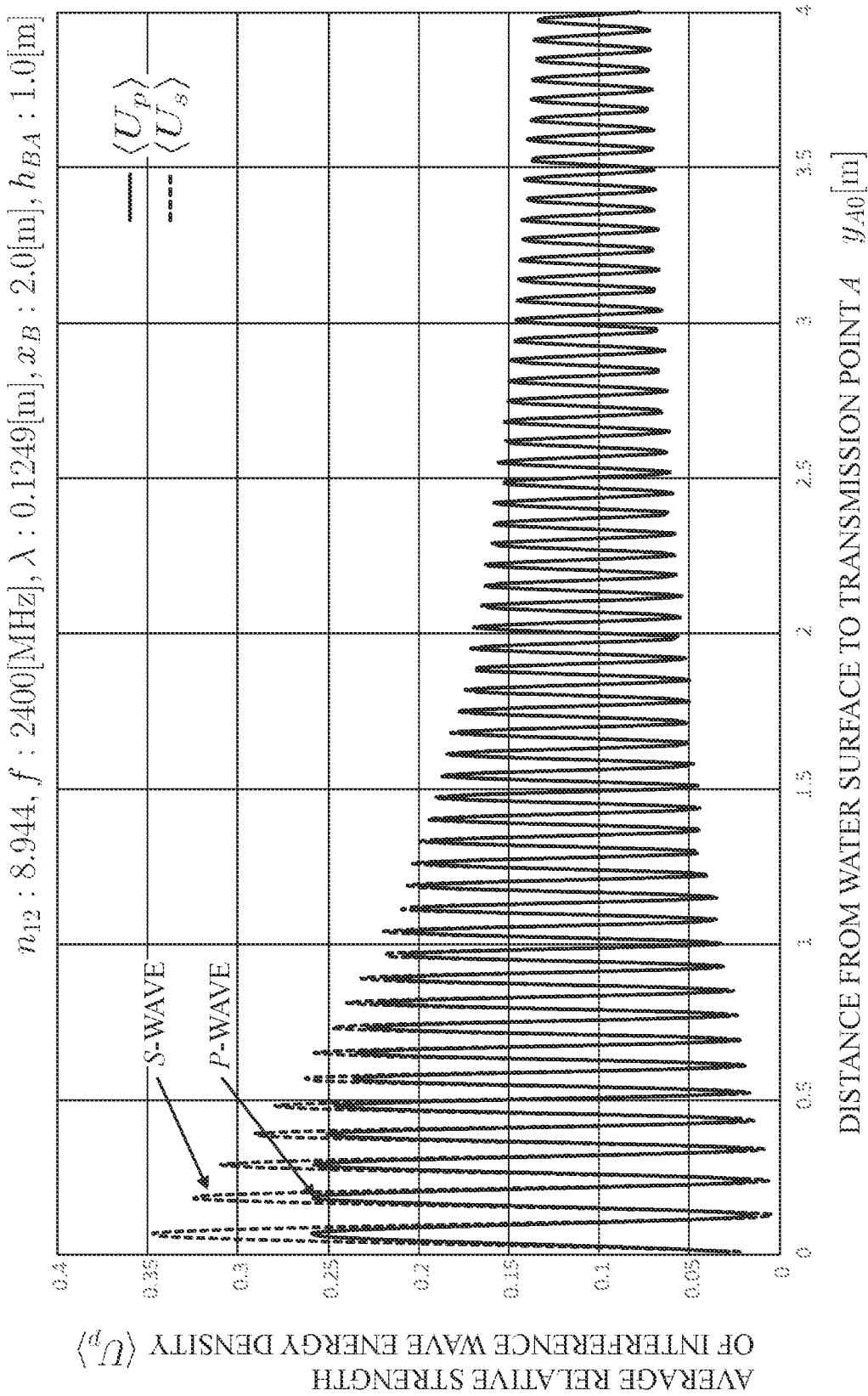
FIG. 5 illustrates results of calculating relationships between the time averages $U_{EP}^{(ave)}$ and $U_{ES}^{(ave)}$ of the relative energy densities of electric field components of an electromagnetic wave received at the reception point B and the height $y_{A0}$ of a water surface.
Figure 6:
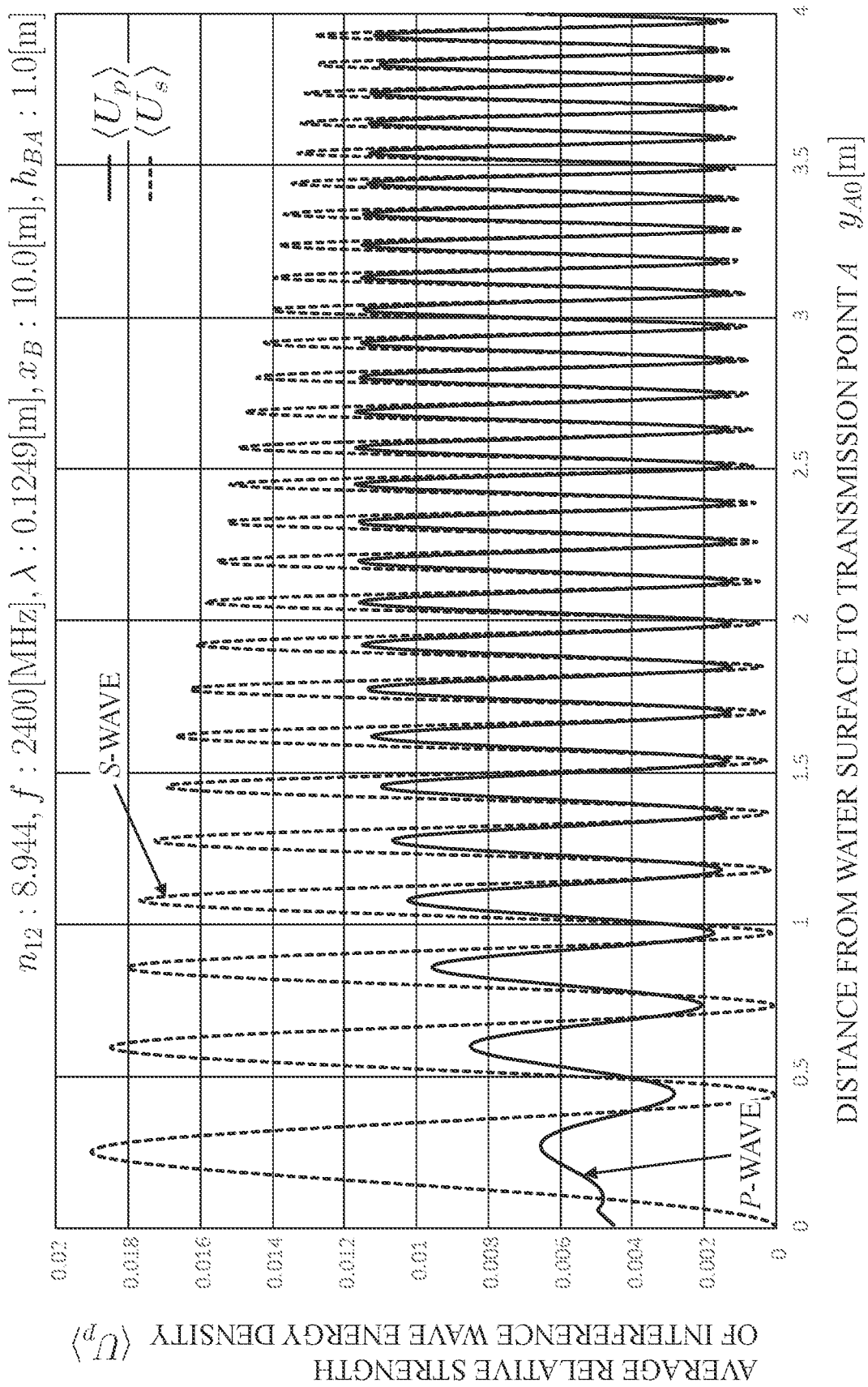
FIG. 6 illustrates results of calculating relationships between the time averages $U_{EP}^{(ave)}$ and $U_{ES}^{(ave)}$ of the relative energy densities of electric field components of an electromagnetic wave received at the reception point B and the height $y_{A0}$ of a water surface.

When the above expressions are used to calculate relationships between the height of the water surface $y_{A0}$ and the time averages $\langle U_p \rangle$ and $\langle U_s \rangle$ of the relative energy densities of the electric field components of the electromagnetic wave received at the reception point B (values each obtained by dividing the electric field energy density at the reception point B by the electric field energy density at the transmission point A), the results are as illustrated in FIG. 5 and FIG. 6. Here, $h_{BA}=1$ m is assumed, and $x_B=2.0$ m is assumed in FIG. 5 and $x_B=10$ m is assumed in FIG. 6. According to FIG. 5 and FIG. 6, as the water surface comes closer the transmission point A, interference between the direct wave and the reflected wave becomes large, and therefore, oscillation of the relative energy densities of the electric field components of the electromagnetic wave received at the reception point B caused by changes in $y_{A0}$ becomes large. In actuality, the water surface oscillates in a pseudo random manner, and therefore, as the water surface comes closer to the transmission point A, a phenomenon is observed in which the variance of the reception strength of the electromagnetic wave at the reception point B increases.

Although the above consideration is of a case where the water surface is supposed to be a still water surface, in actuality, the water surface is choppy. Accordingly, a water surface having a wave is considered next. Although the actual water surface extends in three dimensions, only simple qualitative evaluation is made here, and only a vertical plane (hereinafter referred to as "reflection plane") that includes the transmission point and the reception point is considered.

Figure 7:
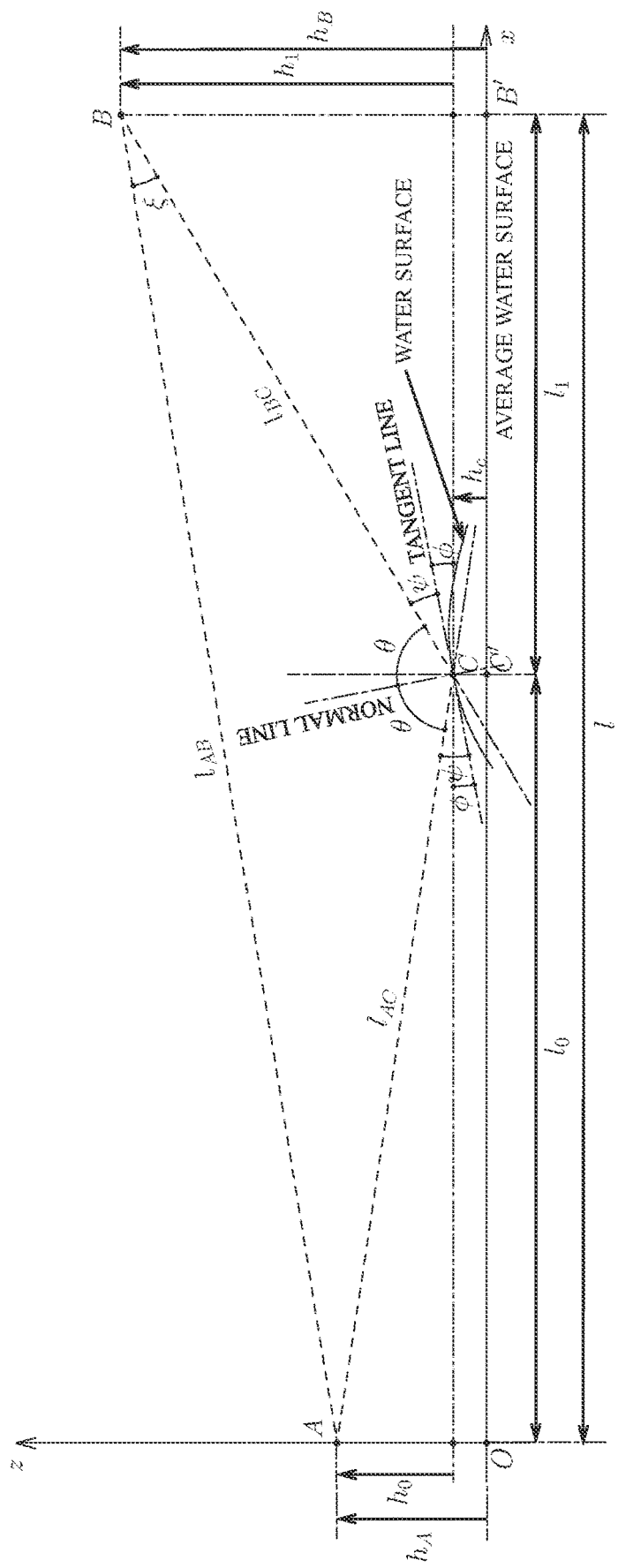
FIG. 7 is a diagram illustrating propagation paths of an electromagnetic wave in a reflection plane for a water surface having a wave.

FIG. 7 is a diagram illustrating propagation paths of the electromagnetic wave in the reflection plane for a water surface having a wave. In FIG. 7, a case is considered where the electromagnetic wave is transmitted from the transmission point A toward the reception point B. An x axis is set on a horizontal plane that includes an average water surface (the horizontal plane on the average water level), a z axis is set in a vertical upward direction, and an origin O is set at the foot of a perpendicular line from the transmission point A to the x axis. It is assumed that the electromagnetic wave takes the path AB along which the electromagnetic wave from the transmission point A directly reaches the reception point B and also takes the path ACB along which the electromagnetic wave from the transmission point A is reflected at the reflection point C on the water wave surface and reaches the reception point B. The angle made by a tangent line of the water wave surface at the reflection point C and the horizontal plane is denoted by φ, the angle made by the tangent line and the path AC and the angle made by the tangent line and the path CB are denoted by ψ, and the angle made by a line normal to the water wave surface at the reflection point C and the path AC and the angle made by the normal line and the path CB are denoted by θ. θ indicates the angles of incidence and reflection of the electromagnetic wave at the reflection point C. The foot of a perpendicular line from the reflection point C to the x axis is indicated by C', and the foot of a perpendicular line from the reception point B to the x axis is indicated by B'. The lengths of respective parts are defined as OA=$h_A$, B'B=$h_B$, C'C=$h_C$, OB'=l, OC'=$l_0$, C'B'=$l_1$, AB=$l_{AB}$, AC=$l_{AC}$, and CB=$l_{CB}$. The height of the transmission point A and that of the reception point B relative to the reflection point C are respectively expressed as $h_0=h_A-h_C$ and $h_1=h_B-h_C$. At this time, the angles of incidence and reflection θ are expressed as follows.

[Math. 7]

$$\theta = \arccos\left[\sqrt{\frac{K_1 + \sqrt{K_1^2 - 4K_2 K_0}}{2K_2}}\right] \tag{7a}$$

$$K_2 = l^2 + (h_1 + h_0)^2 > 0 \tag{7b}$$

$$K_1 = (h_1 + h_0)^2 + 2l^2 \sin^2\phi - 2l\alpha \tag{7c}$$

$$K_0 = (\alpha - l\sin^2\phi)^2 \tag{7d}$$

$$\alpha = (h_1 - h_0)\sin\phi\cos\phi \tag{7e}$$

The path length $l_{AB}$ of the path AB and the path length $l_{ACB}$, of the path ACB are respectively expressed as follows.

[Math. 8]

$$l_{AB} = \sqrt{l^2 + (h_1 - h_0)^2} \tag{8a}$$

$$l_{ACB} = \sqrt{l_0^2 + h_0^2} + \sqrt{l_1^2 + h_1^2} \tag{8b}$$

$$l_0 = h_0 \tan(\theta + \phi) \tag{8c}$$

$$l_1 = h_1 \tan(\theta - \phi) = l - l_0 \tag{8d}$$

The phase difference of the electromagnetic wave (reflected wave) w(ACB) emitted from the transmission point A, passing through the path ACB, and reaching the reception point B relative to the electromagnetic wave (direct wave) w(AB) emitted from the transmission point A, passing through the path AB, and reaching the reception point B is denoted by $\Delta\Phi$. Taking into consideration that the phase is shifted by $\pi$[rad] at the reflection point C, the phase difference $\Delta\Phi$ is expressed as follows. Here, $\lambda$ denotes the wavelength of the electromagnetic waves, $\omega$ denotes each frequency of the electromagnetic waves, and c denotes the speed of light.

[Math. 9]

$$\Delta\Phi = \frac{l_{ACB} - l_{AB}}{\lambda} + \pi \tag{9a}$$

$$\lambda = \frac{c}{f} = \frac{2\pi c}{\omega} \tag{9b}$$

Therefore, the reception strength $I_B$ of the electromagnetic wave received at the reception point B is expressed as follows. Here, $I_{AB}$ denotes the strength of the direct wave w(AB) at the reception point B, $I_{ACB}$ denotes the strength of the reflected wave w(ACB) at the reception point B, $R(\theta)$ denotes the strength reflectivity expressed by expression (6a) or expression (6b), $I_0$ denotes the strength of the electromagnetic wave transmitted from the transmission point A, and $\cos \xi$ denotes a direction cosine between a path vector (AB) and a path vector (CB).

[Math. 10]

$$I_B = \frac{1}{2}\left[I_{AB} + I_{ACB} + \sqrt{I_{AB} I_{ACB}}(1 + \cos\xi)\cos\Delta\Phi\right] \tag{10a}$$

$$I_{AB} = \frac{I_0}{l_{AB}^2} \tag{10b}$$

$$I_{ACB} = R(\theta)\frac{I_0}{l_{ACB}^2} \tag{10c}$$

$$\cos\xi = \frac{\overrightarrow{AB}}{|\overrightarrow{AB}|} \cdot \frac{\overrightarrow{CB}}{|\overrightarrow{CB}|} = \frac{l_1 l + h_1(h_1 - h_0)}{l_{AB} l_{BC}} \tag{10d}$$

Although motion of the actual water wave surface is extremely complex, the water wave surface is simply approximated by a sinusoidal wave here, the amplitude of the water wave is denoted by $h_w$, the wavelength is denoted by $\lambda_w$, the angular frequency is denoted by $\omega_w$, and the height $h_C$ of the reflection point is expressed as follows. Here, t denotes time, $x_C$ denotes the x coordinate of the reflection point C, and $x_C = l_0$ holds.

[Math. 11]

$$h_C = h_w \sin\left(2\pi \frac{x_C}{\lambda_w} - \omega_w t\right) \tag{11}$$

Here, for a usual water wave surface, $\lambda_W = k_W \cdot 2\pi \text{th}_W$ ($k_W = 1$ to 1.5) holds approximately. The tangent of the angle of inclination $\phi$ of the tangent line at the reflection point C is obtained by partially differentiating expression (11) with respect to $x_C$. As a result, the angle of inclination $\Phi$ of the tangent line is expressed as follows.

[Math. 12]

$$\phi = \arctan\left[2\pi\frac{h_w}{\lambda_w}\cos\left(2\pi\frac{x_C}{\lambda_w} - \omega_w t\right)\right] \tag{12}$$

Here, time t is an arbitrary variable, and therefore, $\xi = 2\pi x_C/\lambda_W - \omega_W t$ is also an arbitrary variable. Then, $(h_C, \phi)$ is regarded as a function of the arbitrary variable $\xi$ and expressed as follows.

[Math. 13]

$$h_C(\xi) = h_w \sin\xi \tag{13a}$$

$$\phi(\xi) = \arctan\left[2\pi\frac{h_w}{\lambda_w}\cos\xi\right] \tag{13b}$$

Then, a series of processes below is repeatedly performed.

(i) First, $\xi$ is generated as a uniform random number in a range $[0, 2\pi)$ to determine $(h_C, \phi)$.

(ii) Next, from the generated $(h_C, \phi)$, the angles of incidence and reflection $\theta$ are determined by using expression (7a).

(iii) Next, from $(\phi, \theta)$, the reflection path length $l_{ACB}$ is determined by using expression (8b).

(iv) Next, from $l_{ACB}$, the phase difference $\Delta\Phi$ is determined by using expression (9a).

(v) Last, from $(l_{ACB}, \Delta\Phi)$, the reception strength $I_B$ of the electromagnetic wave is determined by using expression (10a).

The distribution of the reception strength $I_B$ of the electromagnetic wave is calculated with the Monte Carlo method. In this calculation, it is supposed that the probability of the occurrence of a case where reflected waves in two or more different paths simultaneously interfere is low, and such a case is not taken into consideration.

FIG. 8 includes diagrams illustrating results of calculating (a) a probability distribution function $f_{hC}(h_C)$ of the height $h_C$ of the reflection point C and (b) a probability distribution function $f_{IB}(I_B/I_0)$ of the relative reception strength $I_B/I_0$ at the reception point B in a case where the water surface has a wave. In calculation for FIG. 8(b), an S-wave is used. In calculation for FIG. 8(b), constants are set as follows: the specific refractive index of water $n_r = 8.944$, the horizontal distance between the transmission point and the reception point $l = 10$ m, the height of the transmission point $h_A = 0.5$ m, the height of the reception point $h_B = 1.0$ m, the water wave amplitude $h_W = 0.1$ m, the water wave wavelength $\lambda_W = 1.5 \times 2\pi h_W = 0.942$ m, and the frequency of the electromagnetic wave $f = 2.0$ GHz. Monte Carlo calculation is performed 10,000,000 times. As described above, the water wave surface is approximated by a sinusoidal wave, and therefore, the probability distribution function $f_{h_C}(h_C)$ of $h_C$ becomes an arc sine distribution function as illustrated in FIG. 8(a). A probability distribution function $f_{I_B}(I_B)$ of the reception strength $I_B$ reflects the probability distribution function $f_{h_C}(h_C)$.

Figure 9:
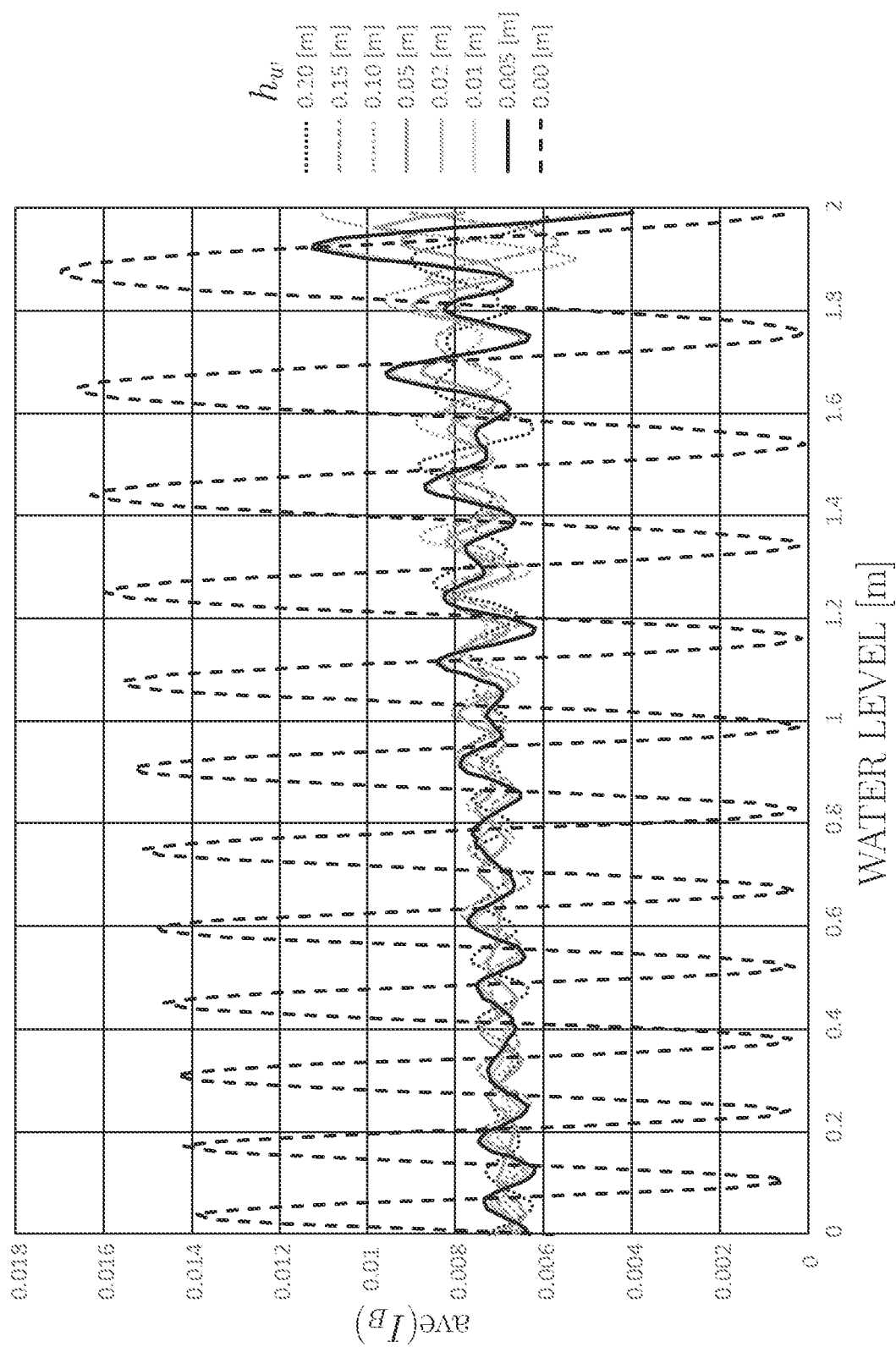
FIG. 9 is a diagram illustrating a result of calculating changes in an average relative reception strength ave $(I_B/I_0)$ (S-wave) associated with changes in a water level.
Figure 10:
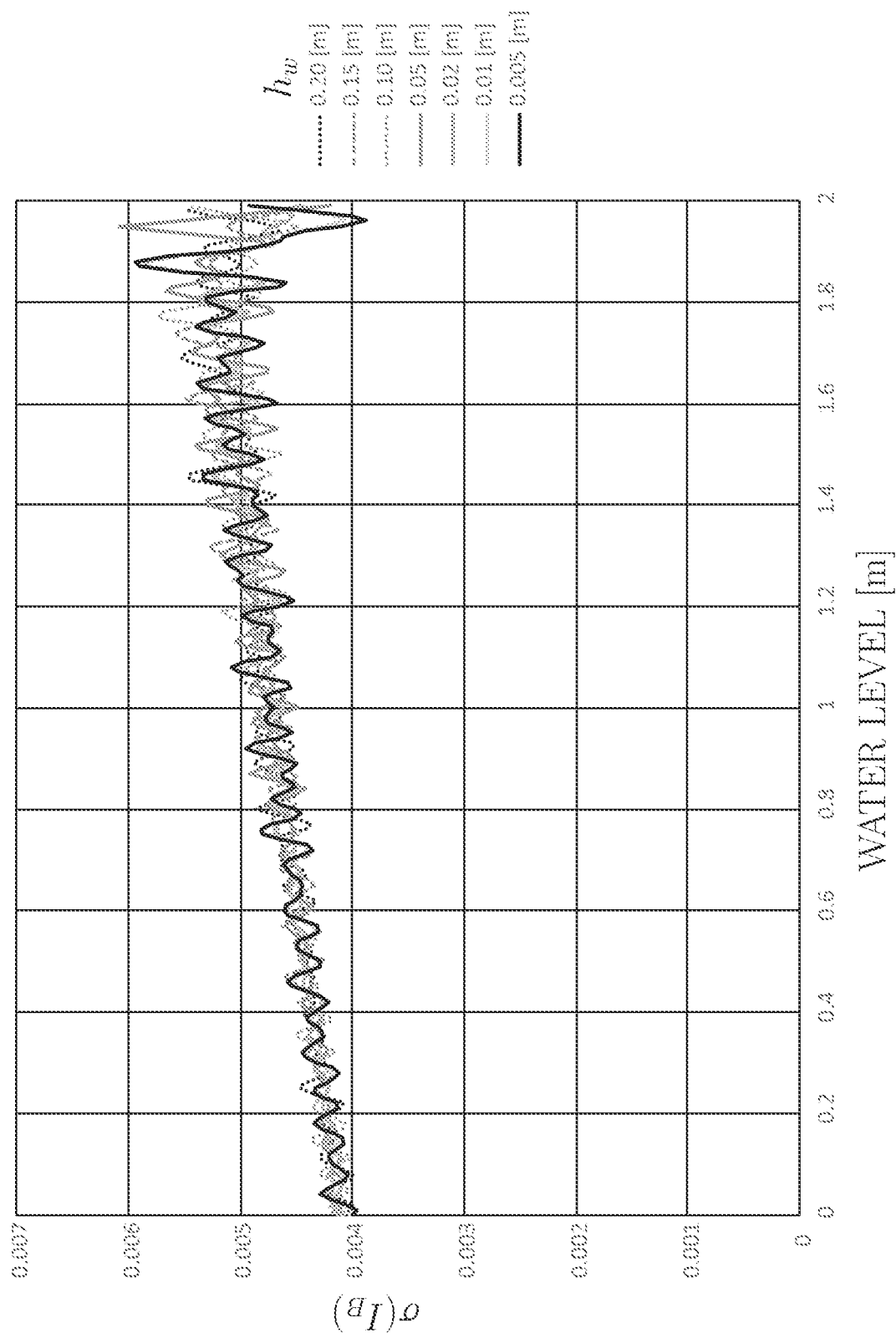
FIG. 10 is a diagram illustrating a result of calculating changes in the standard deviation $\sigma(I_B/I_0)$ (S-wave) of a relative reception strength associated with changes in a water level.

FIG. 9 is a diagram illustrating a result of calculating changes in the average ave($I_B/I_0$) of the relative reception strength $I_B/I_0$ associated with changes in the water level. FIG. 10 is a diagram illustrating a result of calculating changes in the standard deviation $\sigma(I_B/I_0)$ of the relative reception strength $I_B/I_0$ associated with changes in the water level. In calculation for FIG. 9 and FIG. 10, an S-wave is used. In FIG. 9 and FIG. 10, constants are set as follows: the specific refractive index of water $n_r$=8.944, the horizontal distance between the transmission point and the reception point l=10 m, the height of the transmission point $h_A$=2.0 m, the height of the reception point $h_B$=5.0 m, the water wave wavelength $\lambda_W$=1.5×2π$h_W$, and the frequency of the electromagnetic wave f=2.0 GHz. Monte Carlo calculation is performed 200,000 times for each water level point. The "water level" represented by the horizontal axis is the height of the average water surface (z coordinate). In FIG. 9 and FIG. 10, when the water level reaches 2.0 m, the average water surface reaches the height $h_A$ of the transmission point A. From FIG. 9, it is observed that as the amplitude $h_W$ of the water surface wave increases, the variance of the path length $l_{ACB}$ of the reflected wave increases, and therefore, the variance of the phase difference $\Delta\Phi$ of the reflected wave increases, and an effect of interference of the reflected wave appearing in the relative reception strength $I_B/I_0$ tends to become smaller. The magnitude of the variation amplitude of the average ave($I_B/I_0$) of the relative reception strength $I_B/I_0$ caused by interference and the standard deviation $\sigma(I_B/I_0)$ of the relative reception strength $I_B/I_0$ tend to increase as the water level comes closer to the transmission point.

The above is consideration of a case where one direct wave interferes with one reflected wave at the reception point. Next, a case is considered where an electromagnetic wave emitted from the transmission point directly reaches the reception point and where reflected waves reflected at a plurality of reflection points cause multiple-interference at the reception point. In actuality, the water surface extends in three dimensions, and therefore, a general discussion needs to be made for a three-dimensional space. However, an object here is to make a simple qualitative study on a desk, and reflection and interference of electromagnetic waves within a vertical plane S that includes the transmission point and the reception point are studied.

Figure 11:
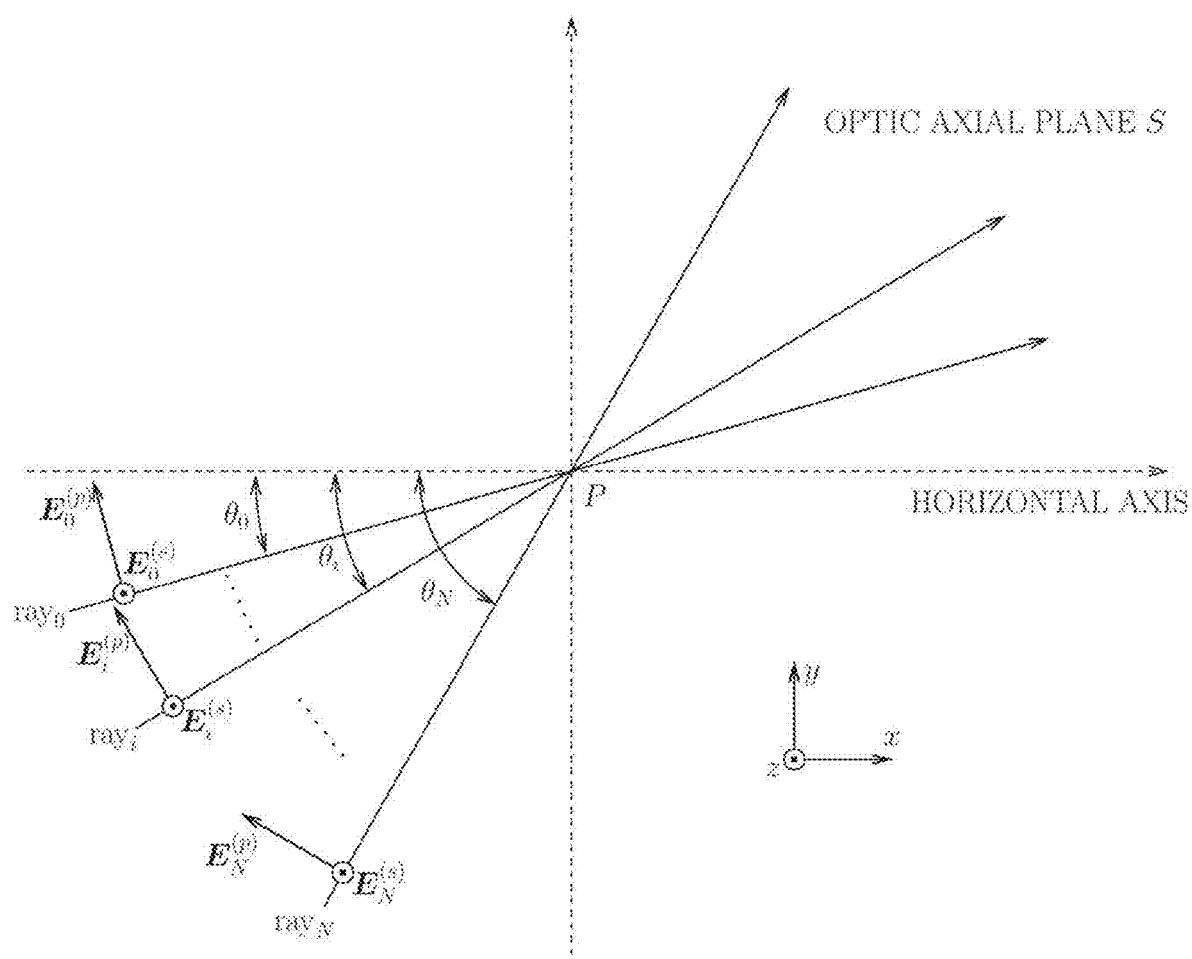
FIG. 11 is a diagram illustrating a state where electromagnetic waves are incident on a point P in a plurality of directions.

As illustrated in FIG. 11, a case where electromagnetic waves having the same frequency in (N+1) directions are incident on a certain point P in a space and interfere with each other is considered. The electromagnetic waves incident on the point P are $ray_0$, $ray_1$, . . . , $ray_N$. It is assumed that all of the electromagnetic waves $ray_0$, $ray_1$, . . . , $ray_N$ are on the same plane S, and the plane S is called an optic axial plane. The electric field of a component (P-polarized component) of an electromagnetic wave $ray_i$ (i=0, . . . , N) is denoted by $E_i^{(p)}$, and the magnetic field thereof is denoted by $H_i^{(p)}$, the electric field being within the optic axial plane S and the magnetic field being perpendicular to the optic axial plane S. The electric field of a component (S-polarized component) of an electromagnetic wave $ray_i$ (i=0, . . . , N) is denoted by $E_i^{(s)}$, and the magnetic field thereof is denoted by $H_i^{(s)}$, the electric field being perpendicular to the optic axial plane S and the magnetic field being within the optic axial plane S. The angle made by the optic axis of the electromagnetic wave $ray_i$ (i=0, . . . , N) and the horizontal line is denoted by $\theta_i$.

First, the P-polarized components are considered. The electric field and the magnetic field of each of the P-polarized components of the electromagnetic waves $ray_0$, $ray_1$, . . . , $ray_N$ are respectively expressed as follows.

[Math. 14]

$$E_0^{(p)} = i_0 E_0^{(p)} \cos(\omega t + \phi_0), \quad H_0^{(p)} = i_z H_0^{(p)} \cos(\omega t + \phi_0) \quad (14)$$
$$E_1^{(p)} = i_1 E_1^{(p)} \cos(\omega t + \phi_1), \quad H_1^{(p)} = i_z H_1^{(p)} \cos(\omega t + \phi_1)$$
$$\vdots \qquad \vdots$$
$$E_i^{(p)} = i_i E_i^{(p)} \cos(\omega t + \phi_i), \quad H_i^{(p)} = i_z H_i^{(p)} \cos(\omega t + \phi_i)$$
$$\vdots \qquad \vdots$$
$$E_N^{(p)} = i_i E_N^{(p)} \cos(\omega t + \phi_N), \quad H_N^{(p)} = i_z H_N^{(p)} \cos(\omega t + \phi_N)$$

Here, the vectors $i_0$, . . . , $i_N$ are unit vectors within the optic axial plane S and in directions perpendicular to the optic axes of the electromagnetic waves $ray_0$, $ray_1$, . . . , $ray_N$ respectively, $i_z$ is a unit vector in a direction perpendicular to the optic axial plane 5, and $\phi_0$, . . . , $\phi_N$ are the phases of the electromagnetic waves $ray_0$, $ray_1$, . . . , $ray_N$ at the point P respectively. At this time, the electric field and the magnetic field of an interference wave at the point P are expressed as follows.

[Math. 15]

$$E^{(p)} = (E_x^{(p)}, E_y^{(p)}, 0), \quad H^{(p)} = (0, 0, H_z^{(p)}) \quad (15a)$$

$$E_x^{(p)} = \sum_{k=0}^{N} E_k^{(p)} \sin\theta_k [-\cos\phi_k \cos\omega t + \sin\phi_k \sin\omega t] \quad (15b)$$

$$E_y^{(p)} = \sum_{k=0}^{N} E_k^{(p)} \cos\theta_k [\cos\phi_k \cos\omega t - \sin\phi_k \sin\omega t] \quad (15c)$$

$$H_z^{(p)} = \sum_{k=0}^{N} H_k^{(p)} [\cos\phi_k \cos\omega t - \sin\phi_k \sin\omega t] \quad (15d)$$

The time averages $\langle U_E^{(p)} \rangle$ and $\langle U_H^{(p)} \rangle$ of the electric field energy $U_E^{(p)}$ and the magnetic field energy $U_H^{(p)}$ at the point P are calculated from the above as follows.

[Math. 16]

$$\langle U_E^{(p)} \rangle = \frac{1}{2}\epsilon_0 [\langle E_x^{(p)2} \rangle + \langle E_y^{(p)2} \rangle] \quad (16a)$$

$$= \frac{1}{4}\epsilon_0 \sum_{k=0}^{N} E_k^{(p)2} +$$

$$\frac{1}{2}\epsilon_0 \sum_{k \neq l}^{N} E_k^{(p)} E_l^{(p)} \cos(\theta_k - \theta_l)\cos(\phi_k - \phi_l)$$

-continued $$\langle U_H^{(p)} \rangle = \frac{1}{2}\mu_0 \langle H_s^{(p)2} \rangle \quad (16b)$$

$$= \frac{1}{4}\mu_0 \sum_{k=0}^{N} H_k^{(p)2} + \frac{1}{2}\mu_0 \sum_{k\neq l}^{N} H_k^{(p)} H_l^{(p)} \cos(\phi_k - \phi_l)$$

$$= \frac{1}{4}\epsilon_0 \sum_{k=0}^{N} E_k^{(p)2} + \frac{1}{2}\epsilon_0 \sum_{k\neq l}^{N} E_k^{(p)} E_l^{(p)} \cos(\phi_k - \phi_l)$$

Therefore, the time average $\langle U^{(p)} \rangle$ of the electromagnetic field energy $U^{(p)}$ of the P-polarized component at the point P is expressed as follows.

[Math. 17]

$$\langle U^{(p)} \rangle = \langle U_E^{(p)} \rangle + \langle U_H^{(p)} \rangle = \quad (17)$$

$$\frac{1}{2}\epsilon_0 \sum_{k=0}^{N} E_k^{(p)2} + \frac{1}{2}\epsilon_0 \sum_{k\neq l}^{N} E_k^{(p)} E_l^{(p)} (1+\cos(\theta_k-\theta_l))\cos(\phi_k-\phi_l) =$$

$$\frac{1}{2}\left[\sum_{k=0}^{N}\langle U_k^{(p)}\rangle + \sum_{k\neq l}^{N}\sqrt{\langle U_k^{(p)}\rangle\langle U_l^{(p)}\rangle}\,(1+\cos(\theta_k-\theta_l))\cos(\phi_k-\phi_l)\right]$$

Here, $\langle U_i^{(p)} \rangle$ (i=0, ..., N) is the time average energy of the P-polarized component of the electromagnetic wave ray$_i$ (that is, the strength $I_i^{(p)}$ of the P-polarized component of the electromagnetic wave ray$_i$ at the point P). Similar calculation can be performed also for the S-polarized component, and the time average $\langle U^{(s)} \rangle$ of the electromagnetic field energy $U^{(s)}$ of the S-polarized component at the point P is expressed as follows. Here, $\langle U_i^{(s)} \rangle$ (i=0, ..., N) is the time average energy of the S-polarized component of the electromagnetic wave ray$_i$ (that is, the strength $I_i^{(s)}$ of the P-polarized component of the electromagnetic wave ray$_i$ at the point P).

[Math. 18]

$$\langle U^{(s)} \rangle = \quad (18)$$

$$\frac{1}{2}\left[\sum_{k=0}^{N}\langle U_k^{(s)}\rangle + \sum_{k\neq l}^{N}\sqrt{\langle U_k^{(s)}\rangle\langle U_l^{(s)}\rangle}\,(1+\cos(\theta_k-\theta_l))\cos(\phi_k-\phi_l)\right]$$

Next, a case where an electromagnetic wave is transmitted from the transmission point A above a choppy water surface to the reception point B above the same water surface away from the transmission point A by a horizontal distance l is considered. The vertical plane S that includes the transmission point A and the reception point B is called "optic axial plane" or "reflection plane", and reflection and interference within the reflection plane S are considered. An x axis is set in the horizontal direction and a y axis is set in the vertical direction within the reflection plane S, and a z axis is set in a direction perpendicular to the reflection plane S. It is supposed that the water surface is translationally symmetric about the z direction. In a case where only the reflection plane S is considered, the water surface is expressed as a water surface curve $f_W(x, t)$ that oscillates within the reflection plane S. In a case where the electromagnetic wave is reflected on a choppy water surface, the angle of incidence and the angle of reflection relative to a line normal to the water surface are equal to each other at the reflection point C because of the law of reflection. That is, the median line between the incidence path and the reflection path at the reflection point C is perpendicular to the tangent line of the water surface curve $f_W(x_C, t)$ at the reflection point C. This is hereinafter referred to as "reflection condition". A path along which the electromagnetic wave emitted from the transmission point A is reflected on the water surface while satisfying the reflection condition and reaches the reception point B is called "reflection path".

Figure 12:
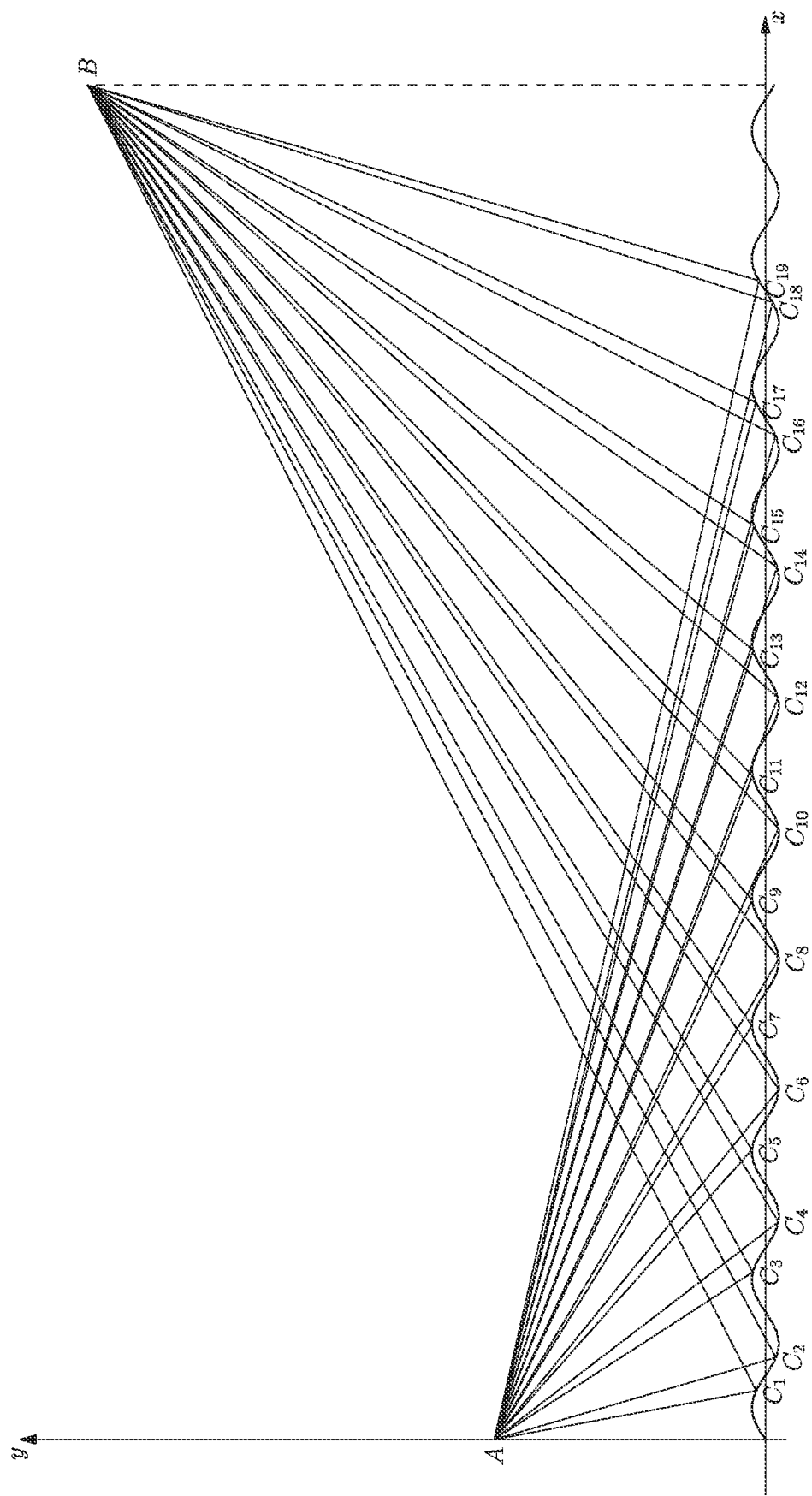
FIG. 12 is a diagram illustrating example multiple-interference caused by reflection on a choppy water surface.
Figure 13:
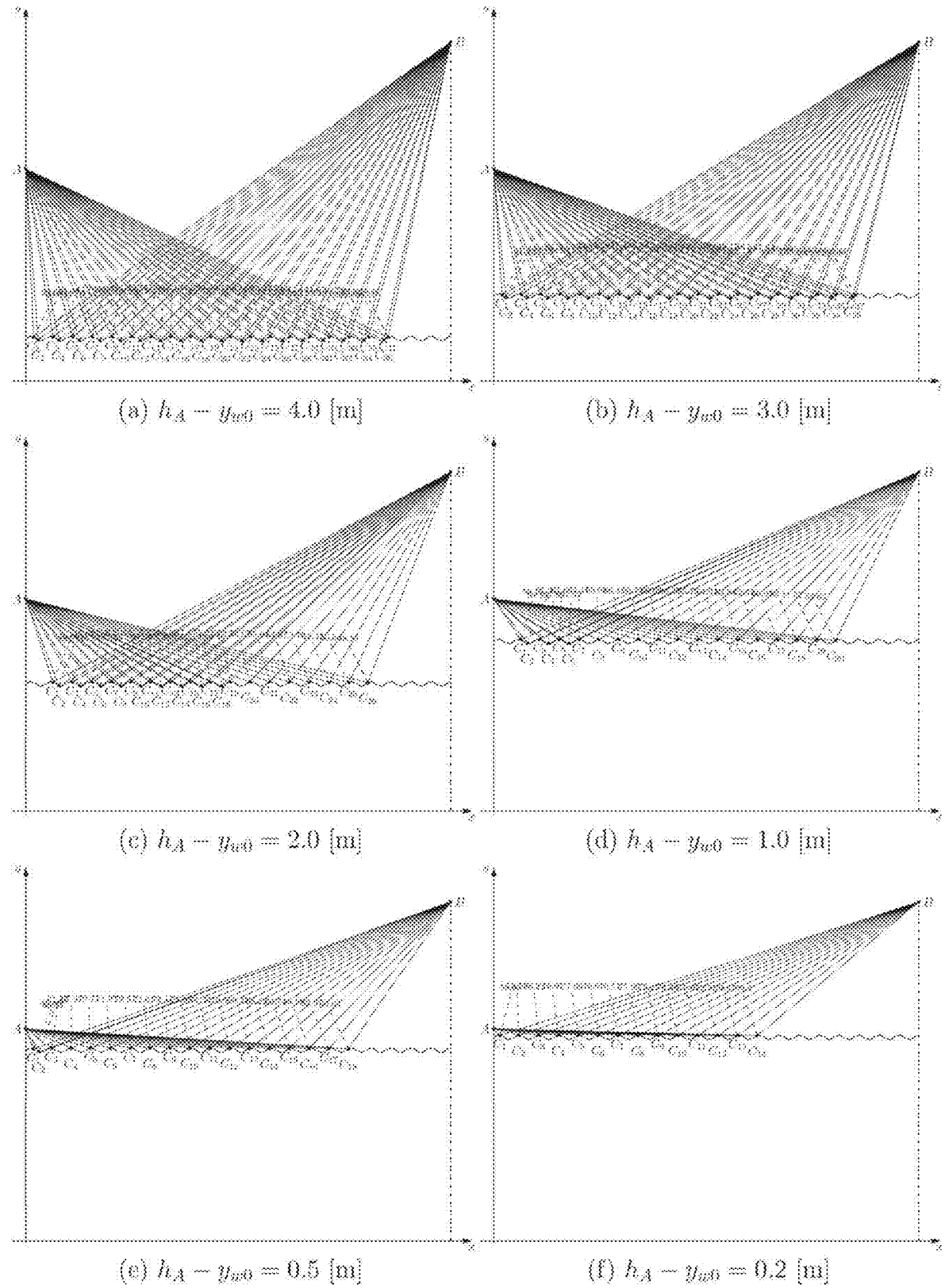
FIG. 13 includes diagrams illustrating states of changes in the number of significant reflection paths associated with changes in a water level.
Figure 14:
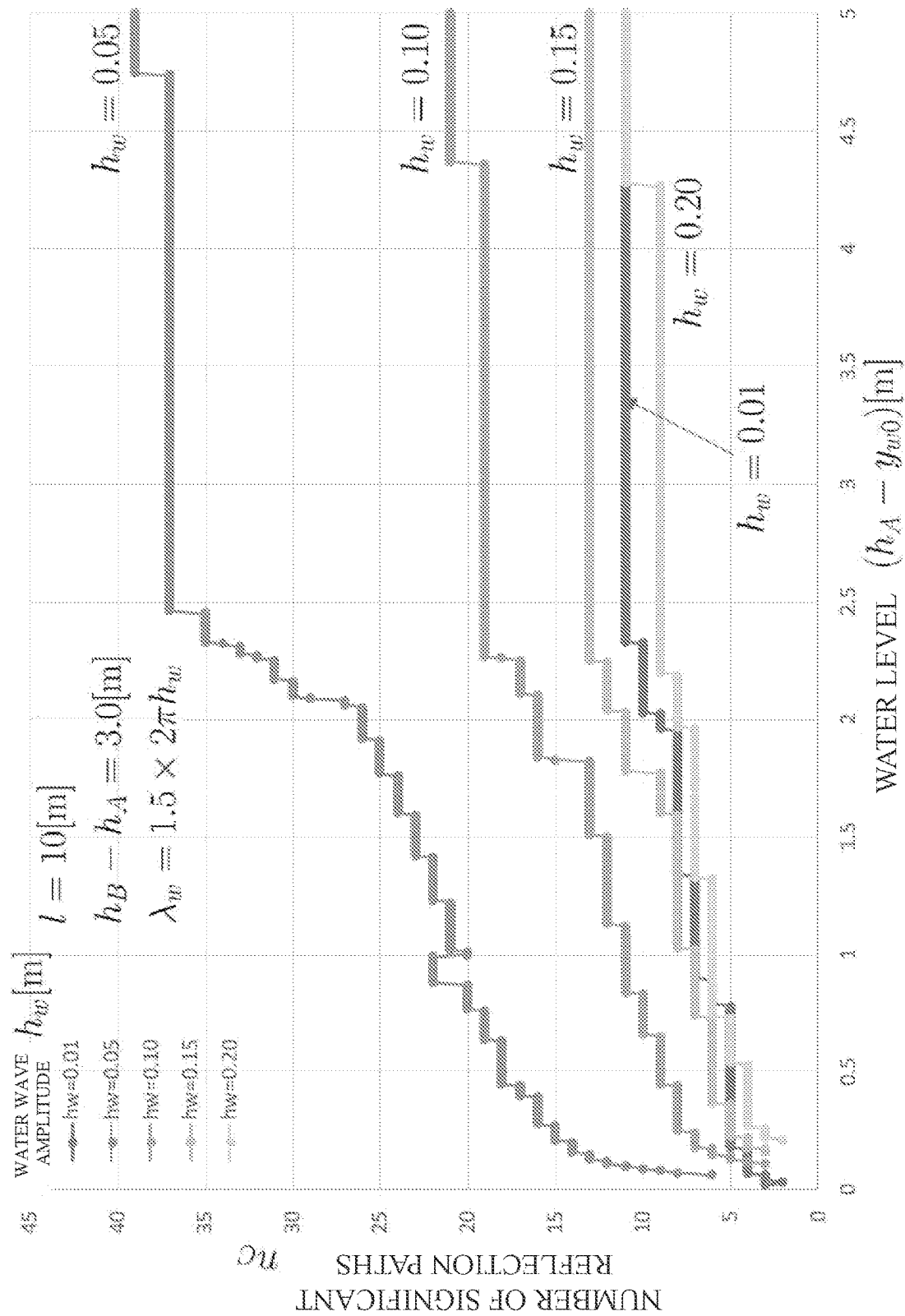
FIG. 14 is a diagram illustrating a relationship between a water level and the number of significant reflection paths.

The water surface curve $f_W(x, t)$ that oscillates within the reflection plane S is a function that oscillates with respect to x, and therefore, a plurality of reflection paths are present in general. Reflected waves that pass through the plurality of reflection paths and a direct wave that directly reaches the reception point B from the transmission point A cause multiple-interference at the reception point B and form an interference wave. FIG. 12 illustrates example multiple-interference caused by reflection on a choppy water surface. In FIG. 12, the water surface curve $f_W(x, t)$ is assumed to be a sinusoidal wave curve $f_W(x, t)=\sin(2\pi x/\lambda_W+\omega_0_W t)$ (t=0). In this case, nineteen reflection paths are present through each of which the electromagnetic wave emitted from the transmission point A is reflected on the water surface, satisfies the reflection condition, and reaches the reception point B. The reflection points in the respective reflection paths are indicated by $C_1, C_2, \ldots, C_{19}$ as illustrated in FIG. 12. Among the nineteen reflection paths, paths $AC_{12}$, $AC_{14}$, $AC_{16}$, and $AC_{18}$ cross the water surface curve $f_W(x, t)$, and therefore, it is not possible to take these reflection paths. A condition that "a reflection path does not cross the water surface curve" is called "non-crossing condition". That is, a reflection path, among the reflection paths from the transmission point A to the reception point B, satisfying the non-crossing condition is a "significant reflection path". Even in a case where the shape of the water surface curve $f_W(x, t)$ is the same, the number of significant reflection paths changes depending on the water level. This is because as the water surface comes closer to the transmission and reception points, the angle of incidence of a reflection path relative to a line normal to the water surface increases, and therefore, (1) the number of reflection paths that satisfy the reflection condition decreases, and (2) reflection paths are likely to cross the water surface and the number of reflection paths that satisfy the non-crossing condition also decreases. Specifically, when the water surface comes closer to the transmission and reception points at a distance of about several times the wave height of the water surface wave or less, the number of significant reflection paths $n_C$ sharply decreases. FIG. 13 illustrates states of changes in the number of significant reflection paths associated with changes in the water level. In FIG. 13, the water surface curve is assumed to be a sinusoidal wave curve $f_W(x, t)=h_W\cdot\sin(\omega_W t+2\pi x/\lambda_W+y_{w0})$, and time t is assumed to be fixed (t=0). Parameters are set such that the height of the transmission point A $h_A$=5.0 m, the height of the reception point B $h_B$=8.0 m, the water wave amplitude $h_W$=0.05 m, and the water wave wavelength $\lambda_W$=1.5×2π$h_W$=0.942 m, and the water level $y_{w0}$ is changed in a range of 0.2 to 4.0 m. FIG. 14 is a diagram illustrating a relationship between the water level ($h_A-y_{w0}$) and the number of significant reflection paths $n_C$.

The strengths $I_0^{(p)}$ ($=\langle U_0^{(p)}\rangle$) and $I_0^{(s)}$ ($=\langle U_0^{(s)}\rangle$) of the direct wave ray$_0$ that directly reaches the reception point B from the transmission point A and the strengths $I_i^{(p)}$ ($=\langle U_i^{(p)}\rangle$) and $I_i^{(s)}$ ($=\langle U_i^{(s)}\rangle$) of the reflected wave ray$_i$ (i=1, ..., $n_C$) at the reception point B for each significant reflection path are calculated by using expressions (5a) and (5b), and the strengths $I_B^{(p)}$ ($=\langle U^{(p)}\rangle$) and $I_B^{(s)}$ ($=\langle U^{(s)}\rangle$) of an interference wave at the reception point B are calculated by using expressions (17) and (18). The water wave curve varies in accordance with time t, and therefore, time t is changed only for one cycle $T=2\pi/\omega_W$ by an equal interval of step $\Delta t$, the strengths $I^{(p)}$ and $I^{(s)}$ of the interference wave at each time $t=\Delta t \cdot i$ are calculated, and the average and the variance are obtained. Accordingly, the average strength and the variance of the interference wave at each water level $(h_A-y_{w0})$ and for each water wave amplitude $h_W$ can be calculated. FIG. 15 illustrates relationships between the water level and the averages $ave(I_B/I_0)$ of the relative reception strength. FIG. 16 illustrates relationships between the water level and the standard deviations $\sigma(I_B/I_0)$ of the relative reception strength. In FIG. 15 and FIG. 16, constants are set as follows: the specific refractive index of water $n_r=8.944$, the horizontal distance between the transmission point and the reception point $l=10$ m, the height of the transmission point $h_A=2.0$ m, the height of the reception point $h_B=5.0$ m, the water wave wavelength $\lambda_W=1.5\times 2\pi h_W$, and the frequency of the electromagnetic wave $f=2.4$ GHz. The "water level" represented by the horizontal axis is the distance $(h_A-y_{w0})$ from the average water surface to the transmission point A. It is found from FIG. 15 that the average $ave(I_B/I_0)$ of the relative reception strength oscillates in association with changes in the water level $(h_A-y_{w0})$ for both P-polarization and S-polarization. This is as in a case where a direct wave and a single reflected wave interfere with each other. When the water level $(h_A-y_{w0})$ is about 0 to 1.5 m, the average $ave(I_B/I_0)$ of the relative reception strength tends to increase while oscillating. This is considered to be a reflection of a fact that, in this range, as the water level $(h_A-y_{w0})$ increases, the number of significant reflection paths $n_C$ sharply increases. This is because calculation performed this time is only for the reflection plane S and it is supposed that the water surface is translationally symmetric about a direction (z direction) perpendicular to the reflection plane S. For the actual three-dimensional water surface, it is considered that the number of significant reflection paths $n_C$ in the range increases more gradually.

(4) Test Results (4.1) Indoor Test

Figure 17A:
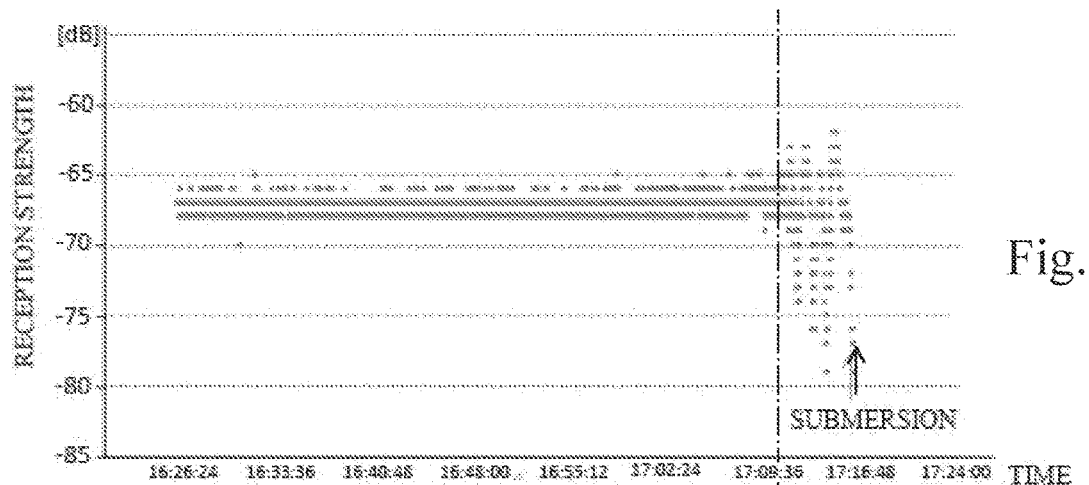
FIG. 17 illustrates results of measuring changes in a reception strength caused by changes in the distance between a transmission point A and a water surface by actually using an active beacon in a laboratory.
Figure 17B:
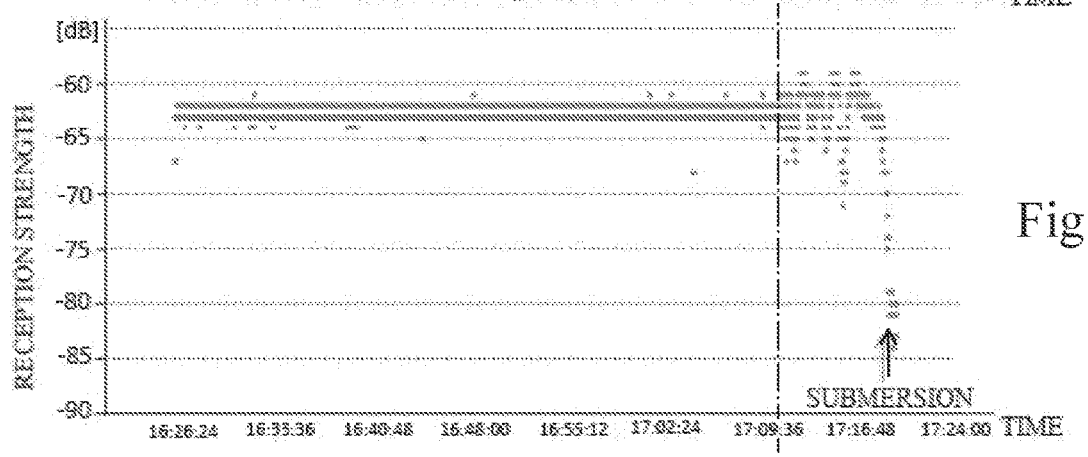
Figure 17C:
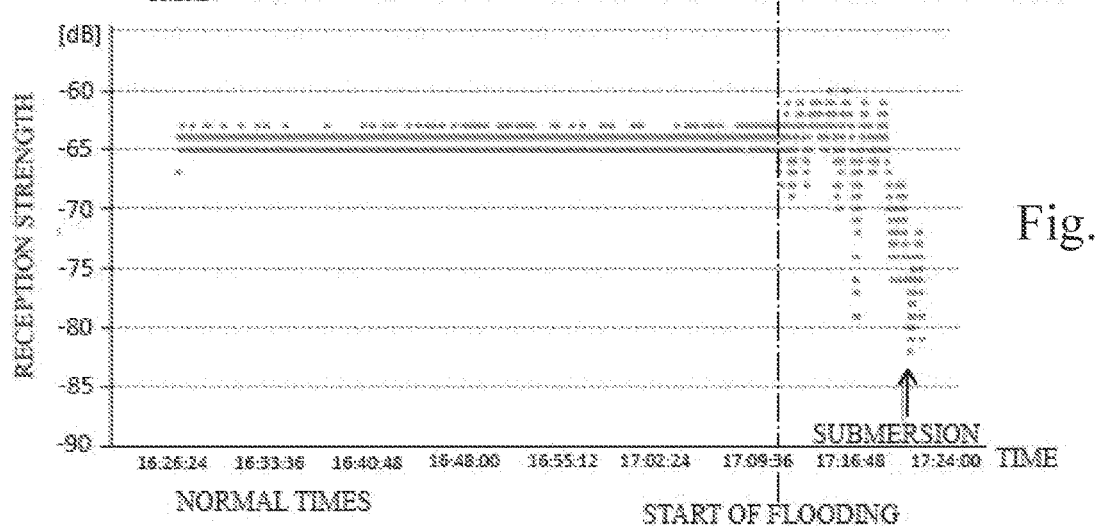

Now, the result of an experiment, performed by actually using a beacon (RF sensor) and a receiver, concerning changes in the reception state of a radio wave caused by a water surface is described. FIG. 17 illustrates results of measuring changes in a reception strength caused by changes in the distance between the transmission point A and a water surface by actually using an active beacon in a laboratory. In FIG. 17, the horizontal axis represents time, and the vertical axis represents the reception strength (dB). FIG. 18 is a diagram illustrating measurement conditions for measurement illustrated in FIG. 17. The measurement was performed by placing a pole in a water tank, placing active beacons at different heights at intervals of 125 cm, and observing, by a receiver outside the water tank, the reception strength of a signal transmitted from each beacon while pouring water into the water tank. The measurement results illustrated in FIGS. 17(a), 17(b), and 17(c) illustrate the reception strengths of signals from beacons (a), (b), and (c) in FIG. 18 respectively.

Figure 19:
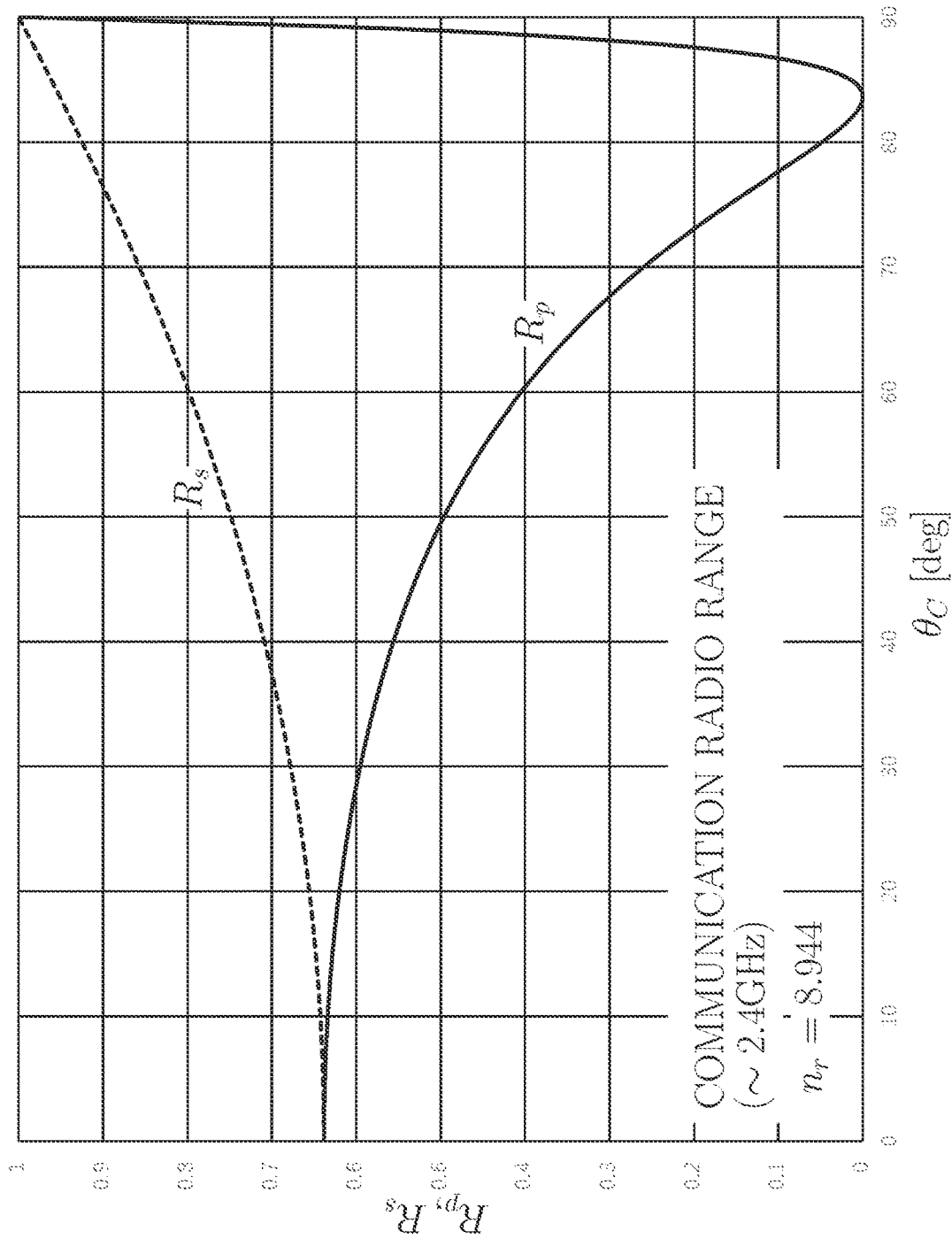
FIG. 19 is a diagram illustrating changes in the strength reflectivities $R_p$ and $R_s$ of water relative to an angle of incidence $\theta_C$ at a frequency f=2.4 GHz.

As illustrated in FIG. 17, when pouring of water into the water tank is started, the variance of the reception strength starts to increase. As the water surface comes closer to each beacon, the variance of the reception strength increases. It is understood that this is because as the water surface comes closer to each beacon, an effect of interference between the direct wave and the reflected wave propagating to the reception antenna from the beacon becomes large (FIG. 5 and FIG. 6) and the reception strength changes to a larger degree due to the ruffled water surface. As the water surface further comes closer to each beacon, the average of the reception strength starts to decrease gradually when the water surface comes close to the beacon at a distance of about 10 cm or less, and the number of effective received signals for sampling (the number of successfully received signals) starts to decrease. It is understood that this is because when the water surface comes very close to the beacon, the angle of incidence of the reflected wave on the water surface becomes closer to the Brewster's angle, and therefore, a p-polarized wave is less likely to be reflected, and the overall reception strength decreases accordingly. FIG. 19 is a diagram illustrating changes in the strength reflectivities $R_p$ and $R_s$ of water relative to an angle of incidence $\theta_C$ at a frequency $f=2.4$ GHz. It is found from FIG. 19 that at a frequency $f=2.4$ GHz, the Brewster's angle of reflection between air and water is about 84 degrees and that the reflectivity of the p-polarized wave sharply decreases when the angle of incidence $\theta_C$ exceeds about 60 degrees.

When the beacon is submerged, the reception strength sharply decreases. It is understood that this is because a radio wave emitted from the beacon under the water is reflected and refracted on the water surface. At a frequency $f=2.4$ GHz, the refractive index is large, and therefore, the angle of refraction of the electromagnetic wave incident on the water surface from under the water is about 90 degrees, and most of the refracted wave propagates along the water surface, and therefore, it is considered that the strength of the radio wave that reaches the reception antenna placed at a position away from the water surface decreases to a large degree. When the depth of the beacon under the water increases after submersion, a radio wave emitted from the beacon under the water is attenuated under the water to a large degree, and therefore, the reception strength further sharply decreases, resulting in interruption of communication.

Therefore, it is found that the start of flooding can be detected by observing, at the reception point (sensor communication antenna 11), an increase in the variance of the reception strength of a signal from the transmission point (RF sensor 2). It is also found that the transmission point (RF sensor 2) in close vicinity to the water surface or being submerged can be detected by observing a decrease in the average of the reception strength.

(4.2) External Environment Test I

Figure 20B:
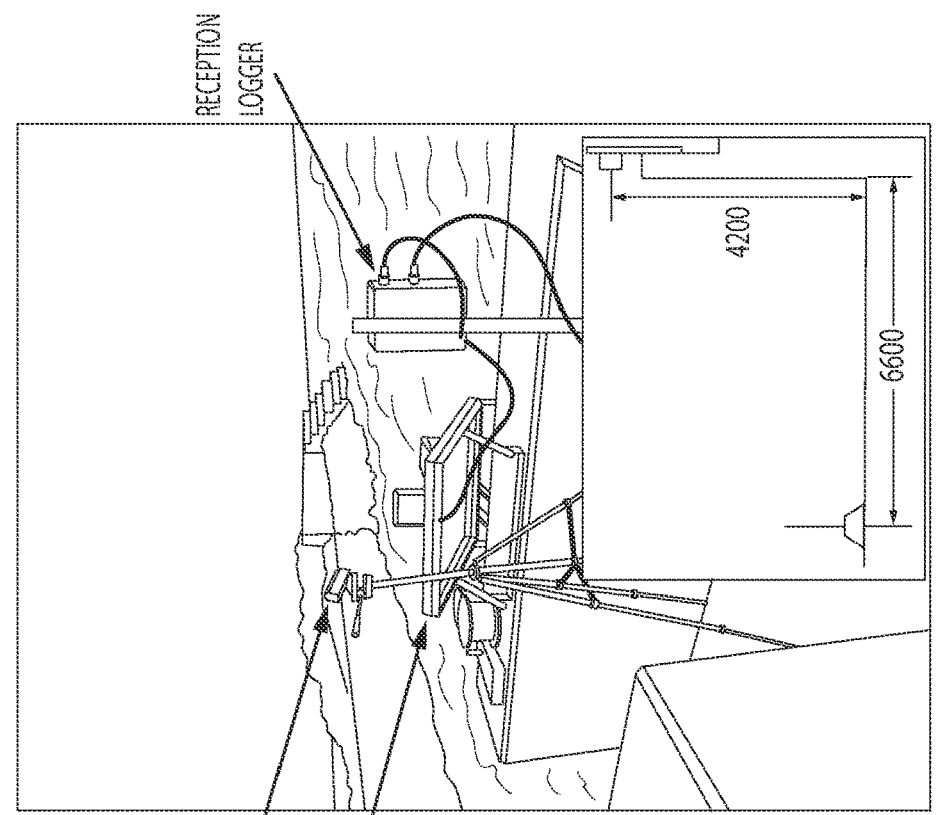
FIG. 20 includes photographs of the external appearance of a test system used in an external environment measurement test in an external environment test I.
Figure 20A:
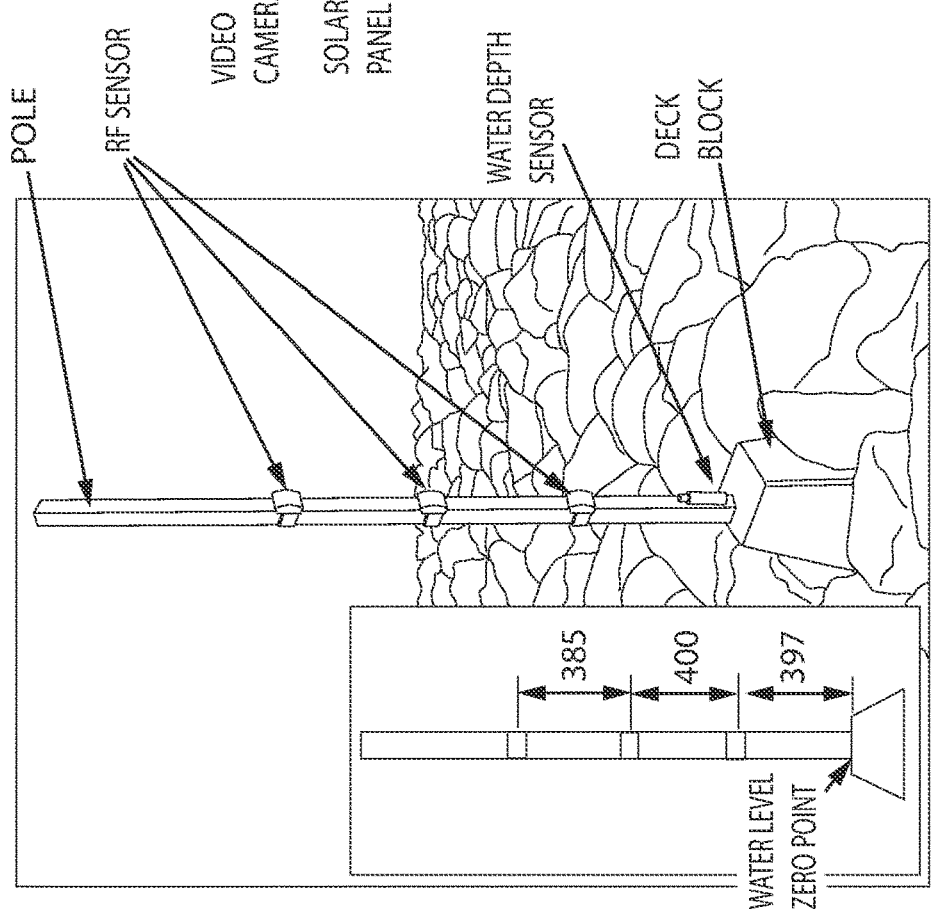

Now, the result of a test and measurement performed in an actual external environment is described. A test in an event, such as a swollen river or a flood, the occurrence frequency of which is extremely low, is practically difficult, and therefore, the external environment measurement test this time was performed by using the tides on the seashore. The external environment measurement test was performed in tidal flats in which tidal variation occurs. FIG. 20 includes photographs of the external appearance of a test system used in the external environment measurement test. FIG. 20(a) is a photograph showing the state of installation of the RF sensors 2, and FIG. 20(b) is a photograph showing the state of installation of a radio wave reception measurement system. A deck block was placed on the tidal flats, a pole was set upright on the deck block, and the RF sensors 2 were fixed to the pole at three positions at different heights. The heights from the top surface of the deck block to the respective RF sensors 2 were set to 39.7 cm, 79.7 cm, and 118.2 cm (see the small diagram on the bottom left of FIG. 20(a)). As the RF sensors 2, spontaneous-transmission-type RF sensors were used, and the RF sensors 2 were set so as to transmit a radio response signal every second. As the use frequency band of the radio response signal, a 2.4 GHz band was used, and setting was performed so as to perform communication based on spread spectrum communication. To measure the water depth at the time of reception of a radio response signal simultaneously with the reception, a water depth sensor was placed on the top surface of the deck block. The height from the ground of the tidal flats to the top surface of the deck block was set to about 20 cm, and therefore, in a case where the water level around the deck block exceeds 20 cm, the water depth is detected by the water depth sensor. The radio wave reception measurement system was placed on the bank of the seashore as illustrated in FIG. 20(b). The horizontal distance from the deck block to the reception antenna of the radio wave reception measurement system was set to 6.6 m, and the vertical distance from the ground of the tidal flats on which the deck block was placed to the reception antenna was set to 4.2 m. To allow reception of S-polarization with the highest sensitivity, the reception antenna was placed in an orientation in which the reception sensitivity of a radio wave having an electric field that oscillates in the horizontal direction is maximized. To simultaneously record the state of the actual water surface at the time of radio wave reception and measurement, a video camera was placed beside the reception antenna to shoot the surroundings of the RF sensors 2.

Figure 21:
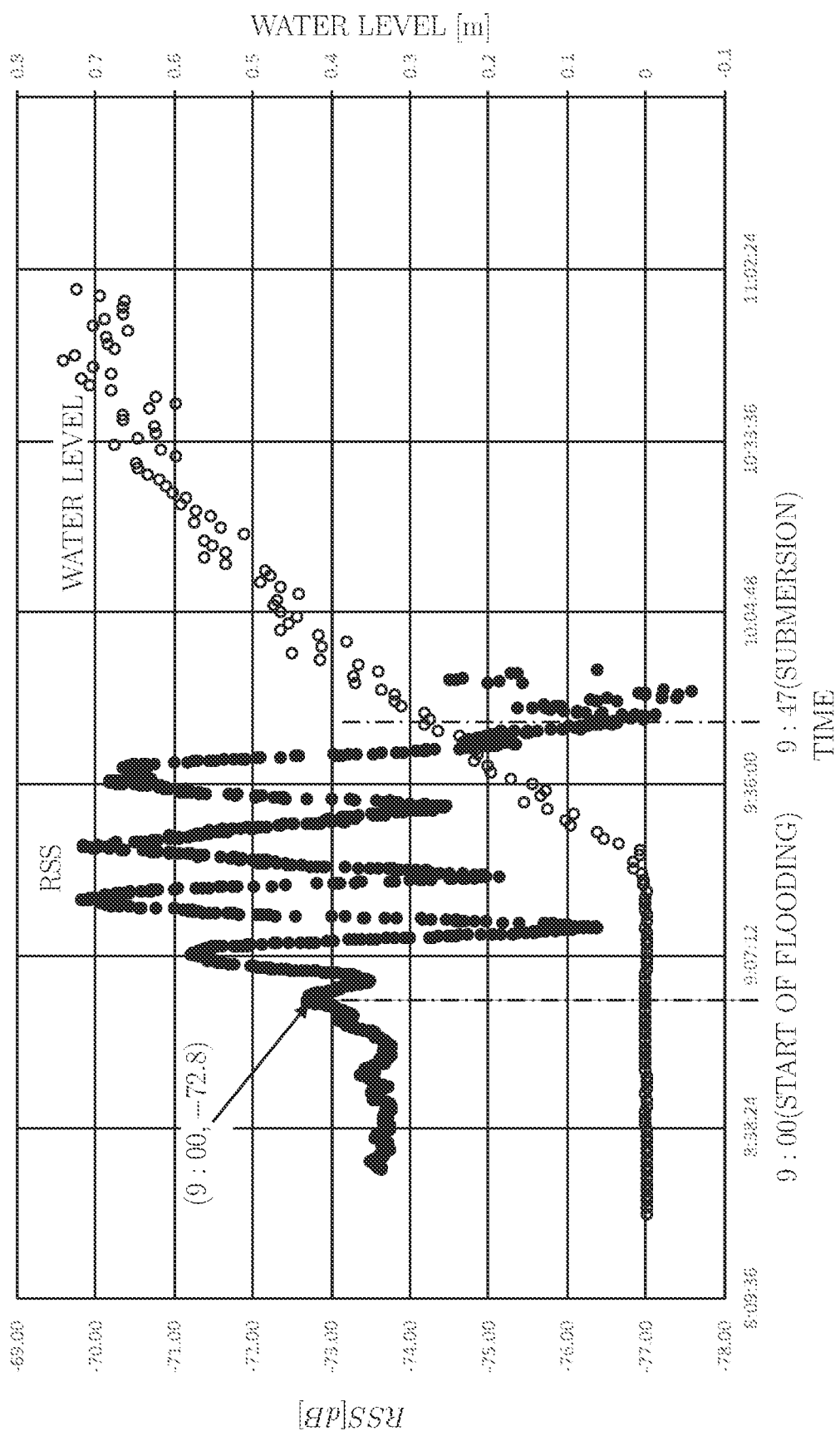
FIG. 21 is a diagram illustrating results of measuring a water level around RF sensors 2 in an external environment and an RSS.
Figure 22B:
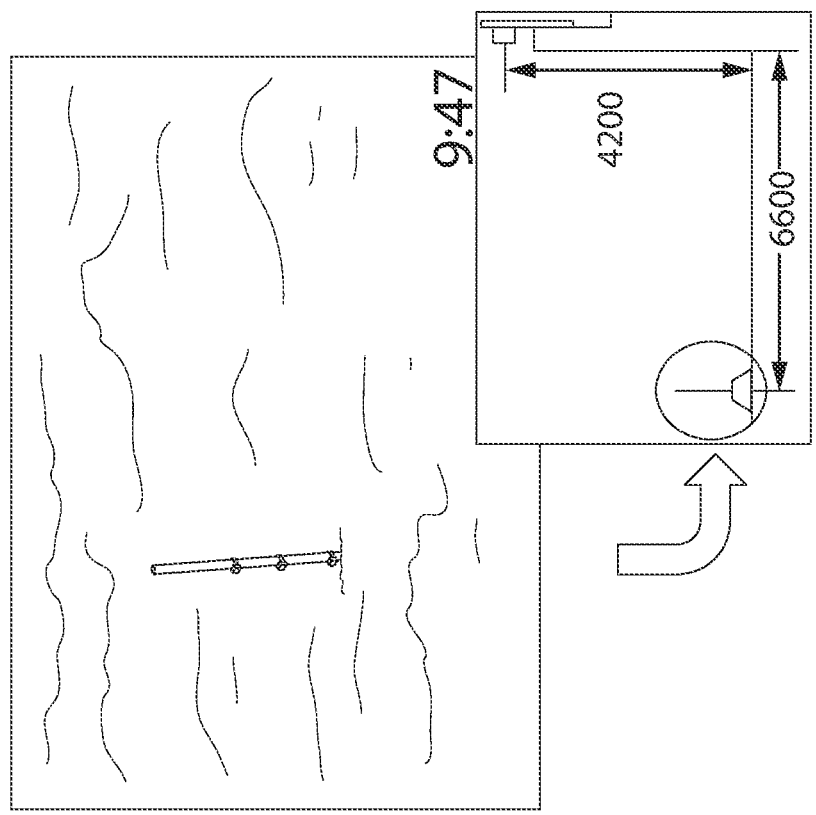
FIG. 22 includes photographs showing states of flooding around the RF sensors 2 at respective times.
Figure 22A:
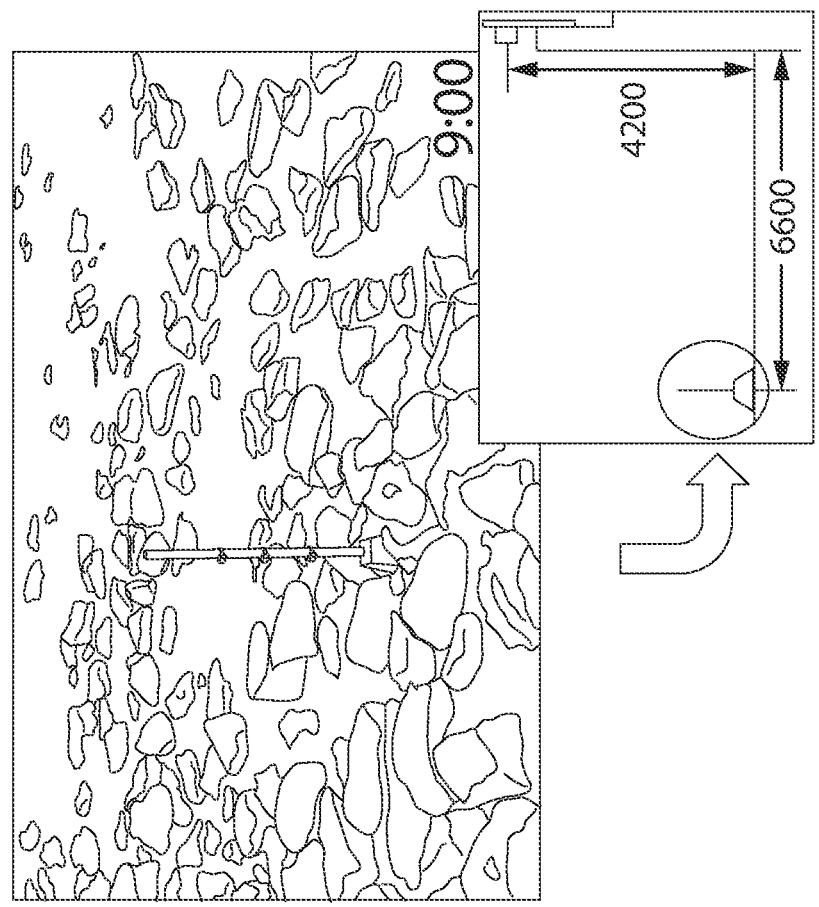

FIG. 21 is a diagram illustrating the results of measuring the water level around the RF sensors 2 in the external environment and the RSS. The results illustrated in FIG. 21 correspond to data measured by the lowest one of the three RF sensors 2 illustrated in FIG. 20(a). In FIG. 21, the horizontal axis represents the measurement time (8:00 to 11:00), the left vertical axis represents the RSS [dB], and the right vertical axis represents the water level [m] (the water depth with reference to the top surface of the deck block, which is assumed to be zero). The RSS actually measured at each time is affected by noise caused by water surface waves to a large degree, and therefore, a noise reduction process was performed by obtaining, at each time t, the time average for a time interval from time t [t−Δt, t] (Δt=2 min.). The water level indicates a value measured by the water depth sensor at each time t. According to an image recorded by the video camera, the surroundings of the deck block started to be flooded at 9:00, and the water surface reaches the lowest RF sensor 2 at 9:47. FIG. 22 includes photographs showing flooding states around the RF sensors 2 at respective times. FIG. 22(a) shows the flooding state around the RF sensors 2 at 9:00, and FIG. 22(b) shows the flooding state around the RF sensors 2 at 9:47. When the ground around the RF sensors 2 is flooded, interference of a radio response signal received by the reception antenna becomes large due to reflection on the water surface, and as the water surface comes closer to the RF sensor 2, an effect of interference becomes large. As the water surface comes closer to the RF sensor 2, oscillation of the RSS relative to the water level increases. When the water surface reaches the height of the RF sensor 2, the RSS sharply decreases. It is found that this result qualitatively corresponds well to the results of calculation as illustrated in FIG. 5, FIG. 6, and FIG. 9.

Figure 23:
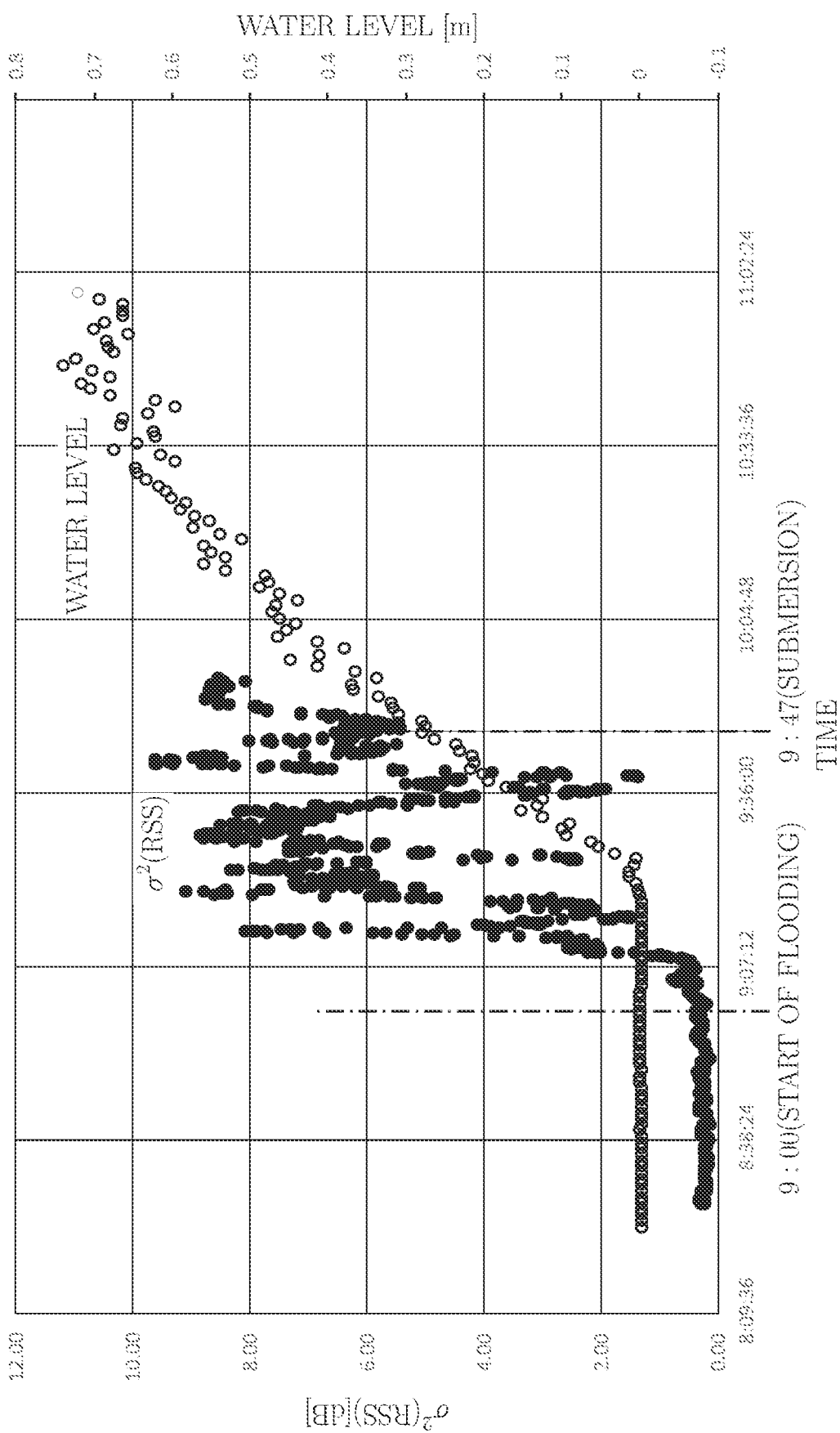
FIG. 23 is a diagram illustrating results of measuring the water level around the RF sensors 2 in the external environment and the variance $\sigma^2(RSS)$ of the RSS.

FIG. 23 is a diagram illustrating the results of measuring the water level around the RF sensors 2 in the external environment and the variance $\sigma^2$(RSS) of the RSS. The measurement data in FIG. 23 is based on radio response signals the same as those for FIG. 21. In FIG. 23, the horizontal axis represents the measurement time (8:00 to 11:00), the left vertical axis represents the variance $\sigma^2$(RSS) [dB] of the RSS, and the right vertical axis represents the water level [m] (the water depth with reference to the top surface of the deck block, which is assumed to be zero). When flooding around the RF sensors 2 starts, the variance $\sigma^2$(RSS) of the RSS sharply increases. It is considered that this is because fluctuation in the RSS caused by oscillation of water surface waves is added to usual noise. When the distance between the RF sensor 2 and the water surface becomes shorter to a certain degree, the variance $\sigma^2$(RSS) of the RSS sharply increases, and thereafter, as the distance between the RF sensor 2 and the water surface becomes shorter, the variance $\sigma^2$(RSS) of the RSS increases while oscillating. It is considered that such a phenomenon is observed as a result of an effect of the water surface moving up and down due to water surface waves. It is found that this result qualitatively corresponds well to the result of calculation as illustrated in FIG. 10.

Figure 24:
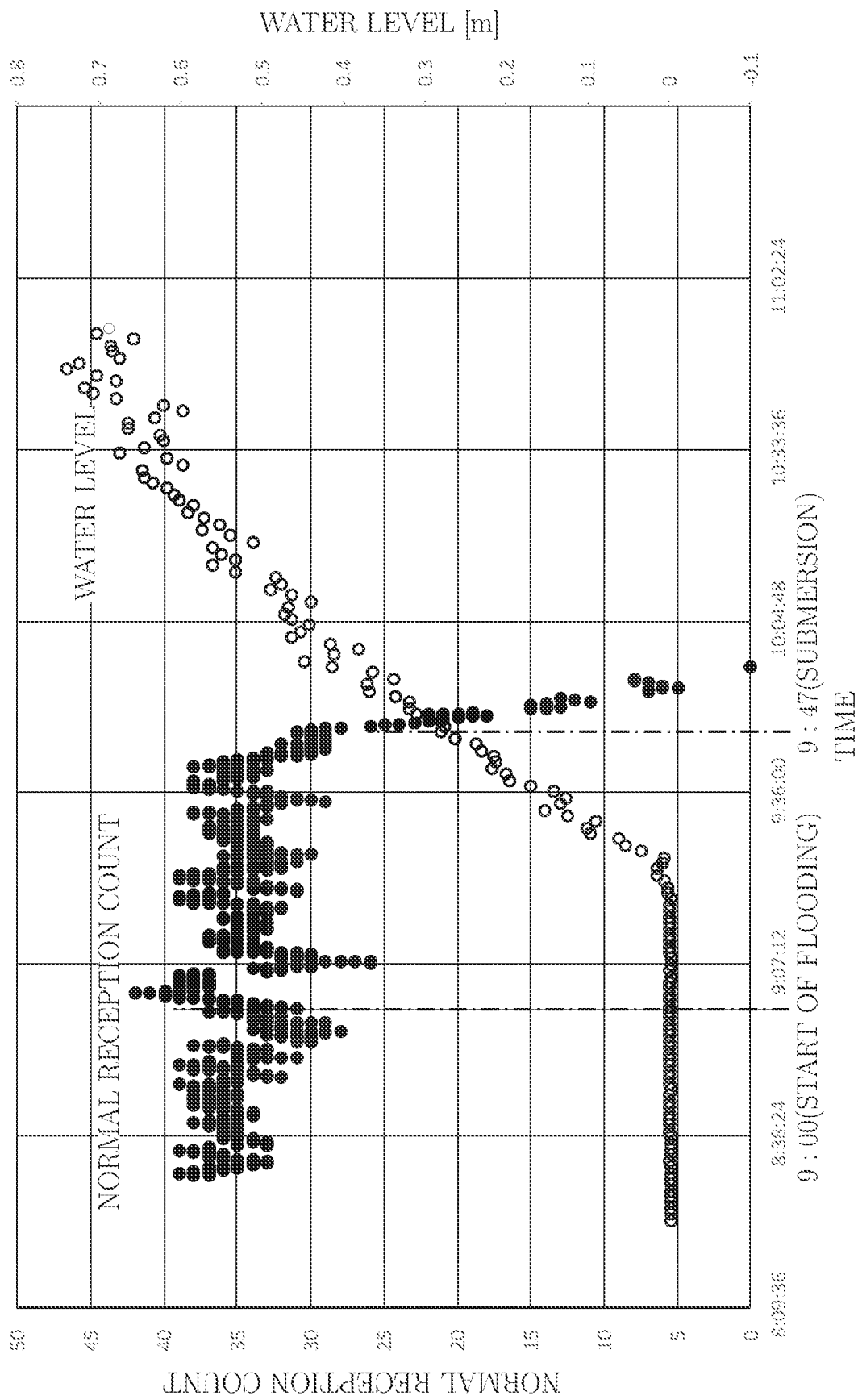
FIG. 24 is a diagram illustrating results of measuring the water level around the RF sensors 2 in the external environment and a normal reception count.

FIG. 24 is a diagram illustrating the results of measuring the water level around the RF sensors 2 in the external environment and the normal reception count. The measurement data in FIG. 24 is based on radio response signals the same as those for FIG. 21. In FIG. 24, the horizontal axis represents the measurement time (8:00 to 11:00), the left vertical axis represents the normal reception count (times), and the right vertical axis represents the water level [m] (the water depth with reference to the top surface of the deck block, which is assumed to zero). Here, the "normal reception count" is the number of times a received response signal is normally received within a specific time. When the normal reception count is divided by the number of times a radio response signal is transmitted from the RF sensor 2 within the specific time, the "normal reception rate" can be obtained. FIG. 24 illustrates the number of times a received response signal is normally received per 1.5 minutes. Little change is observed in the normal reception count even when the ground around the RF sensors 2 is flooded. It is considered that this is because a partial error in a received signal caused by interference noise due to a certain level of multi-path fading is corrected by an error correction function of a communication protocol in the transmission-reception I/F module 12. When the distance between the RF sensor 2 and the water surface becomes shorter than 20 cm, the effect of multi-path fading on a radio response signal becomes extremely large, and therefore, the normal reception count starts to decrease, and the normal reception count sharply decreases when the water surface reaches the height of the RF sensor 2. Therefore, it is found that the RF sensor 2 that is flooded can be detected by detecting a sharp decrease in the normal reception count (or normal reception rate).

Figure 25:
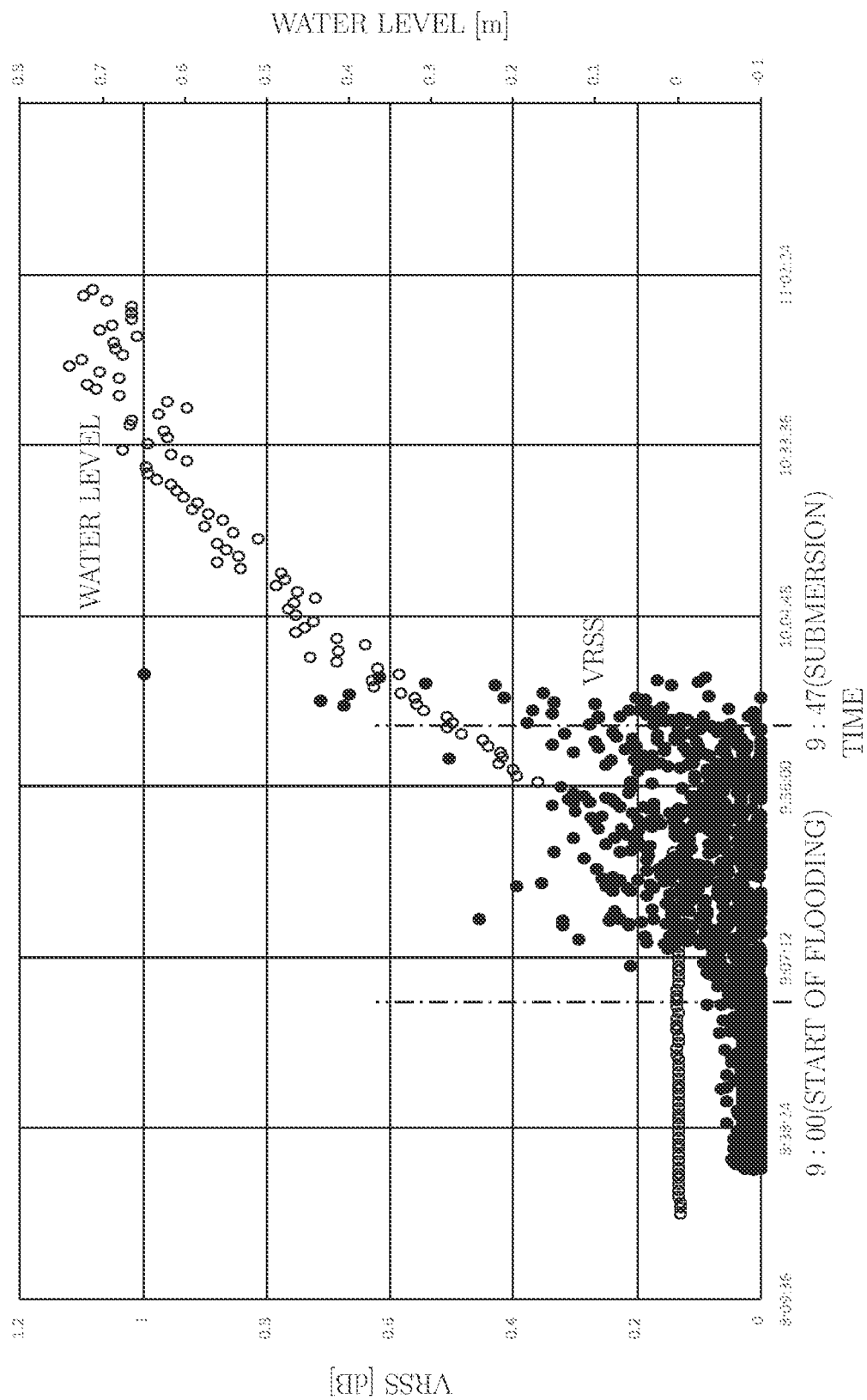
FIG. 25 is a diagram illustrating results of measuring the water level around the RF sensors 2 in the external environment and a VRSS.

FIG. 25 is a diagram illustrating the results of measuring the water level around the RF sensors 2 in the external environment and the VRSS. The measurement data in FIG. 25 is based on radio response signals the same as those for FIG. 21. In FIG. 25, the horizontal axis represents the measurement time (8:00 to 11:00), the left vertical axis represents the VRSS [dB], and the right vertical axis represents the water level [m] (the water depth with reference to the top surface of the deck block, which is assumed to be zero). In FIG. 25, the temporal change value DI(t) of the received signal strength I(t) is defined as DI(t)=I(t)/I(t−δt). The VRSS is the absolute value |DI(t)| of DI(t). According to FIG. 25, the VRSS sharply increases when flooding of the ground around the RF sensors 2 starts, and thereafter, increases as the distance between the RF sensor 2 and the water surface become shorter, and further increases when the water surface reaches the height of the RF sensor 2. This corresponds to changes in the RSS illustrated in FIG. 21. As found from FIG. 25, the values of the VRSS after the ground around the RF sensors 2 is flooded vary to a very large degree. Therefore, it is considered that to determine whether the ground around the RF sensors 2 is flooded from values of the VRSS, it is more preferable to determine whether the number of times $N_{DI}$ the value of the VRSS |DI(t)| exceeds the threshold $DI_{th}$ within the specific time $\Delta t_3$ exceeds the specific threshold $N_{DIth}$ than to simply determine whether the value of the VRSS |DI(t)| exceeds the threshold $DI_{th}$.

(4.3) External Environment Test II

Figure 26:
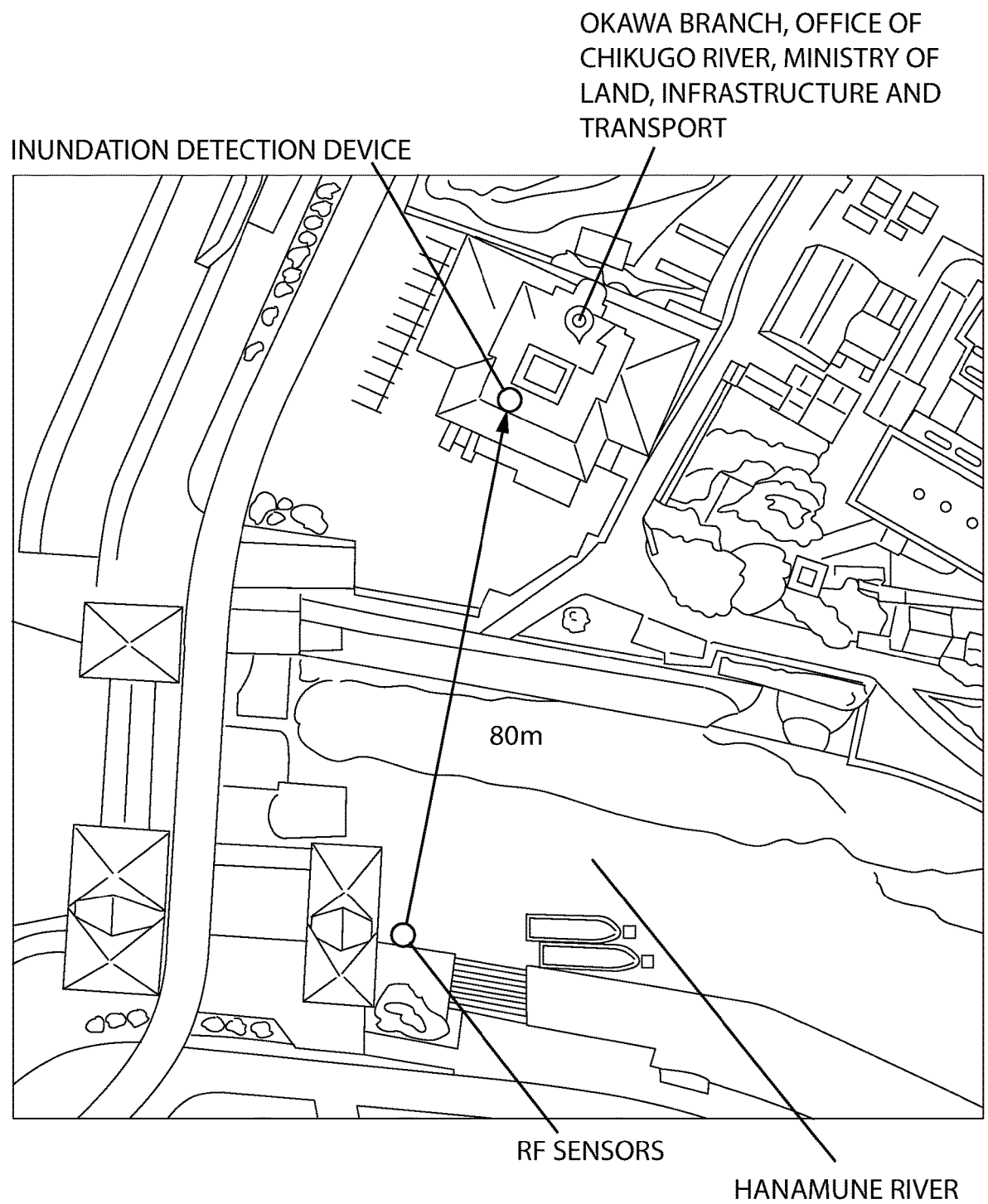
FIG. 26 is a diagram illustrating an environment around places where the inundation detection device 1 and RF sensors 2 are respectively installed and the positional relationship between the inundation detection device 1 and the RF sensors 2 in an external environment test II.
Figure 28B:
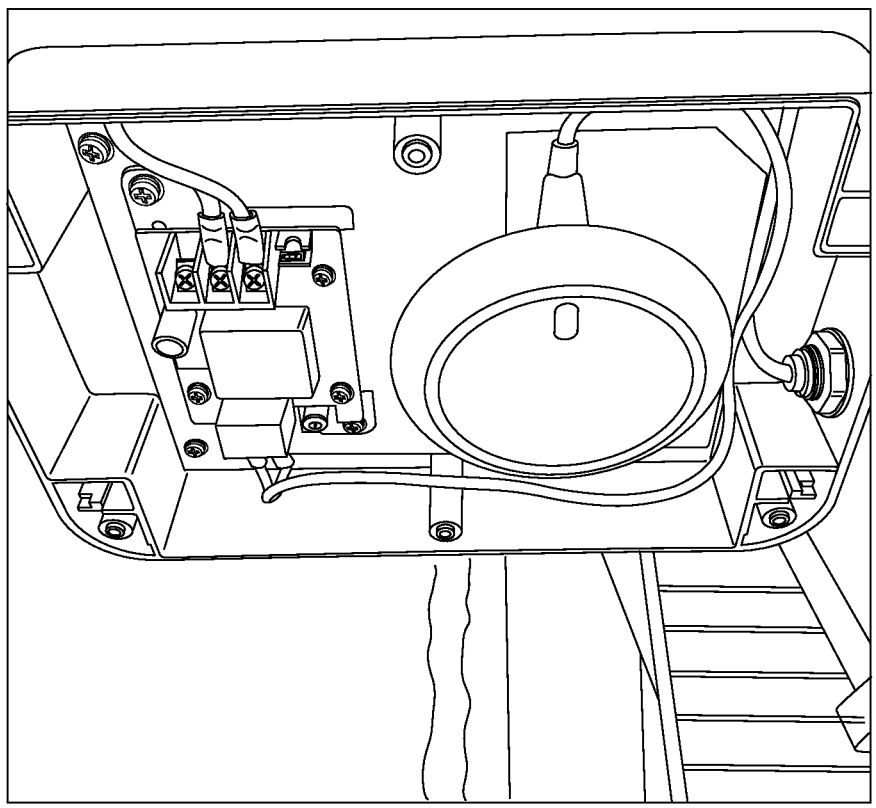
FIG. 28 includes diagrams illustrating the state of installation of the inundation detection device 1 in the external environment test II, where (a) is an external view of the inundation detection device 1 and the surroundings of the installation position and (b) shows the interior of the inundation detection device 1.
Figure 28A:
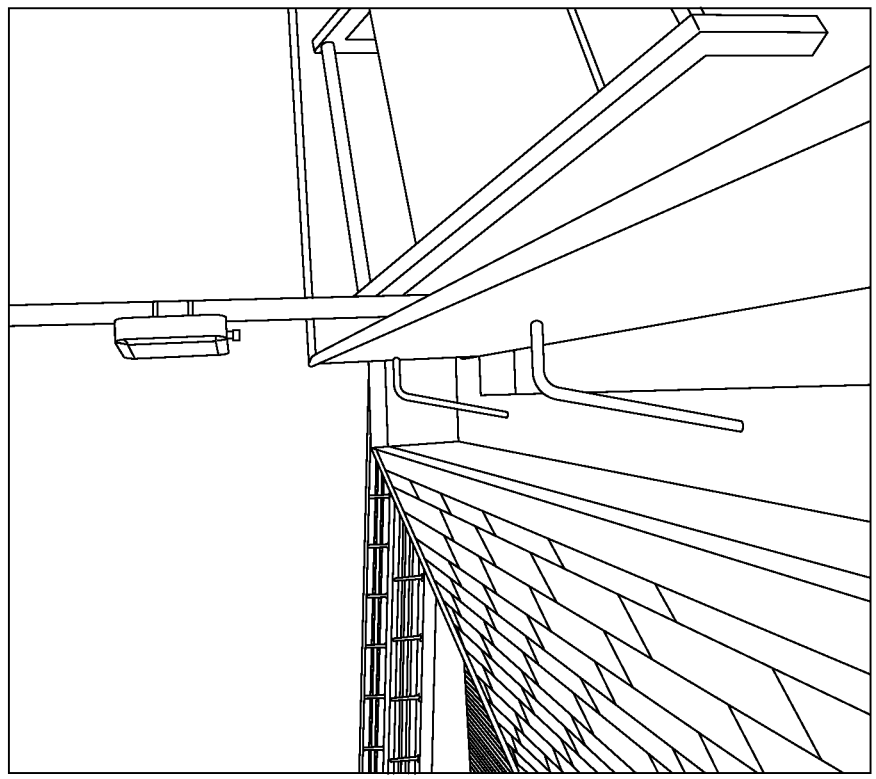

Now, the result of a test and measurement obtained by performing a water level detection test near the mouth of Chikugo river, in Fukuoka prefecture, in which the water level changes to a large degree, is described. In this test, as the communication method between the inundation detection device 1 and each RF sensor 2, the Bluetooth 5.0 (registered trademark) standard was used. The radio frequency band is 2.4 GHz band. The interval between radio response signals from each RF sensor was set to 10 seconds. FIG. 26 to FIG. 28 illustrate the environment around places where the inundation detection device 1 and the RF sensors 2a, 2b, and 2c are respectively installed and the positional relationship between the inundation detection device 1 and the RF sensors 2a, 2b, and 2c. As illustrated in FIG. 27, the three RF sensors 2a, 2b, and 2c were fixed to a wooden post set upright near a bank of the river at different heights at intervals of about 50 cm. Adjacent to the installation place of the RF sensors 2, a water level indicator of the Ministry of Land, Infrastructure and Transport is installed, and observation data obtained by the water level indicator was used as the water level at each time. As illustrated in FIG. 28, the inundation detection device 1 was installed on the rooftop of a building on a bank opposite to the bank on which the RF sensors 2 were installed. The positional relationship between the inundation detection device 1 and the RF sensors 2 was such that, as illustrated in FIG. 26, the horizontal distance was 80.2 m, the vertical distance was 15.0 m, and the slant distance was 81.6 m (measurement value) across the river so as to ensure a direct sight line from the inundation detection device 1 to the RF sensors 2.

Figure 29:
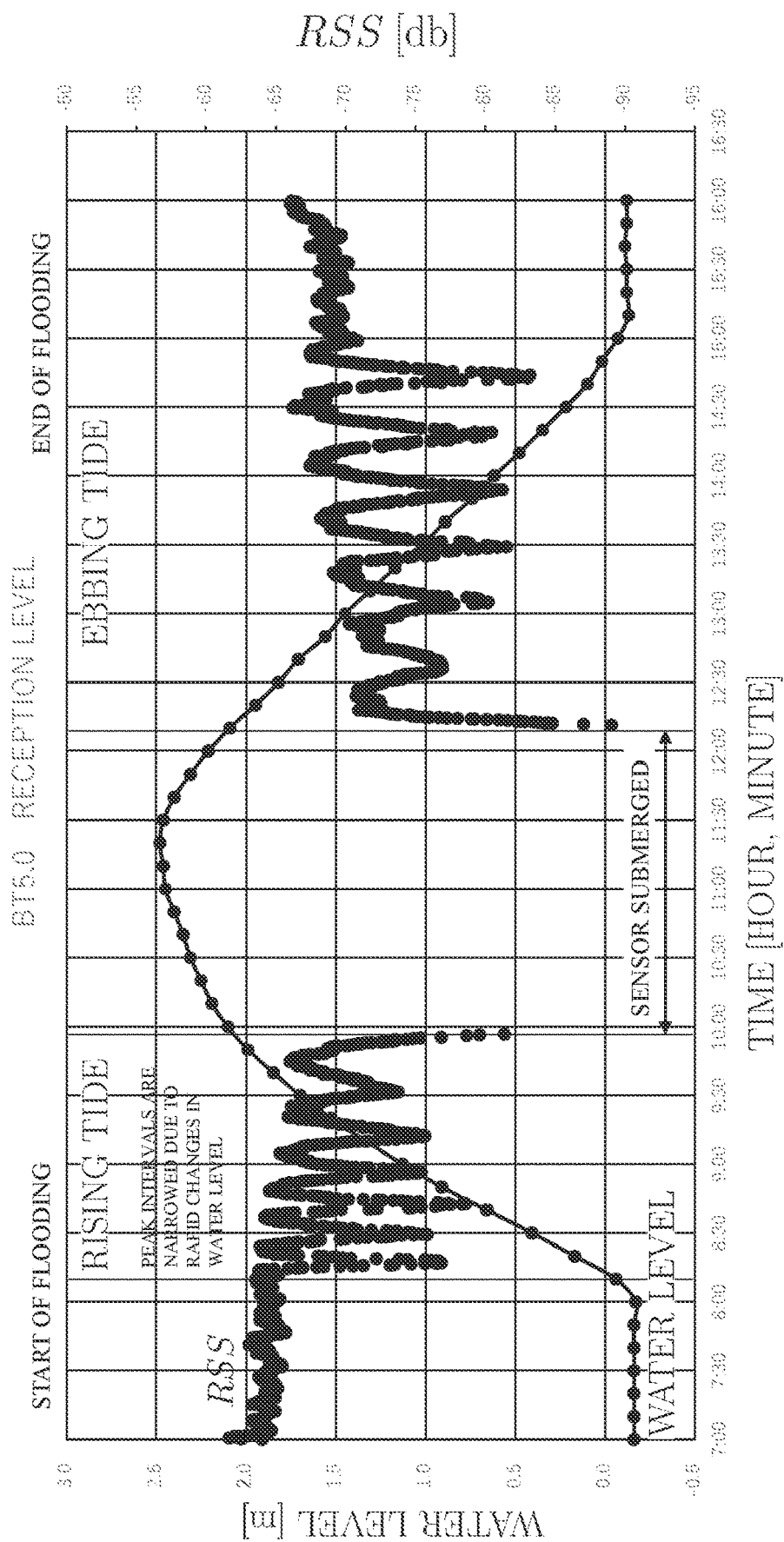
Figure 30:
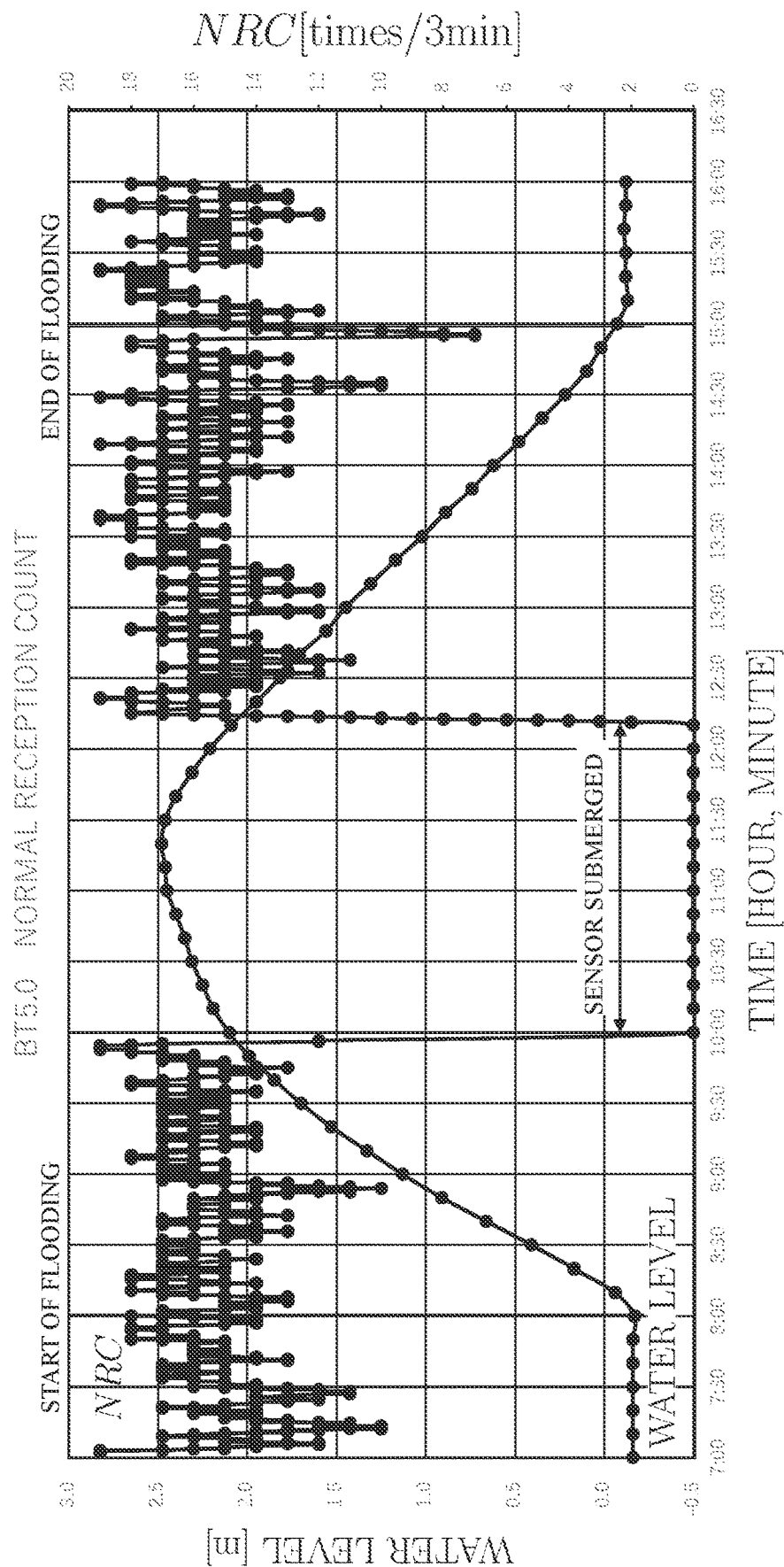
Figure 31:
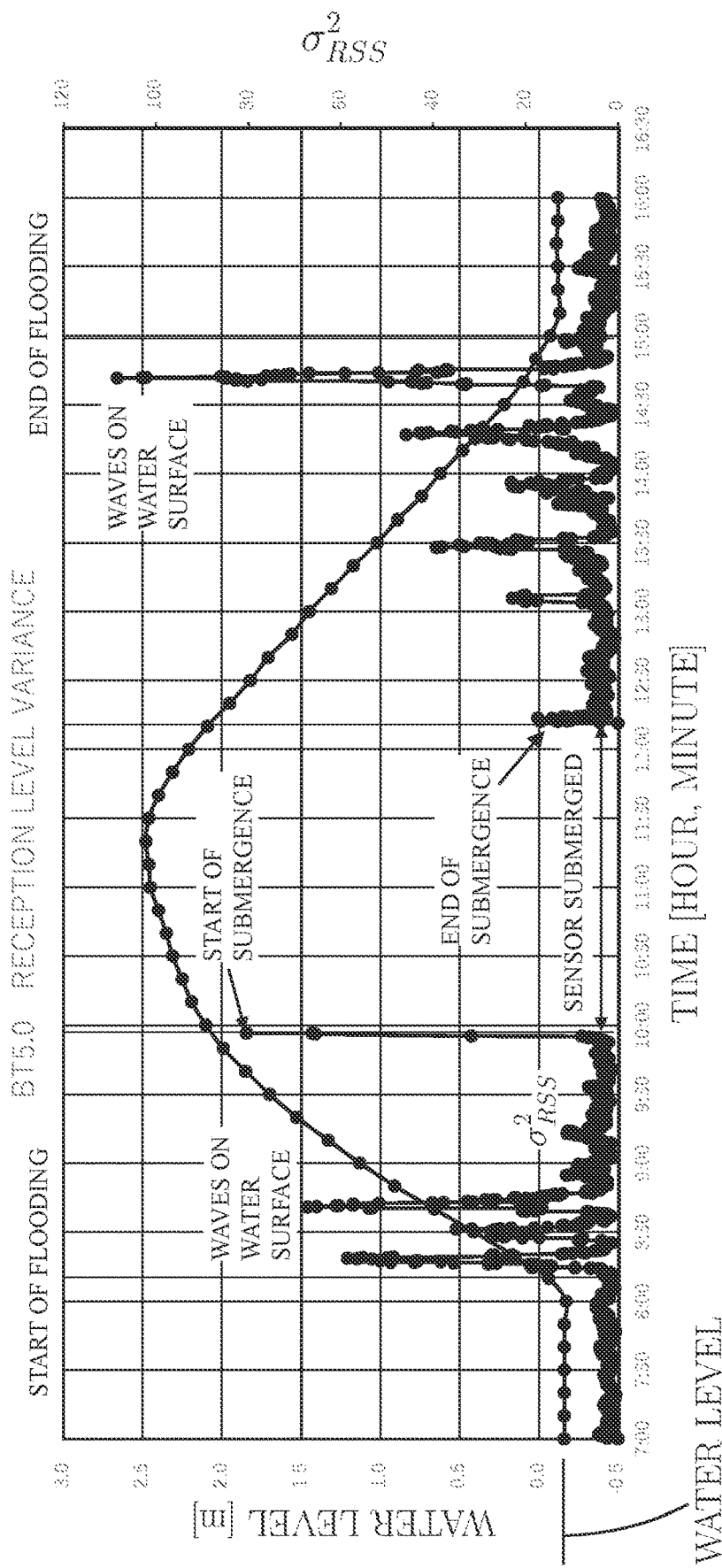

FIG. 29 illustrates actual measurement values of temporal changes in the water level and in the RSS for the RF sensor 2a. FIG. 30 illustrates actual measurement values of temporal changes in the water level and in the normal reception count (hereinafter referred to as "NRC") for the RF sensor 2a. FIG. 31 illustrates actual measurement values of temporal changes in the water level and in the RSS variance for the RF sensor 2a. In FIG. 29 to FIG. 31, the horizontal axis represents time (hour and minute). The vertical axes in FIG. 29 represent the water level (left axis) and the RSS (right axis), the vertical axes in FIG. 30 represent the water level (left axis) and the NRC (right axis), and the vertical axes in FIG. 31 represent the water level (left axis) and the RSS variance (right axis). The reference plane (0-m plane) of the water level is set at a height of 0.13 m from the riverbed directly below the RF sensor 2a, and the water level is −0.13 m in a state where no flooding is occurring (in a state where no water is present on the riverbed directly below the RF sensor 2a). The uppermost RF sensor 2a is installed at a height of 2.1 m from the water level reference plane. Each RSS value in FIG. 29 is a moving average obtained by averaging sample values measured at intervals of 10 seconds for a period of the previous two minutes. Each RSS variance in FIG. 31 indicates the variance, at a corresponding time, of RSS values sampled during a period of three minutes before the time.

According to FIG. 29 to FIG. 31, it is found from the observed values of the water level that flooding of the riverbed occurred at around 8:00, the RF sensor 2a was left submerged during the period from 10:00 to 12:10, and flooding of the riverbed ended at around 15:00. During the period from when flooding of the riverbed started to when the RF sensor 2a was submerged (around 8:00 to 10:00) and the period from when submergence of the RF sensor 2a ended to when flooding of the riverbed ended (around 12:10 to 15:00), the water surface was present around the RF sensor 2a, and the distance in space between the water surface and the RF sensor 2a changed over time. An interval corresponding to the above-described periods is called a non-submerge flooding period. With reference to the observation results of the RSS (FIG. 29), during the non-submerge flooding period, oscillation and changes in the RSS are clearly observed in association with changes in the distance between the RF sensor 2a and the water surface. This oscillation is as described with reference to FIG. 5 and FIG. 6. It is also found that when the RF sensor 2a is flooded, the RSS starts to sharply decrease, and as the water depth increases, communication is interrupted shortly. This is because dielectric loss of an electromagnetic wave of about 2.4 GHz under the water is extremely large.

Now, with reference to the observation results of the NRC (FIG. 30), no significant changes in the NRC are observed during the non-submerge flooding period, and it is not possible to distinguish the non-submerge flooding period and a period during which the riverbed is not flooded (hereinafter referred to as "non-flooding period") from each other. It is considered that this is because an effect of multi-path fading noise caused by water surface reflection is offset by an error correction function of a receiver in the inundation detection device 1. It is therefore found that it is difficult to detect the occurrence of flooding only by observing the NRC. On the other hand, when the RF sensor 2a is submerged, the RSS sharply decreases, the NRC becomes 0 accordingly, and communication is interrupted. Therefore, it is found that whether the RF sensor 2a is submerged or not can be acutely detected by observing the NRC.

Now, with reference to the observation results of the RSS variance (FIG. 31), during the non-submerge flooding period, while the riverbed around the RF sensor 2a is flooded and the water depth is shallow, the RSS variance changes with a large amplitude relative to changes in the water depth. As the water depth increases, the amplitude of the RSS variance decreases while the RSS variance is oscillating. Around the time when the water depth exceeds 1 m, the RSS variance is at a level substantially the same as that in the non-flooding period. On the other hand, around the time immediately before the RF sensor 2a is submerged and around the time immediately after the end of submersion, the RSS variance sharply increases. Therefore, it is considered that the ground around the RF sensor 2a that is flooded or the RF sensor 2a that is immediately before submersion can be detected by observing a sharp increase in the RSS variance.

Figure 32:
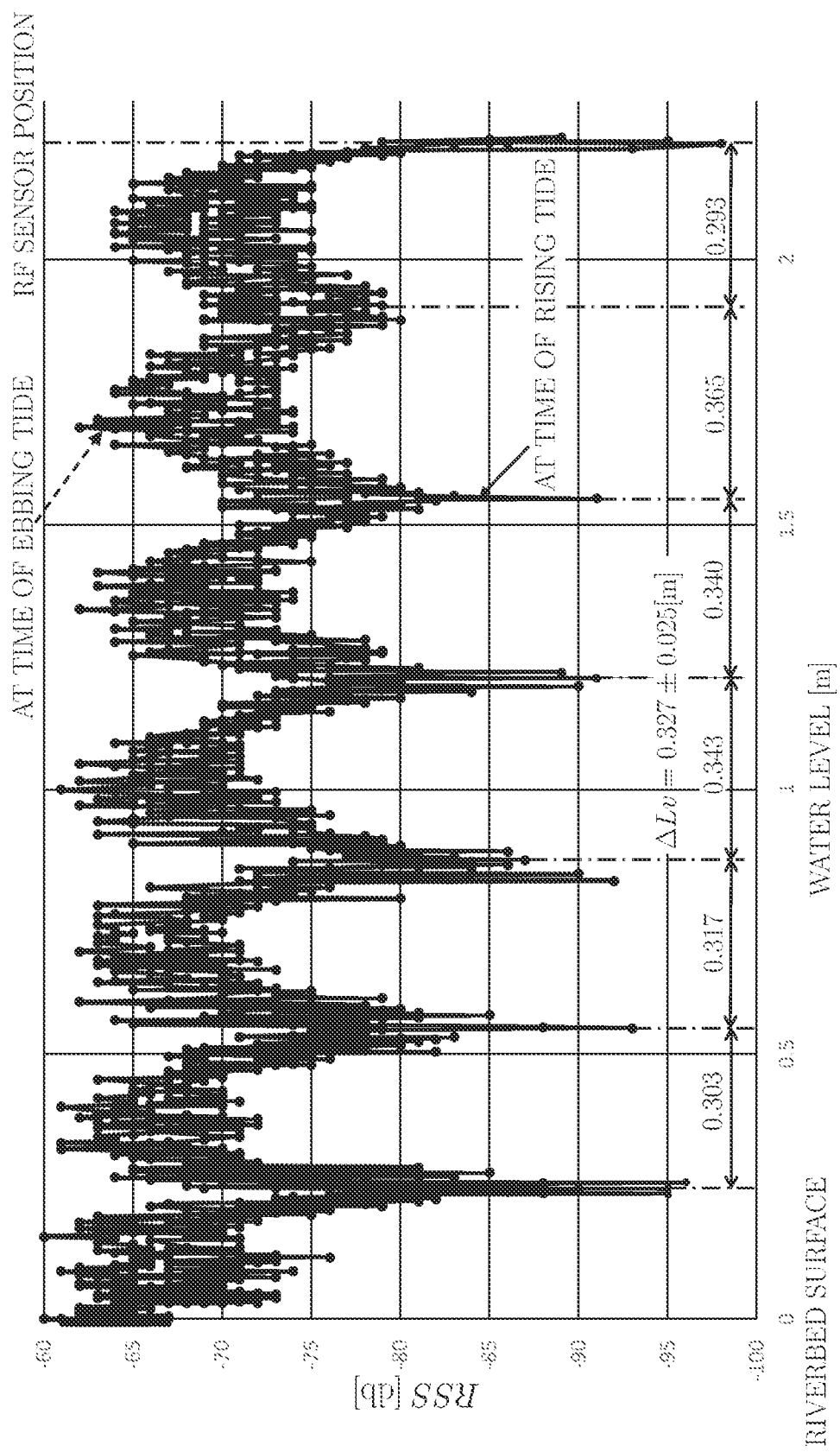
FIG. 32 is a diagram illustrating a relationship between a measured water level and an RSS.

FIG. 32 is a diagram obtaining by plotting the actual measurement values of the water level and the actual measurement values of the RSS for the RF sensor 2a at respective times illustrated in FIG. 29, where the horizontal axis represents the water level and the vertical axis represents the RSS. In FIG. 29, the 0-m plane of the water level has an offset of 0.13 m from the riverbed surface. In FIG. 32, the water level is shifted and converted such that the riverbed surface corresponds to 0 m. It is found from FIG. 32 that the observed value of the RSS for the RF sensor 2a oscillates in a substantially constant cycle of $\Delta Lv=32.7\pm2.5$ cm relative to changes in the water level. Therefore, it is found that when the plurality of RF sensors 2 are arranged and installed in the vertical direction and the RSS for each RF sensor 2 is observed at each time, oscillation of the RSS relative to the water level at each time can be grasped in real time.

Figure 33:
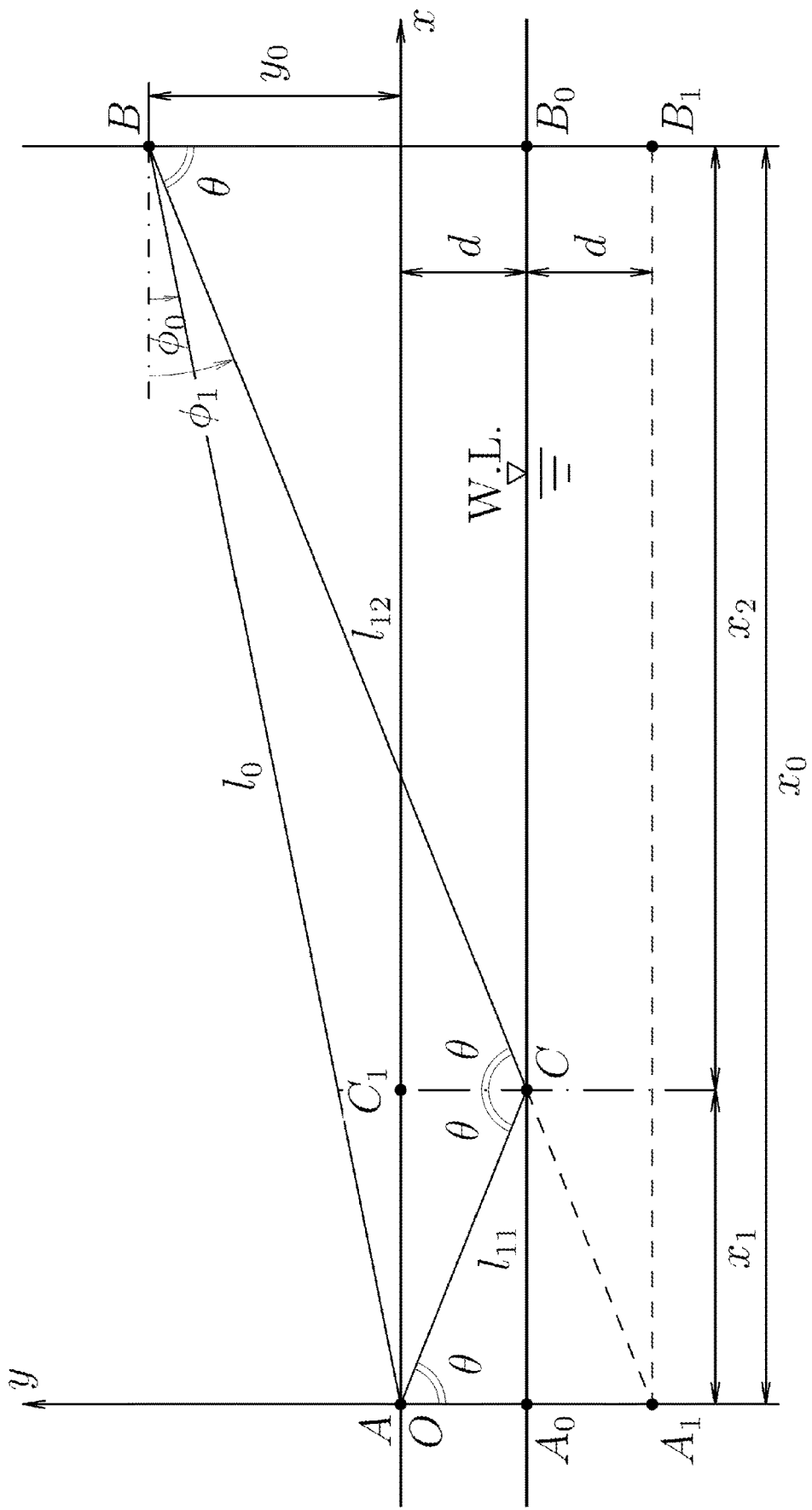
FIG. 33 is a diagram illustrating a water surface reflection interference model.

Here, a relationship between the oscillation cycle of the RSS relative to changes in the water level and the positions of the RF sensor 2a and the reception antenna of the inundation detection device 1 is described. Actual propagation of a radio wave from the RF sensor 2a to the reception antenna of the inundation detection device 1 is simplified, and a water surface reflection interference model as illustrated in FIG. 33 is considered. In this case, radio waves radiated from the RF sensor 2a installed at the point A pass through an optical path AB and an optical path ACB, reach the reception antenna of the inundation detection device 1 installed at the point B, and interfere with each other at the point B. The point C is a reflection point on the water surface. A vertical plane that includes the optical path ACB is assumed to be a reflection plane, and the point A is assumed to be an origin (0, 0). An x axis is set in the horizontal direction and a y axis is set in the vertical direction in the reflection plane. The coordinates of the point B are denoted by ($x_0$, $y_0$). The distance from the water surface to the point A (origin) is denoted by d. The lengths of the optical paths AB, AC, and CB are denoted by $l_0$, $l_{11}$, and $l_{12}$ respectively. When it is assumed that $(y_0/x_0)^4 \ll 1$ and $((y_0+2d)/x_0)^4 \ll 1$ hold, the optical path length $l_0$ of the optical path AB, the optical path length $l_{11}+l_{12}$ of the optical path ACB, and the optical path difference $\Delta l$ between the optical paths AB and ACB are expressed as follows.

[Math. 19]

$$l_0 = \sqrt{x_0^2 + y_0^2} \simeq x_0\left[1 + \frac{1}{2}\left(\frac{y_0}{x_0}\right)^2\right] \quad (19a)$$

$$l_{11} + l_{12} = \sqrt{x_0^2 + (y_0+2d)^2} \simeq x_0\left[1 + \frac{1}{2}\left(\frac{y_0+2d}{x_0}\right)^2\right] \quad (19b)$$

$$\Delta l = (l_{11} + l_{12}) - l_0 \simeq \frac{2d(y_0+d)}{x_0} \quad (19c)$$

At this time, a phasor of a received signal s received by the reception antenna at the point B is expressed by expression (20a) below. Here, k, λ, and f denote the wave number, wavelength, and frequency of the radiated waves respectively, c denotes the speed of light, $s_0$ denotes the reception strength of the direct wave, η denotes a reflected wave attenuation coefficient that is smaller than 1 and is determined on the basis of the optical path difference $\Delta l$ at the point C, the reflectivity R(θ) on the water surface, the angles of incidence $\phi_0$ and $\phi_1$ of the direct wave and the reflected wave on the reception antenna, and the directivity function g(φ) of the reception antenna.

[Math. 20]

$$s \simeq s_0(1 - \eta\cos k\Delta l) = s_0\left[1 - \eta\cos\left(\frac{4\pi f}{c}\left(\frac{y_0}{x_0}d + \frac{d^2}{x_0}\right)\right)\right] \simeq s_0\left[1 - \eta\cos\left(2\pi\frac{2f}{c}\frac{y_0}{x_0}d\right)\right](d \ll x_0) \quad (20a)$$

$$k = \frac{2\pi}{\lambda} = \frac{2\pi f}{c} \quad (20b)$$

$$\eta = \frac{g(\phi_1)}{g(\phi_0)}R(\theta)\left(1 - \frac{\Delta l}{l_0}\right) \quad (20c)$$

Therefore, the oscillation cycle Λ of the RSS relative to changes in the water level is expressed by the following expression.

[Math. 21]

$$\Lambda = \frac{c}{2f}\frac{x_0}{y_0} \quad (21)$$

In a case where the frequency f is equal to 2.4 GHz, $c/2f=6.25\times10^{-2}$ [m] holds. When $x_0=80$ [m] and $y_0=15$ [m] are assumed, the result of Λ=0.33 [m] is obtained from expression (21), which substantially corresponds to the actual measurement values in FIG. 32.

Figure 34:
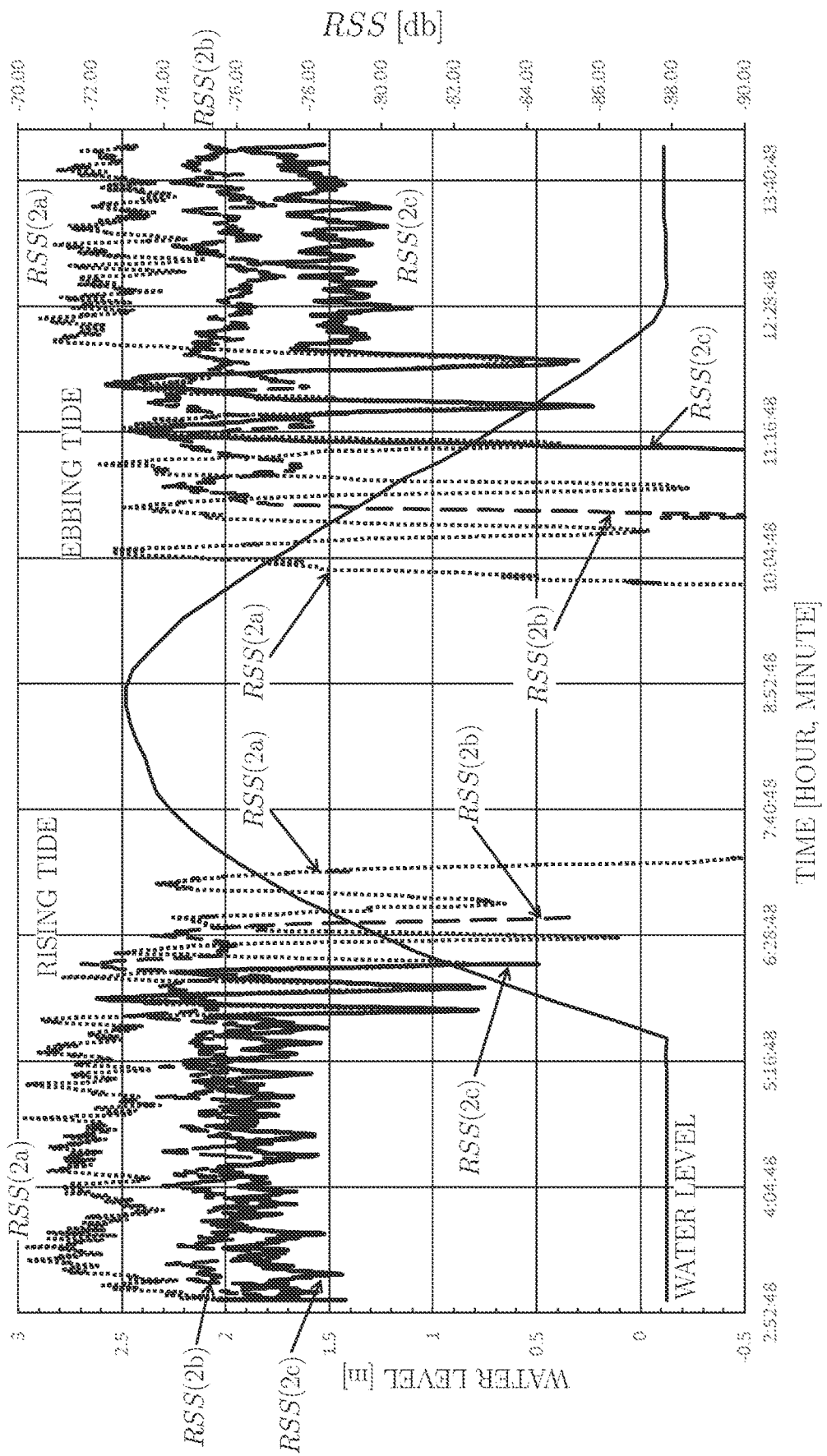
FIG. 34 is a diagram illustrating actual measurement values of temporal changes in the water level and in the RSSs for RF sensors 2a-1, 2a-2, and 2a-3.
Figure 35:
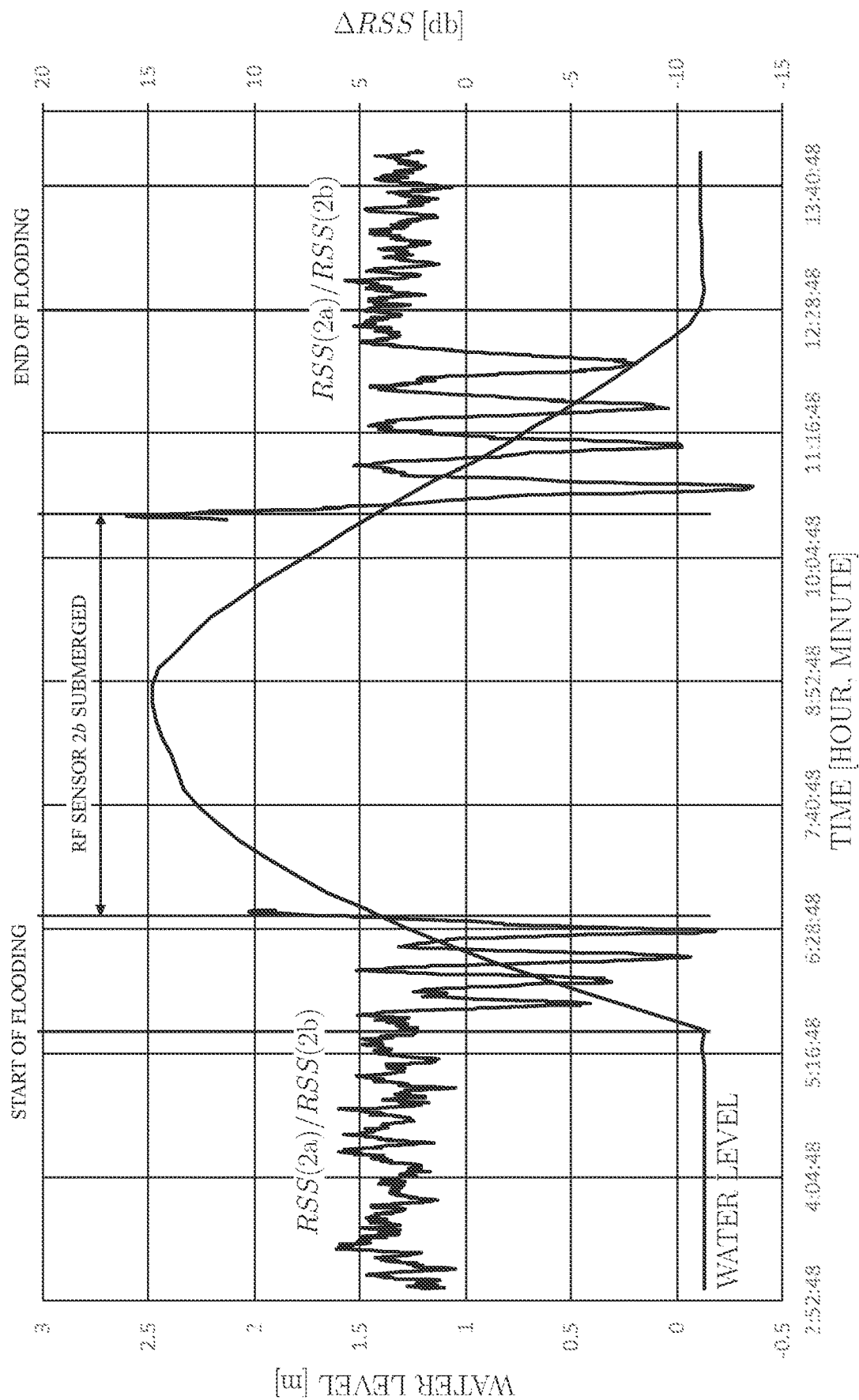
FIG. 35 is a diagram illustrating temporal changes in the ratio between the RSSs for the two RF sensors 2a and 2b.

FIG. 34 is a diagram illustrating actual measurement values of temporal changes in the water level and in the RSSs for the RF sensors 2a, 2b, and 2c. The measurement data illustrated in FIG. 34 was obtained on a day different from the day on which the data illustrated in FIG. 29 to FIG. 31 was obtained. In FIG. 34, in the non-submerge flooding periods of the respective RF sensors 2a, 2b, and 2c, as the water level rises or falls, the RSS for the uppermost RF sensor 2a oscillates in a phase substantially the same as the phase of the RSS for the lowermost RF sensor 2c. As the water level rises or falls, the RSS for the midpoint RF sensor 2b oscillates in a phase substantially opposite to the phases of the RSSs for the RF sensors 2a and 2c. The intervals between the RF sensors 2a, 2b, and 2c are about 50 cm, and therefore, the interval $d_{ab}$ between the RF sensors 2a and 2b is about 50 cm, and the interval $d_{ac}$ between the RF sensors 2a and 2c is about 100 cm. The cycle ΔLv of oscillation of the RSS relative to changes in the water level is ΔLv≅33 cm according to FIG. 32, and therefore, $d_{ab}/\Delta Lv \cong 1.5$ and $d_{ac}/\Delta Lv \cong 2.0$ hold, and $d_{ab}/\Delta Lv$ is substantially a half-integer and $d_{ac}/\Delta Lv$ is substantially an integer. Therefore, it is expected that the phases of RSS oscillation for the RF sensors 2a and 2b relative to changes in the water level are opposite to each other and that the phases of RSS oscillation for the RF sensors 2a and 2c relative to changes in the water level are the same, and the result of measurement illustrated in FIG. 34 supports the expectation. Accordingly, when the RSSs for the two RF sensors 2a and 2b (or 2b and 2c) installed at an interval equal to a half-integer multiple of ΔLv are simultaneously measured and the ratio between the RSSs (the difference in the dB value) are obtained, RSS oscillation relative to changes in the water level can be detected in real time with high sensitivity. FIG. 35 illustrates temporal changes in the ratio RSS(2a)/RSS(2b) between the RSSs for the two RF sensors 2a and 2b. The phases of RSS oscillation for the RF sensors 2a and 2b relative to changes in the water level are opposite to each other, and therefore, it is found that significant oscillation of the ratio RSS(2a)/RSS(2b) is detected in the non-submerge flooding period unlike in the non-flooding period.

(5) Operation of Inundation Detection Device 1

Last, an operation of the inundation detection system of this embodiment is described. The inundation detection device 1 in the inundation detection system of this embodiment detects the RF sensor 2 that is flooded by determination, based on thresholds, of the variance $\sigma^2(I;[t-\Delta t_1, t])$ of the received signal strength I(t) of the radio response signal from the RF sensor 2 within the specific time $\Delta t_1$ and of the normal reception rate $R[(t-\Delta t_2, t])$ within the specific time $\Delta t_2$. The inundation detection device 1 detects the ground that is flooded around the RF sensor 2 by determination, based on a threshold, of the variance $\sigma^2(I;[t-\Delta t_1, t])$ or determination, based on a threshold, of the variability of the RSS |DI(t)|. For this, the thresholds used in the threshold-based determination described above need to be set to appropriate values. Meanwhile, it is considered that, for example, the received signal strength I(t) and the variance $\sigma^2(I;[t-\Delta t_1, t])$ thereof, and the normal reception rate $R[(t-\Delta t_2, t])$ change depending on the surrounding environment in which the RF sensor 2 and the inundation detection device 1 are installed. Therefore, the inundation detection device 1 of this embodiment samples, at normal times when the ground is not flooded, for example, the received signal strength I(t), the variance $\sigma^2(I;[t-\Delta t_1, t])$, and the normal reception rate $R[(t-\Delta t_2, t])$ and sets thresholds thereof by machine learning so as to be adapted to the surrounding environment.

To set the thresholds, the user inputs an initialization instruction to the inundation detection device 1 using the initialization switch 16 at normal times when the ground is not flooded. When the initialization instruction is input, the variance threshold setting unit 23 samples, for a specific time, received response signals for radio response signals periodically transmitted from the RF sensor 2, learns the average $\sigma^2_{av0}$ of the variance $\sigma^2(I;[t-\Delta t_1, t])$ of the RSS I(t) at normal times when the ground is not flooded by machine learning, and sets a value obtained by multiplying the average $\sigma^2_{av0}$ by the predetermined coefficient $r_\sigma$ ($r_\sigma>1$) as the threshold $\sigma^2_{th1}$. Here, the coefficient $r_\sigma$ is a constant set in advance as appropriate in accordance with an experiment. The normal reception rate threshold setting unit 25 learns the average $R_{av0}$ of the normal reception rate $R[(t-\Delta t_2, t])$ at normal times when the ground is not flooded by machine learning and sets a value obtained by multiplying the average $R_{av0}$ by the predetermined coefficient $r_R$ ($0<r_R<1$) as the threshold $R_{th1}$. Here, the coefficient $r_R$ is a constant set in advance as appropriate in accordance with an experiment. The strength variation threshold setting unit 26a learns the average $|DI|_{av0}$ of the VRSS |DI(t)| at normal times when the ground is not flooded by machine learning and sets a value obtained by multiplying the average $|DI|_{av0}$ by the predetermined coefficient $r_{DI}$ ($r_{DI}>1$) as the threshold $DI_{th}$. Here, the coefficient $r_{DI}$ is a constant set in advance as appropriate in accordance with an experiment.

Figure 36:
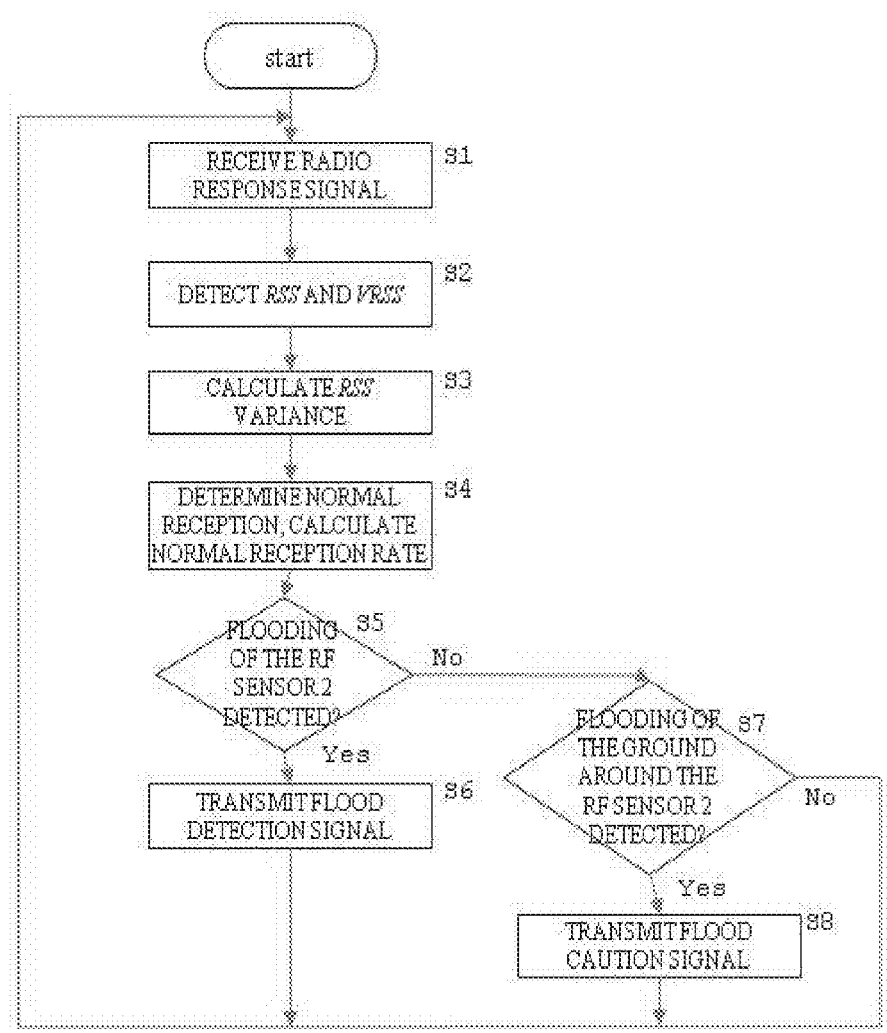
FIG. 36 is a flowchart illustrating an operation, by the inundation detection device 1, of detecting the presence or absence of flooding.

After completion of initial setting described above, the inundation detection device 1 continuously performs a detection operation for detecting whether the ground around the RF sensor 2 is flooded and whether the RF sensor 2 is flooded. FIG. 36 is a flowchart illustrating an operation, by the inundation detection device 1, of detecting whether flooding occurs.

First, when a radio response signal from the RF sensor 2 is received by the sensor communication antenna 11 at time $t_n$, the transmission-reception I/F module 12 demodulates and decodes the radio response signal and outputs a received response signal (S1).

Next, the received signal strength detection unit 21 detects and outputs the RSS $I(t_n)$ at time $t_n$. The received signal strength variation detection unit 26 calculates and outputs the VRSS $|DI(t_n)|$ at time $t_n$ (S2).

Next, the reception strength dispersion detection unit 22 calculates and outputs, at time $t_n$, the variance $\Sigma^2(I;[t_n-\Delta t_1, t_n])$ of the RSS I(t) within the specific time $\Delta t_1$ (S3). Here, the sampling time $\Delta t_1$ for variance calculation is a constant value set in advance.

Next, the normal reception rate detection unit 24 calculates and outputs, at time $t_n$, the normal reception rate $R[(t_n-\Delta t_2, t_n])$, which is a rate of normal reception of a received response signal within the specific time $\Delta t_2$ before time $t_n$ (S4). Here, the sampling time $\Delta t_2$ for normal reception rate calculation is a constant value set in advance.

Next, the flood determination unit 27 determines whether the variance $\sigma^2(I;[t_n-\Delta t_1, t_n])$ output by the reception strength dispersion detection unit 22 is greater than or equal to the threshold $\sigma^2_{th1}$ and the normal reception rate $R[(t_n-\Delta t_2, t_n])$ output by the normal reception rate detection unit 24 is less than or equal to the specific threshold $R_{th1}$ (S5). Here, in a case where the determination condition "$\sigma^2(I;[t_n-\Delta t_1, t_n])\geq\sigma^2_{th1} \cap R[(t_n-\Delta t_2, t_n])\leq R_{th1}$" is satisfied, the flood determination unit 27 outputs a flood detection signal, and the high-level communication I/F module 14 outputs the flood detection signal to a high-level network via the high-level communication antenna 15 (S6).

On the other hand, in a case where the determination condition "$\sigma^2(I;[t_n-\Delta t_1, t_n])\geq\sigma^2_{th1} \cap R[(t_n-\Delta t_2, t_n])\leq R_{th1}$" is not satisfied in step S5, the flood caution determination unit 28 determines whether any of the following flood determination conditions is satisfied (S7).

(Determination Condition 1) The variance $\sigma^2(I;[t-\Delta t_1, t])$ output by the reception strength dispersion detection unit 22 satisfies $\sigma^2(I;[t-\Delta t_1, t])\geq\sigma^2_{th2}$ for the threshold $\sigma^2_{th2}$.

(Determination Condition 2) The number of times $N_{DI}$ the VRSS |DI(t)| exceeds the threshold $DI_{th}$ within the specific sampling time $\Delta t_3$ exceeds the specific threshold $N_{DIth}$.

In a case where (Determination Condition 1) or (Determination Condition 2) above is satisfied, the flood caution determination unit 28 outputs a flood caution signal, and the high-level communication I/F module 14 transmits the flood caution signal to a high-level network via the high-level communication antenna 15 (S8).

The following is performed in response to the repeated operation from steps S1 to S8 described above. In the high-level network, for example, when a management server (not illustrated) on the high-level network receives the flood detection signal transmitted from the inundation detection device 1, the occurrence of flooding of the RF sensor 2 installed in the vicinity of the inundation detection device 1 can be known. When the management server receives the flood caution signal transmitted from the inundation detection device 1, flooding of the ground around the RF sensor 2 installed in the vicinity of the inundation detection device 1 can be known. Accordingly, the inundation detection system of this embodiment can appropriately detect flooding around the RF sensor 2 or the flooding state.

Embodiment 2

Figure 37:
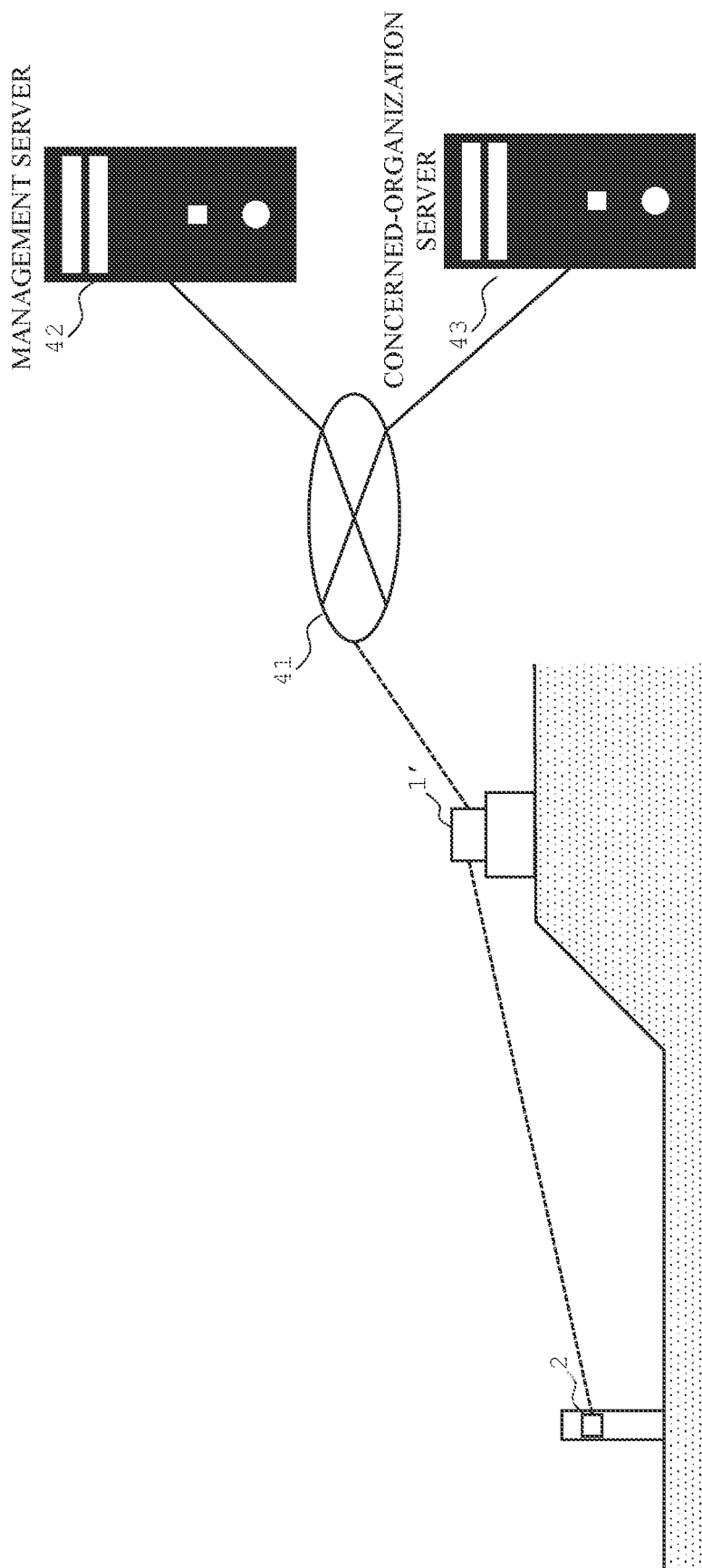
FIG. 37 is a diagram illustrating an overall arrangement of an inundation detection system according to embodiment 2 of the present invention.

FIG. 37 is a diagram illustrating an overall arrangement of an inundation detection system according to embodiment 2 of the present invention. The inundation detection system according to embodiment 2 includes an inundation detection device 1', the RF sensor 2, and a management server 42. The inundation detection device 1' and the management server 42 are connected to each other via a communication line 41. It is assumed that the inundation detection device 1' is connected to the communication line 41 by wire or wirelessly. It is assumed that the management server 42 is connected to a concerned-organization server 43 installed in a local government or a disaster prevention organization via the communication line 41.

In FIG. 37, the RF sensor 2 is the same as that in embodiment 1, and the inundation detection device 1' wirelessly communicates with the RF sensor 2 as in embodiment 1. Regarding the number of RF sensors 2, it is assumed that various configurations can be employed as in FIG. 1 in embodiment 1.

Figure 38:
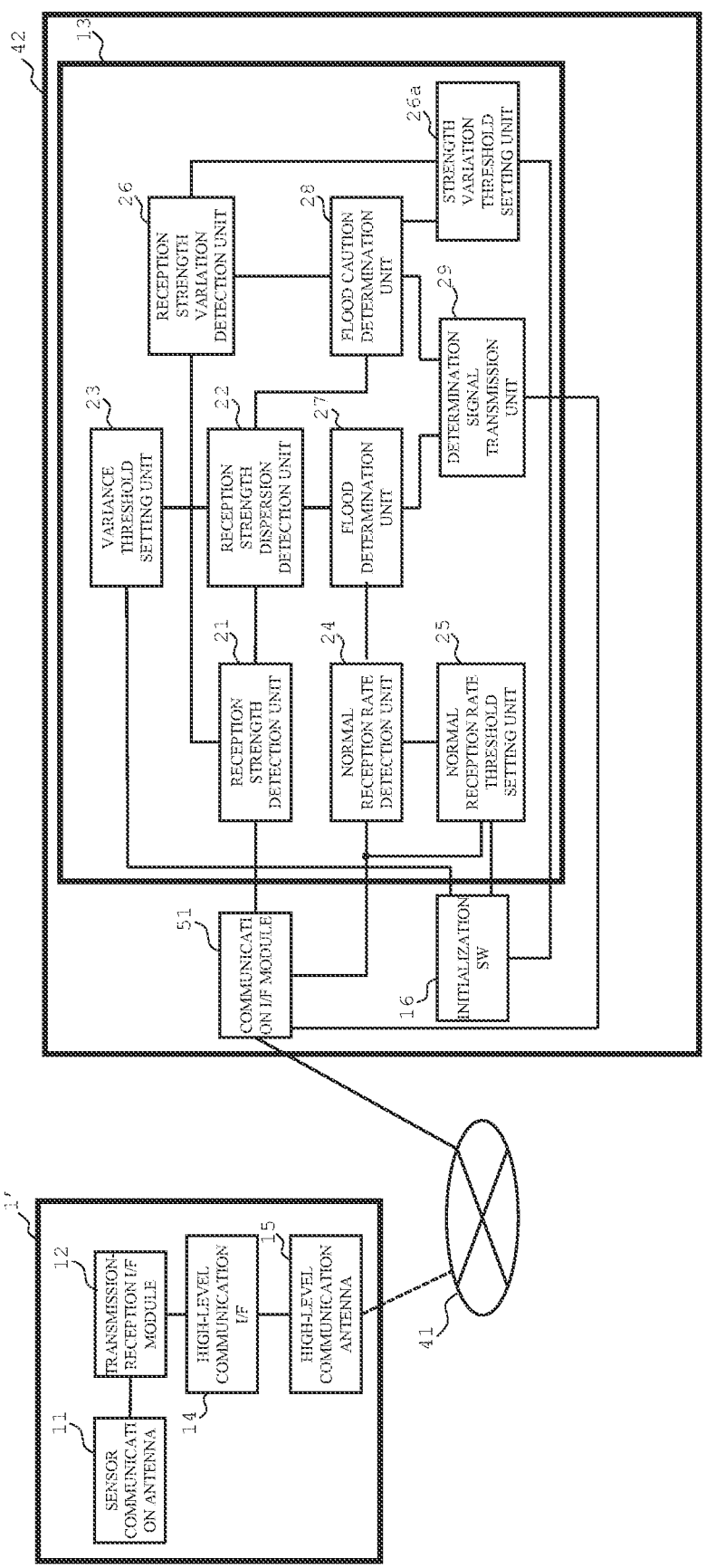
FIG. 38 is a block diagram illustrating functional configurations of an inundation detection device 1' and a management server 42 illustrated in FIG. 37.

The inundation detection system according to this embodiment is different from that in embodiment 1 in that the functions of the computer 13 and the initialization switch 16 in the inundation detection device 1 of embodiment 1 (see FIG. 2) are separated and included in the management server 42. FIG. 38 is a block diagram illustrating functional configurations of the inundation detection device 1' and the management server 42 illustrated in FIG. 37. In FIG. 38, constituent units the same as those in FIG. 2 are assigned the same reference numerals. A communication I/F module 51 in the management server 42 is a module that performs a process for the management server 42 to communicate via the communication line 41. When the inundation detection device 1' illustrated in FIG. 38 receives a radio response signal from the RF sensor 2, the transmission-reception I/F module 12 performs a demodulation process and a decoding process for the received radio response signal and generates a received response signal. The high-level communication I/F module 14 transmits the generated received response signal to the management server 42 via the communication line 41. To suppress an increase in traffic on the communication line 41, the high-level communication I/F module 14 may accumulate received response signals for every specific time (for example, for every 10 seconds) and compress and transmit to the management server 42, the accumulated received response signals.

When receiving the received response signal from the inundation detection device 1', the management server 42 performs a determination process similar to that in embodiment 1 on the basis of the received response signal. In a case where a flood caution signal is output by the flood caution determination unit 28 or a flood detection signal is output by the flood determination unit 27, the determination signal transmission unit 29 transmits the flood caution signal or the flood detection signal to the concerned-organization server 43 via the communication line 41.

Accordingly, when the functions of the computer 13 and the initialization switch 16 in the inundation detection device 1 of embodiment 1 (see FIG. 2) are separated and the management server 42 on the cloud is caused to be responsible for the functions, the management server 42 can centrally perform a determination process concerning flooding for a plurality of inundation detection devices 1'. Accordingly, time-series received response signals transmitted from a large number of inundation detection devices 1' are accumulated in the management server 42. When machine learning is performed on the basis of the accumulated time-series received response signals, accuracy of determination concerning flooding can also be increased.

Embodiment 3

Figure 39:
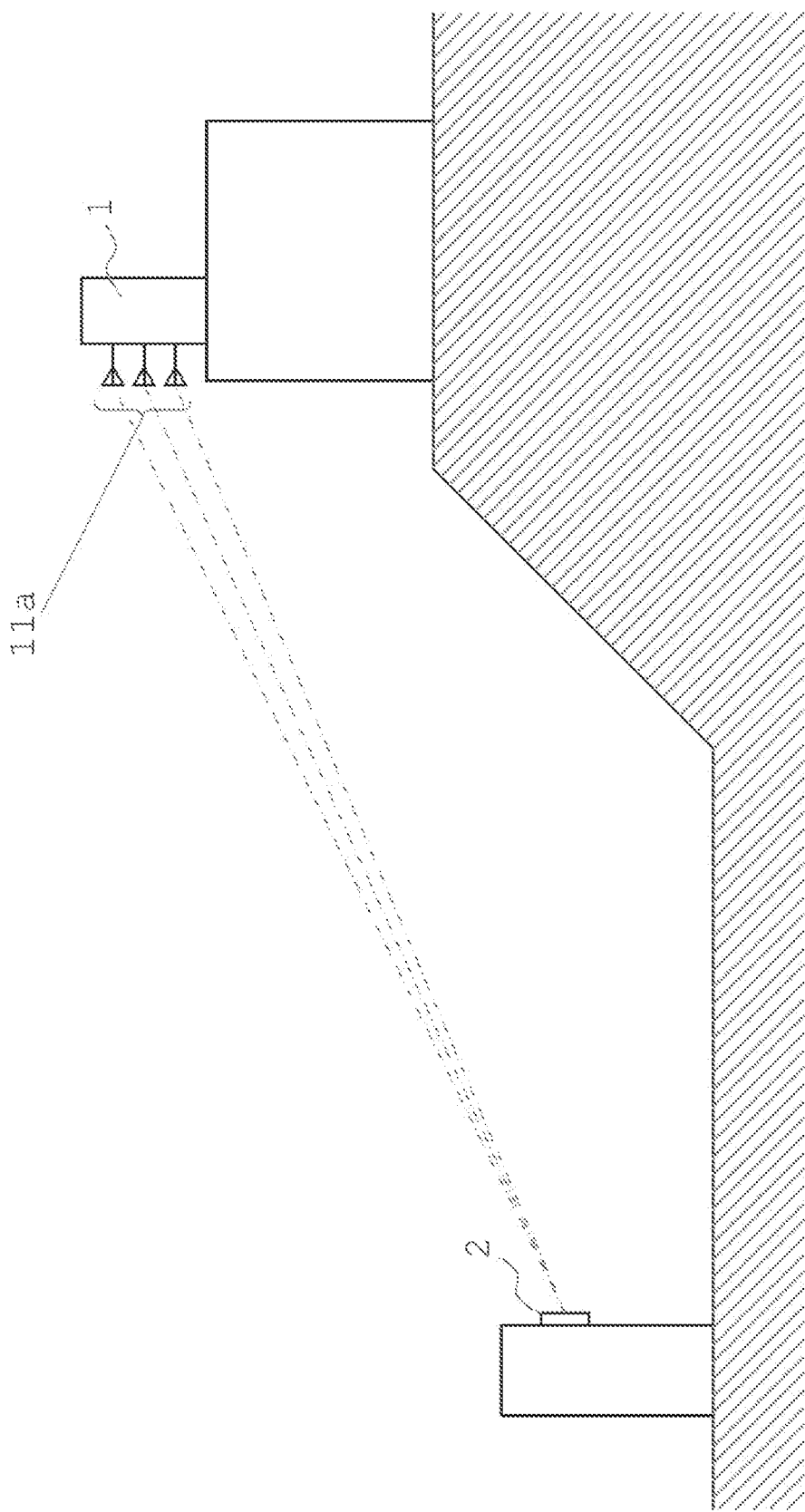
FIG. 39 is a diagram illustrating an example overall arrangement of an inundation detection system according to embodiment 3 of the present invention.
Figure 40:
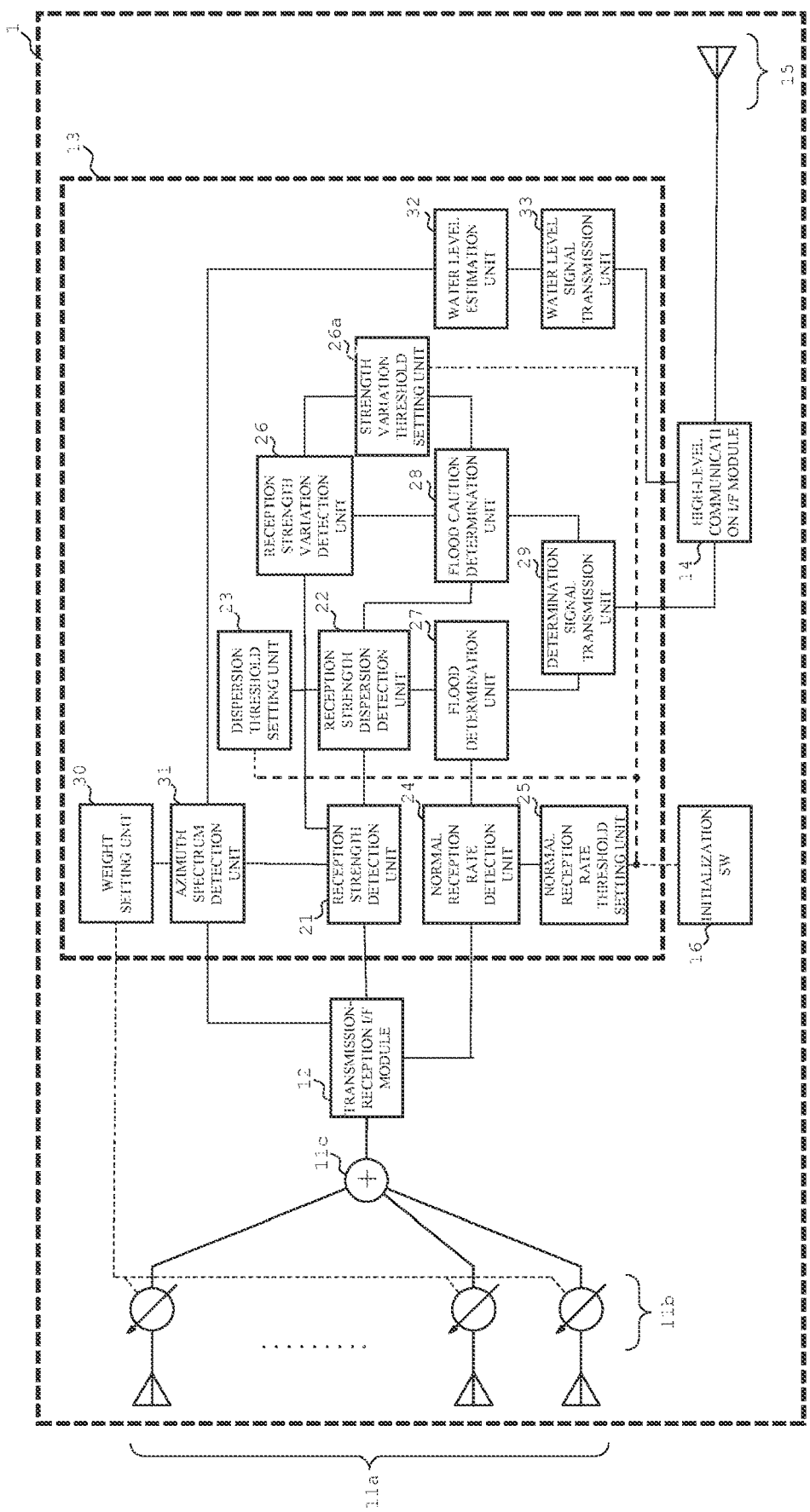
FIG. 40 is a block diagram illustrating a functional configuration of the inundation detection device 1 illustrated in FIG. 39.

FIG. 39 is a diagram illustrating an example overall arrangement of an inundation detection system according to embodiment 3 of the present invention. Although the basic arrangement is similar to that of embodiment 1, this embodiment is different from embodiment 1 in that the inundation detection device 1 includes an array antenna 11a as the sensor communication antenna. FIG. 40 is a block diagram illustrating a configuration of the inundation detection device 1 illustrated in FIG. 39. In FIG. 40, constituent units the same as those in FIG. 2 of embodiment 1 are assigned the same reference numerals. Unlike in embodiment 1, the inundation detection device 1 of this embodiment includes the array antenna 11a in which a plurality of antenna elements are arranged in an array. The antenna elements of the array antenna 11a are arranged in a column in the vertical direction at regular intervals. Further, the inundation detection device 1 of this embodiment is different in that the inundation detection device 1 includes phase shifters 11b that correspond to the antenna elements of the array antenna 11a on a one-to-one basis and an adder 11c that adds up outputs received by the phase shifters 11b. As functional modules of the computer 13, the inundation detection device 1 of this embodiment includes a weight setting unit 30, an azimuth spectrum detection unit 31, a water level estimation unit 32, and a water level signal transmission unit 33. The weight setting unit 30 is a module that performs a process for setting a weight (phase shift amount and gain) of each of the phase shifters 11b. The azimuth spectrum detection unit 31 is a module that performs a process for calculating the spectrum of reception strengths in reception directions (hereinafter referred to as "angular power spectrum" (APS)) on the basis of reception output of the array antenna. The water level estimation unit 32 is a module that performs a process for estimating the presence or absence of rain and the water level of flooding on the basis of the APS output from the azimuth spectrum detection unit 31. The water level signal transmission unit 33 is a module that performs communication for transmitting the presence or absence of rain and the water level of flooding output by the water level estimation unit 32 to a high-level server or a high-level network, such as the Internet, via the high-level communication I/F module 14.

Figure 41:
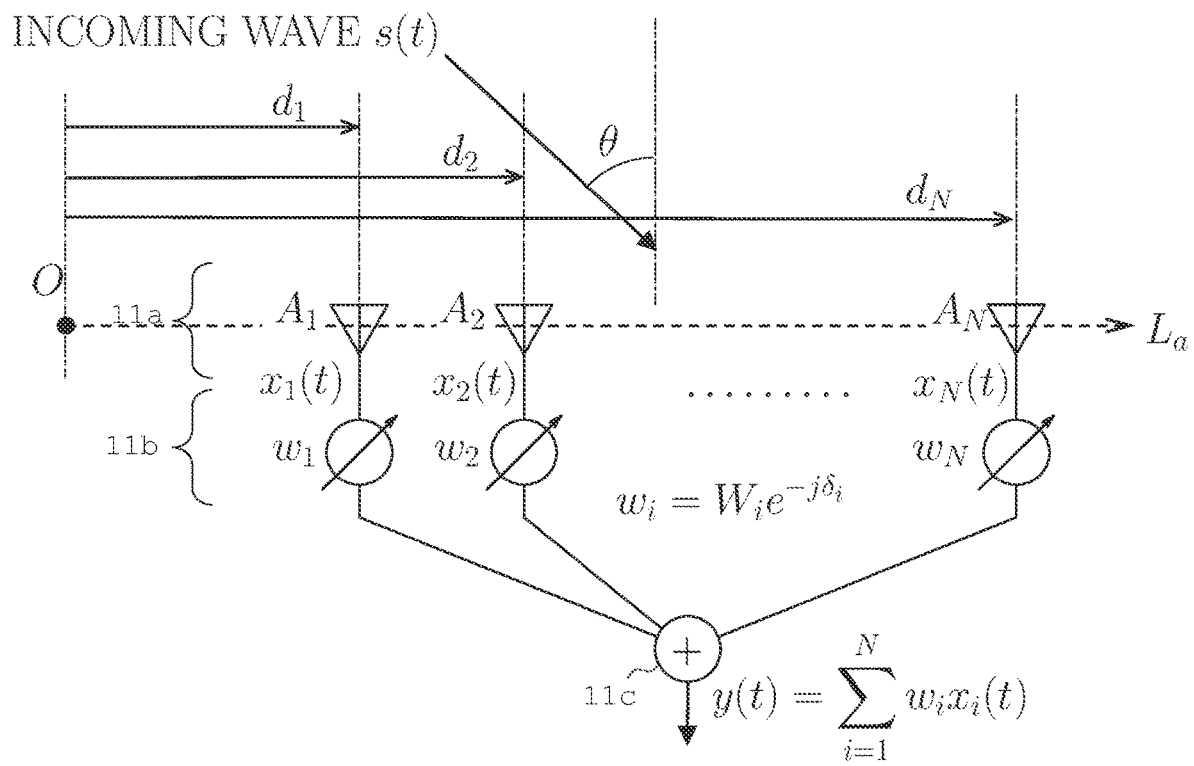

An operation of the inundation detection system thus configured according to this embodiment is described below. Here, a description of a part similar to that in embodiment 1 is omitted, and a process for detecting the APS by the newly added array antenna and estimating the presence or absence of rain and the water level of flooding on the basis of the APS is described. In the array antenna 11a, N antenna elements $A_1, A_2, \ldots, A_N$ (N is an integer greater than or equal to 2) are arranged in a vertical line $L_a$ as illustrated in FIG. 41. FIG. 41 illustrates a diagram that is rotated 90 degrees for convenience of illustration. An origin O is set at an appropriate position on the vertical line $L_a$, and the distance of each antenna element $A_i$ (i=1, 2, ..., N) from the origin is denoted by $d_i$. A case is considered where a radio wave (incoming wave) s(t) that is a plane wave is incident on the array antenna 11a in a direction such that the vertex angle (angle of incidence) with the horizontal direction is θ. At this time, a received signal $x_i(t)$ is guided to the antenna element $A_i$. When the phase of the incoming wave s(t) at the origin O is assumed to be zero, the phase progress amount $\phi_i$ of the incoming wave s(t) incident on the antenna element $A_i$ is expressed as $\phi_i = kd_i \sin(\theta_i) = 2\pi d_i \sin(\theta_i)/\lambda$. Here, k and λ are the wave number and wavelength of the incoming wave respectively. Therefore, when the directivity of the antenna element $A_i$ is denoted by g(θ), the received signal $x_i(t)$ is expressed as follows.

[Math. 22]

$$x_i(t) = g(\theta) e^{-j2\pi d_i \sin\theta/\lambda} s(t) \qquad (22)$$

The received signal $x_i(t)$ of the antenna element $A_i$ is phase-shifted and amplified by the phase shifter 11b. The phase shift amount of the phase shifter 11b corresponding to the antenna element $A_i$ is denoted by $\delta_i$, and the gain thereof is denoted by $W_i$. The complex weight $w_i$ of the phase shifter 11b is expressed as follows.

[Math. 23]

$$w_i = W_i e^{j\delta_i} \qquad (23)$$

At this time, the output of the phase shifter 11b corresponding to the antenna element $A_i$ is $w_i x_i(t)$, and therefore, the output $y(t)$ of the adder 11c is expressed as follows.

[Math. 24]

$$y(t) = \sum_{i=1}^{N} w_i x_i(t) = s(t)g(\theta)D(\theta) \tag{24a}$$

$$D(\theta) = \sum_{i=1}^{N} W_i g(\theta) \exp\left[j\left(-\frac{2\pi}{\lambda}d_i \sin\theta + \delta_i\right)\right] \tag{24b}$$

$D(\theta)$ is called an array factor.

In the array antenna 11a thus configured, to maximize the magnitude of the array factor in a direction at a certain angle of incidence $\theta_s$, the weight setting unit 30 sets the phase shift amount $\delta_i$ of the phase shifter 11b corresponding to each antenna element as follows.

[Math. 25]

$$\delta_i = \frac{2\pi}{\lambda} d_i \sin\theta_s (i = 1, 2, ..., N) \tag{25}$$

At this time, the vertex angle $\theta_s$ is called a steering angle.

The azimuth spectrum detection unit 31 can measure the APS by changing the steering angle $\theta_s$ within a scan range $[\theta_{min}, \theta_{max}]$ ($-90°<\theta_{min}<\theta_{max}<90°$) by the weight setting unit 30 and detecting the reception strength $|y(t)|^2$ for each steering angle $\theta_s$ by the received signal strength detection unit 21. Actually, to the received signal $x_i(t)$, noise (internal noise in the antenna element and external noise outside the antenna element) is added, and therefore, when measuring the APS, the azimuth spectrum detection unit 31 performs a statistical process for a large number of sample values of the reception strength to calculate the APS. As the method, various methods, such as the beamformer method, the Capon method, the linear prediction method, and the MUSIC (MUltiple SIgnal Classification) method, are currently known, and the APS can be measured by using these methods (see, for example, NPL 1). For example, in a case where the APS is measured by using the Capon method, the azimuth spectrum detection unit 31 calculates the APS $P_{CP}(\theta)$ by performing statistical calculation as follows.

[Math. 26]

$$P_{CP}(\theta) = \frac{1}{a^H(\theta)R_{xx}^{-1}a(\theta)} \tag{26a}$$

$$x(t) = [x_1(t), x_2(t), ..., x_N(t)]^T = s(i)a(\theta) \tag{26b}$$

$$a(\theta) = \left[g_1(\theta)\exp\left(-j\frac{2\pi}{\lambda}d_1\sin\theta\right), \right. \tag{26c}$$
$$\left. g_2(\theta)\exp\left(-j\frac{2\pi}{\lambda}d_2\sin\theta\right), ..., g_N(\theta)\exp\left(-j\frac{2\pi}{\lambda}d_N\sin\theta\right)\right]^T$$

$$R_{xx} = E[x(t)x^H(t)] \tag{26d}$$

Here, $E[\ldots]$ expresses an expected value (ensemble average), $(\ )^T$ expresses transposition, and $(\ )^H$ expresses a Hermitian conjugate. The vector $x(t)$ is called an input vector, the vector $a(\theta)$ is called an array response vector, and the matrix $R_{xx}$ is called an input correlation matrix. In a case where the APS is measured by using the beamformer method, the azimuth spectrum detection unit 31 calculates the APS $P_{BF}(\theta)$ by performing statistical calculation as follows.

[Math. 27]

$$P_{BF}(\theta) = \frac{a^H(\theta)R_{xx}^{-1}a(\theta)}{a^H(\theta)a(\theta)} \tag{27}$$

In a case where the APS is measured by using the linear prediction method, the azimuth spectrum detection unit 31 calculates the APS $P_{LP}(\theta)$ by performing statistical calculation as follows.

[Math. 28]

$$P_{LP}(\theta) = \frac{1}{|w_{LP}^H a(\theta)|^2} \tag{28a}$$

$$w_{LP} = R_{xx}^{-1} t \tag{28b}$$

$$t = [1, 0, ..., 0]^T \tag{28c}$$

The vector $w_{LP}$ is called an optimum weight vector.

In a case where the APS is measured by using the MUSIC method, the azimuth spectrum detection unit 31 calculates the APS $P_{MU}(\theta)$ by performing statistical calculation as follows.

[Math. 29]

$$P_{MU}(\theta) = \frac{a^H(\theta)a(\theta)}{a^H(\theta)E_N E_N^H a(\theta)} \tag{29a}$$

$$E_N = [e_{L+1}, ..., e_N] \tag{29b}$$

$$A^H e_i = 0 (i = L+1, ..., N) \tag{29c}$$

$$A = [a(\theta_1), a(\theta_2), ..., a(\theta_L)] \tag{29d}$$

Here, $\theta_i$ denotes the angle of incidence of each incoming wave, L denotes the number of incoming waves, the vector $e_i$ denotes the eigenvector of an input correlation matrix $A_{xx}$, and N denotes the number of eigenvalues or eigenvectors of the input correlation matrix $A_{xx}$ (the number of antenna elements). The matrix A is called a direction matrix. As the method for calculating the APS by the azimuth spectrum detection unit 31, various publicly known methods other than the above can be used.

The water level estimation unit 32 detects and estimates flooding of the ground caused by rain and the water level of flooding on the basis of the APS thus obtained. For example, as illustrated in FIG. 33, the direct wave from the RF sensor 2 at the transmission point A that passes through the optical path AB and reaches the array antenna 11a at the reception point B and the reflected wave from the RF sensor 2 at the transmission point A that passes through the optical path ACB and reaches the array antenna 11a at the reception point B are considered. The angle made by the optical path AB with the horizontal axis (x axis) is denoted by $\theta_0$ and the angle made by the optical path CB with the horizontal axis (x axis) is denoted by $\theta_1$. For example, a case of $\theta_0=10°$, $\theta_1=20°$, and the number of antenna elements of the array antenna 11a being 21 is considered. FIG. 42 illustrates example APSs of radio waves obtained by the array antenna 11a under the above-described conditions. In a case where the ground is not flooded and the reflected wave passing through the optical path ACB and reaching the reception point B can be ignored, the APS as illustrated in FIG. 42(a) is obtained. In this case, one main lobe $Lobe_0$ is generated at a position corresponding to the antenna angle of incidence θ that is equal to $θ_0=10°$, and a large number of side lobes having an extremely low level (−10 dB or lower) are generated around the main lobe $Lobe_0$. On the other hand, in a case where the ground is flooded and the reflected wave passing through the optical path ACB and reaching the reception point B is produced, the APS as illustrated in FIG. 42(b) is obtained. In this case, in addition to the main lobe $Lobe_0$ at the position corresponding to the antenna angle of incidence θ that is equal to $θ_0=10°$, a second lobe $Lobe_1$ generated by the reflected wave appears at a position corresponding to the antenna angle of incidence θ that is equal to $θ_1=20°$. The strength of the second lobe $Lobe_1$ is much higher than those of the other side lobes, and therefore, the second lobe $Lobe_1$ can be easily distinguished from the other side lobes. The water level estimation unit 32 can detect the flooded ground by detecting generation of the second lobe $Lobe_1$. Further, the water level estimation unit 32 can detect the water level d as follows by detecting the position ($θ=θ_0$) of the peak of the main lobe $Lobe_0$ and the position ($θ=θ_1$) of the peak of the second lobe $Lobe_1$.

[Math. 30]
$$d = \frac{1}{2} l_0 \cos θ_0 (\tan θ_1 - \tan θ_0) \tag{30}$$

Here, $l_0$ denotes the distance from the transmission point A to the reception point B as illustrated in FIG. 33, and as the distance, a distance measured in advance and set in advance in the water level estimation unit 32 is used.

In a case where the flooded ground caused by rain is detected by the water level estimation unit 32, the water level signal transmission unit 33 transmits the water level d detected by the water level estimation unit 32 to a high-level server or a high-level network, such as the Internet, via the high-level communication I/F module 14. In a case where the water level d detected by the water level estimation unit 32 satisfies a specific condition set in advance (here, the water level d is defined as the distance from the water surface to the RF sensor 2 (see FIG. 33), and therefore, for example, in a case where the water level d is less than or equal to a specific threshold $d_{min}$ set in advance), the flood caution determination unit 28 outputs a flood caution signal.

As described above, in the inundation detection system of this embodiment, the inundation detection device 1 includes the array antenna 11a, which functions as the sensor communication antenna, the phase shifters 11b, the adder 11c, the weight setting unit 30, the azimuth spectrum detection unit 31, and the water level estimation unit 32 and detects the APS of a radio wave received by scanning over the steering angle by using the array antenna 11a. On the basis of whether the second lobe $Lobe_1$ is present in the detected APS, the occurrence of the flooded ground or the wet state of the ground due to rain can be detected. The angles of incidence $θ_0$ and $θ_1$ of the main lobe $Lobe_0$ and the second lobe $Lobe_1$ are detected, and on the basis of the two angles of incidence $θ_0$ and $θ_1$, the water level of the flooded ground can be detected.

Embodiment 4

Figure 43:
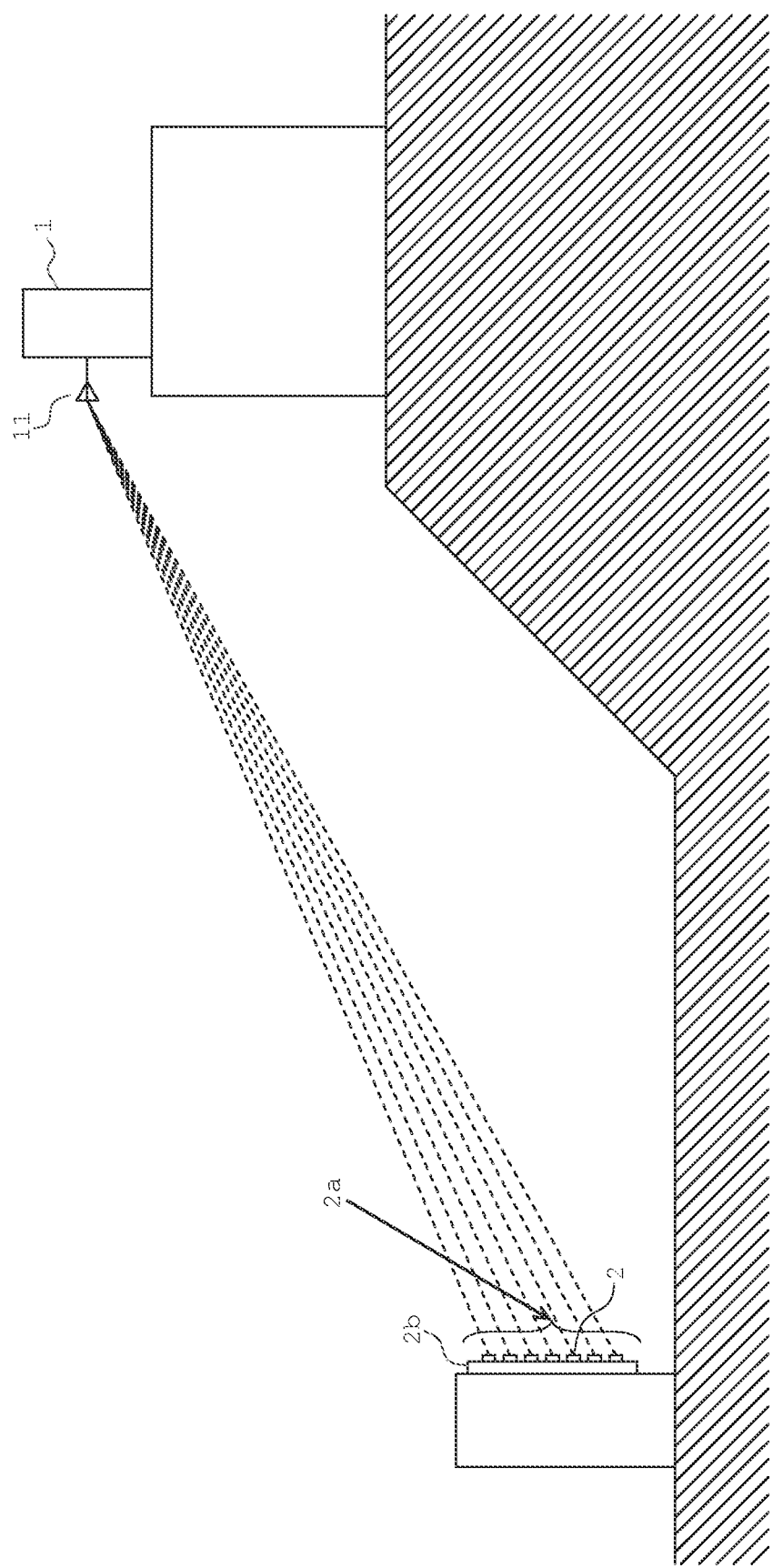
FIG. 43 is a diagram illustrating an example overall arrangement of an inundation detection system according to embodiment 4 of the present invention.

FIG. 43 is a diagram illustrating an example overall arrangement of an inundation detection system according to embodiment 4 of the present invention. Although the basic arrangement is similar to that of embodiment 1, this embodiment is different from embodiment 1 in that the inundation detection system includes an array RF sensor 2a as the RF sensors 2. The array RF sensor 2a is a sensor in which a plurality of RF sensors 2 are arranged in an array in the vertical direction. Although FIG. 43 illustrates the array RF sensor 2a that is formed by disposing the plurality of RF sensors 2 in a straight line on one board 2b to form an integrated assembly, the board 2b may be omitted from the array RF sensor 2a, or an array RF sensor formed by arranging the plurality of RF sensors 2 on the surface of a structure above the ground, such as a pole, to which the RF sensors 2 are fixed in a vertical straight line and by fixing the plurality of RF sensors 2 to the surface may be used. Although the number of RF sensors 2 that form the array RF sensor 2a may be any number as long as the number is two or more, it is preferable that the number be a sufficient number with which the shape profile of RSS oscillation relative to changes in the water level can be detected. Although the length of the arrangement of the RF sensors 2 in the RF sensor 2a may be any length, it is preferable that the length be longer than one-half of the cycle Λ, defined by expression (21), of RSS oscillation relative to changes in the water level, from the viewpoint of detecting the shape profile of RSS oscillation relative to changes in the water level with high accuracy. Further, it is more preferable that the length be longer than the cycle Λ of RSS oscillation.

Figure 44:
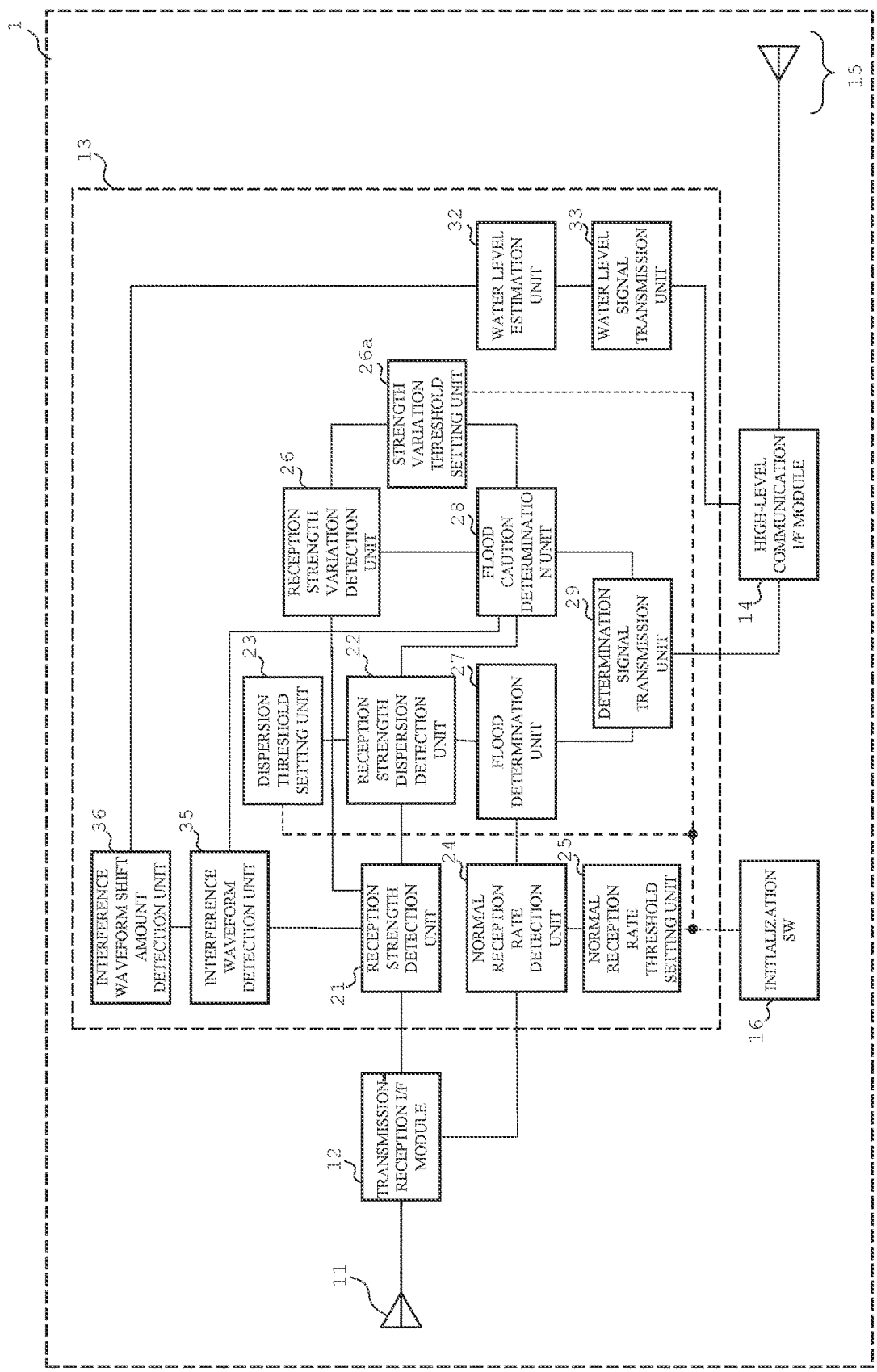
FIG. 44 is a block diagram illustrating a configuration of the inundation detection device 1 illustrated in FIG. 43.

FIG. 44 is a block diagram illustrating a configuration of the inundation detection device 1 illustrated in FIG. 43. In FIG. 44, constituent units the same as those in FIG. 2 of embodiment 1 are assigned the same reference numerals. The inundation detection device 1 of this embodiment is different from that in embodiment 1 in that the inundation detection device 1 of this embodiment includes an interference waveform detection unit 35, an interference waveform shift amount detection unit 36, the water level estimation unit 32, and the water level signal transmission unit 33. The interference waveform detection unit 35 is a module that performs a process for detecting a strength variation waveform caused by interference between a direct wave and a reflected wave from a received signal of a radio wave transmitted from each RF sensor 2 of the array RF sensor 2a. The interference waveform shift amount detection unit 36 is a module that performs a process for detecting the shift amount of the strength variation waveform detected by the interference waveform detection unit 35. The water level estimation unit 32 is a module that performs a process for calculating the estimated value of the water level of flooding from the shift amount of the strength variation waveform detected by the interference waveform shift amount detection unit 36. The water level signal transmission unit 33 is a module that performs communication for transmitting the water level of flooding calculated by the water level estimation unit 32 to a high-level server or a high-level network, such as the Internet, via the high-level communication I/F module 14.

An operation of the inundation detection system thus configured according to this embodiment is described below. Here, a description of a part similar to that in embodiment 1 is omitted, and a process concerning detection of flooding by using the newly added array RF sensor 2a and estimation of the water level of flooding is described. For convenience of description, the RF sensors 2 of the array RF sensor 2a are assigned reference numerals $S_1, S_2, \ldots, S_N$ from the lowest one, and the height of the RF sensor $S_i$ (i=1, ..., N) from the ground is denoted by $h_i$. It is assumed that data of the height $h_i$ of the RF sensor $S_i$ (i=1, ..., N) is measured in advance and stored in the interference waveform detection unit 35 of the inundation detection device 1.

First, the inundation detection device 1 receives radio waves transmitted from the RF sensors $S_i$ (i=1, ..., N) of the array RF sensor 2a. Here, the RF sensors $S_i$ of the array RF sensor 2a do not simultaneously transmit radio waves but transmit radio waves at different timings within a specific time band $\Delta T$ to suppress interference between the transmitted waves from the RF sensors $S_i$. The length of the time band $\Delta T$ can be set to any length as long as the water level does not change to a large degree within the period of the time band $\Delta T$. From the viewpoint that the flooding state around the sensors does not change within the time band $\Delta T$, it is preferable that the time band $\Delta T$ be shorter to the extent possible as long as transmitted waves from the RF sensors $S_i$ do not interfere with each other. Specifically, $\Delta T$ can be set to several seconds to several tens of seconds. When the inundation detection device 1 receives a radio wave from each RF sensor $S_i$ of the array RF sensor 2a within the time band $\Delta T$, the received signal strength detection unit 21 detects the received signal power $P_i$. The interference waveform detection unit 35 detects whether an interference waveform caused by a direct wave and a reflected wave appears on the basis of the height $h_i$ of each RF sensor $S_i$ and the received signal power $P_i$. The method for detection is described below.

Figure 45:
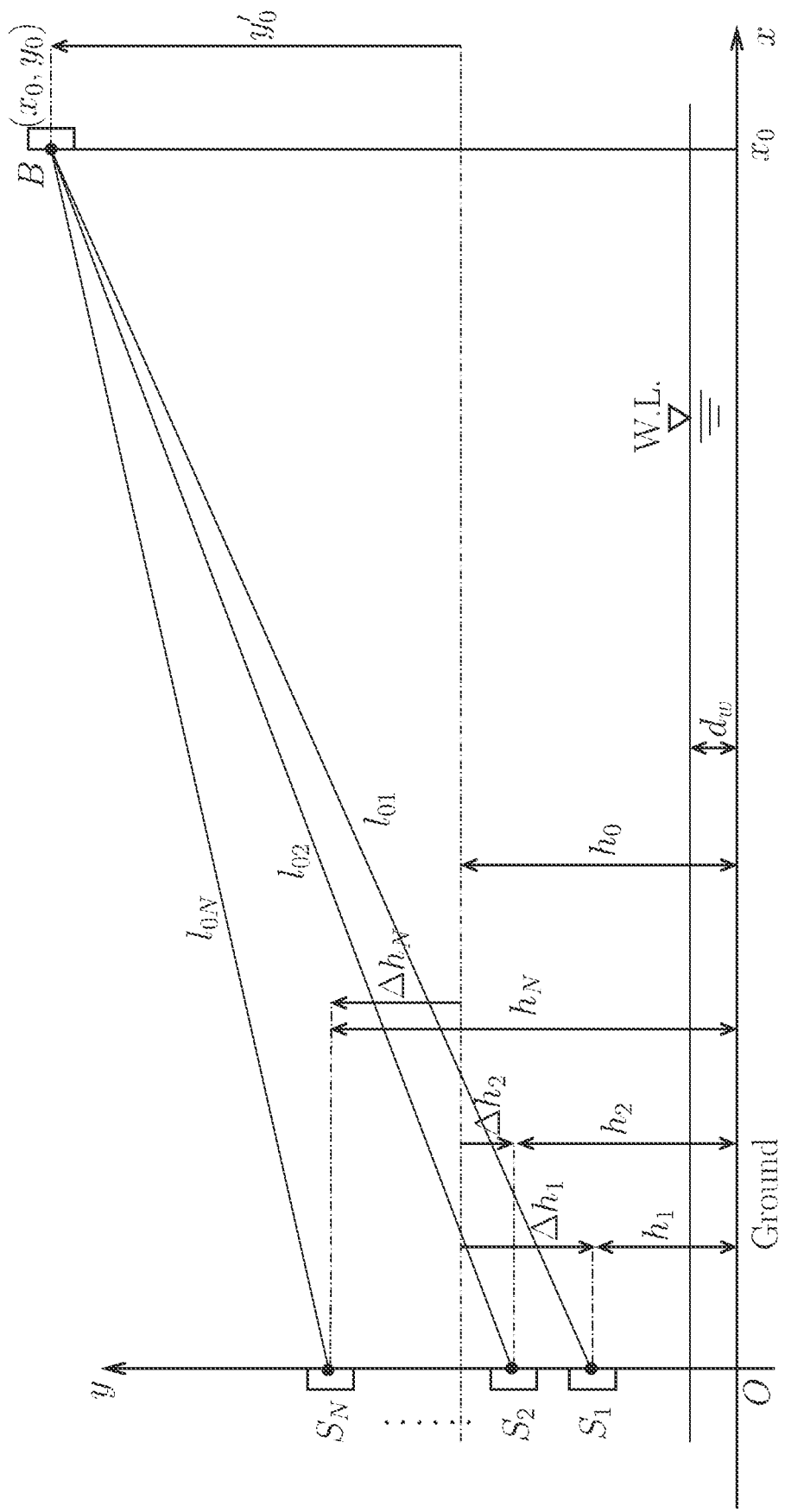
FIG. 45 is a diagram illustrating a positional relationship between each RF sensor $S_i$ of an array RF sensor 2a and the sensor communication antenna 11.

FIG. 45 is a diagram illustrating a positional relationship between each RF sensor $S_i$ of the array RF sensor 2a and the sensor communication antenna 11. In FIG. 45, each RF sensor is disposed at the point $S_i$ (i=1, ..., N) and the sensor communication antenna 11 is disposed at the point B away from each RF sensor by a horizontal distance of $x_0$ and higher than the points $S_i$ (i=1, ..., N). A vertical plane that includes the points $S_i$ (i=1, ..., N) and the point B is called a reflection plane. A y axis that passes through the points $S_i$ (i=1, ..., N) and extends upward is set, a point at which the y axis crosses the ground is set as an origin O, and a horizontal axis that passes through the origin O and is within the reflection plane is set as an x axis. The coordinates of the point B are denoted by $(x_0, y_0)$, and the coordinates of each point $S_i$ (i=1, ..., N) are denoted by $(0, h_i)$, where $h_i$ is the height of the RF sensor $S_i$. The average of the heights $h_i$ (i=1, ..., N) is denoted by $h_0$. The deviation $\Delta h_i$ of the height of the RF sensor $S_i$ is defined as $\Delta h_i = h_i - h_0$. The distance from each point $S_i$ (i=1, ..., N) to the point B is denoted by $l_{0i}$, and the average of the distances $l_{0i}$ (i=1, ..., N) is denoted by $l_0$. In a case where the ground around the array RF sensor 2a is flooded and the water depth (water level of flooding) is $d_W$, the received signal strength $s_i$ of a radio wave transmitted from the RF sensor $S_i$ and received by the sensor communication antenna 11 is expressed as follows from expression (20a).

[Math. 31]

$$s_i \simeq s_{0i}\left(\frac{1}{l_0}\right)\left[1 - \eta_i \cos\left(2\pi \frac{d_i}{\Lambda_i}\right)\right] \quad (31a)$$

$$d_i = h_i - d_w, \quad \Lambda_i = \frac{c}{2f}\frac{x_0}{y_0 - h_i} \quad (31b)$$

When the level difference between the average height $h_0$ of the RF sensors $S_i$ and the reception antenna B is expressed by $y_0' = y_0 - h_0$, the cycle $\Lambda_i$ of RSS oscillation relative to changes in the water level can be approximated as follows in a case of $\Delta h_i \ll h_0'$.

[Math. 32]

$$\Lambda_i = \Lambda_0\left(1 + \frac{\Delta h_i}{y_0'} - \left(\frac{\Delta h_i}{y_0'}\right)^2 + \ldots\right) \simeq \Lambda_0 (\Delta h_i \ll y_0') \quad (32a)$$

$$\Lambda_0 = \frac{c}{2f}\frac{x_0}{y_0'} \quad (32b)$$

Therefore, the received signal strength $s_i$ and the received signal power $P_i$ are expressed as follows.

[Math. 33]

$$s_i \simeq s_{0i}\left[1 - \eta_i \cos\left(2\pi \frac{d_i}{\Lambda_0}\right)\right] \quad (33a)$$

$$P_i \sim |s_i|^2 \simeq |s_{0i}|^2 \left[1 - \eta_i \cos\left(2\pi \frac{d_i}{\Lambda_0}\right)\right]^2 \quad (33b)$$

$$\quad (33c)$$

Figure 46:
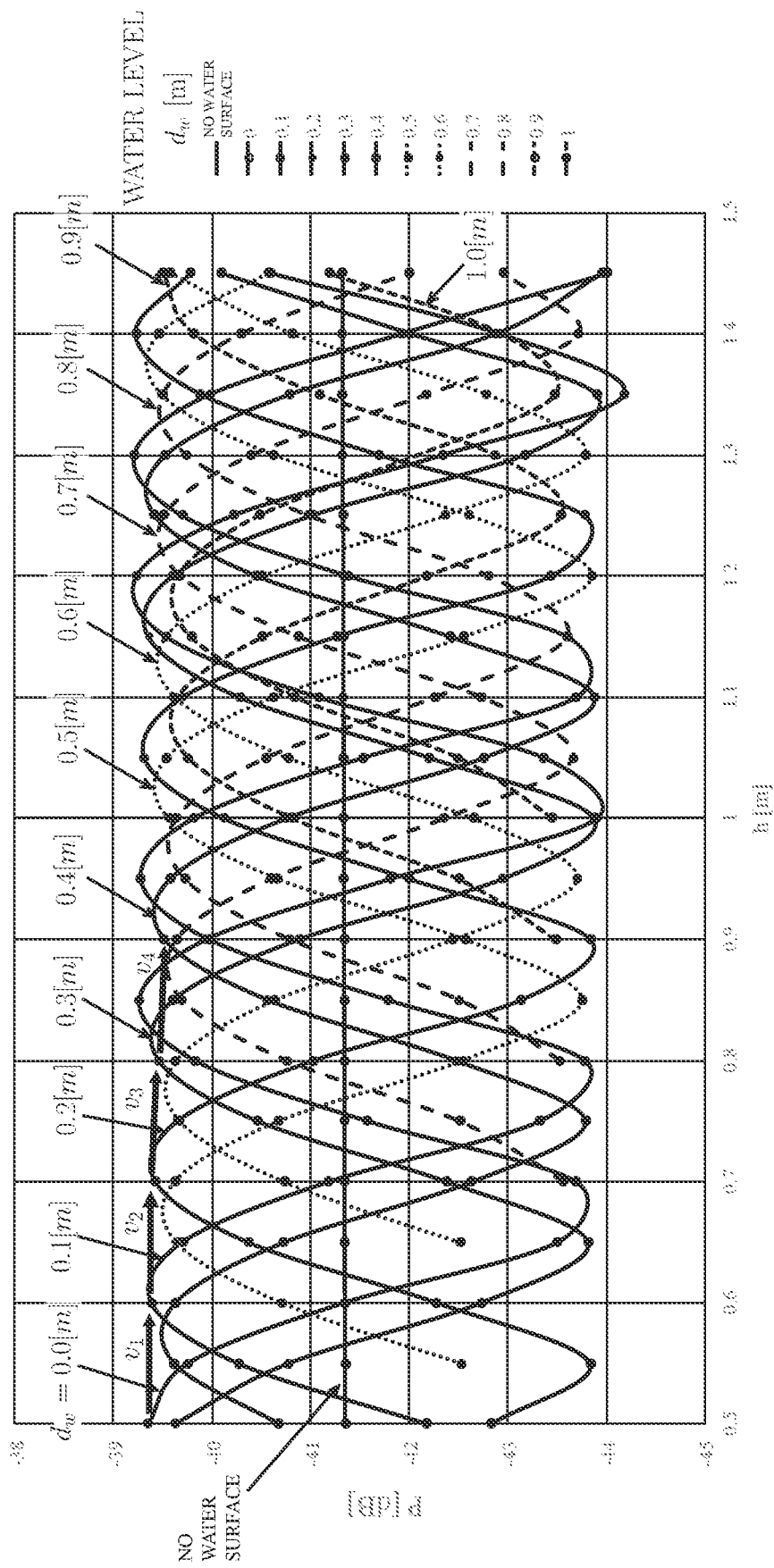
FIG. 46 is a diagram illustrating an example relationship between each water level $d_w$ and the received signal power from an RF sensor installed at each height.

FIG. 46 illustrates an example relationship between each water level $d_W$ and the received signal power from the RF sensor installed at each height. In FIG. 46, the horizontal axis h represents the height [m] of each RF sensor, and the vertical axis represents the received signal power P [dB]. In the array RF sensor 2a, the RF sensors $S_i$ are installed at the plurality of heights $h_i$, and signals from the RF sensors $S_i$ are received within one time band $\Delta T$. In the non-submerge flooding period in which the ground around the array RF sensor 2a is flooded, a line that connects the power of the signals received in the one time band $\Delta T$ is a curve that cyclically oscillates as illustrated in FIG. 46. In the non-flooding period in which the ground is not flooded and no water surface (reflection surface) is present around the array RF sensor 2a, the line is a straight line indicated as "no water surface" in FIG. 46. Therefore, in a case where signals from the RF sensors $S_i$ form a curve that varies in each time band $\Delta T$ as illustrated in FIG. 46, the interference waveform detection unit 35 determines that the ground around the array RF sensor 2a is flooded. In a case where signals from the RF sensors $S_i$ form a straight line indicated as "no water surface" as illustrated in FIG. 46, the interference waveform detection unit 35 can determine that the ground around the array RF sensor 2a is not flooded. Also in a case where the ground becomes wet with rain and the reflection coefficient of the ground increases to a large degree, a variation curve as illustrated in FIG. 46 is observed. In this case, the variation curve is a curve indicated as $d_W = 0$ [m] in FIG. 46. As the wetness of the ground increases, the reflection coefficient of the ground increases, and the oscillation amplitude of the curve increases accordingly. Therefore, the degree of wetness of the ground around the array RF sensor 2a can also be detected, and the presence or absence of rain can also be detected.

When the ground around the array RF sensor 2a is completely flooded, and the water level of flooding $d_W$ rises, the oscillation waveform of the received signal power corresponding to the height h successively shifts in the right direction (in a direction in which h increases) as indicated by the arrows $v_1$, $v_2$, $v_3$, and $v_4$ in FIG. 46. In contrast, as the water level of flooding $d_W$ falls, the oscillation waveform successively shifts in the left direction (in a direction in which h decreases). Therefore, the interference waveform shift amount detection unit 36 can detect changes in the water level of flooding $d_W$ by successively detecting the shift amount of the oscillation waveform from the time point when the interference waveform detection unit 35 determines that the ground around the array RF sensor 2a is flooded. In this case, the shift amount (the shift amount in the direction in which h increases) of the oscillation waveform from the oscillation waveform corresponding to $d_W=0$ [m] directly represents the water level of flooding $d_W$.

When the shift amount of the oscillation waveform is thus detected by the interference waveform detection unit 35, the water level estimation unit 32 converts the shift amount to the water level of flooding $d_W$, and the water level signal transmission unit 33 transmits the water level d detected by the water level estimation unit 32 to a high-level server or a high-level network, such as the Internet, via the high-level communication I/F module 14. The flood caution determination unit 28 outputs a flood caution signal also in a case where the water level of flooding $d_W$ detected by the water level estimation unit 32 exceeds a specific threshold set in advance.

As described above, the inundation detection system of this embodiment includes the array RF sensor 2a in which the plurality of RF sensors 2 are arranged in an array in the vertical direction. When, for each specific time band ΔT, the inundation detection system detects, from the reception strength of a radio wave transmitted from each RF sensor 2 of the array RF sensor 2a and received by the sensor communication antenna 11, the presence or absence of an oscillation waveform of the received signal power corresponding to the height h of each RF sensor 2, the inundation detection system can detect whether the ground around the array RF sensor 2a is flooded or the ground becomes wet. When the inundation detection system successively detects the shift amount of the oscillation waveform of the received signal power corresponding to the height h of each RF sensor 2 from the oscillation waveform corresponding to the depth of flooding $d_W=0$ [m], the inundation detection system can detect the water level of flooding $d_W$ of the ground around the array RF sensor 2a.

Figure 47:
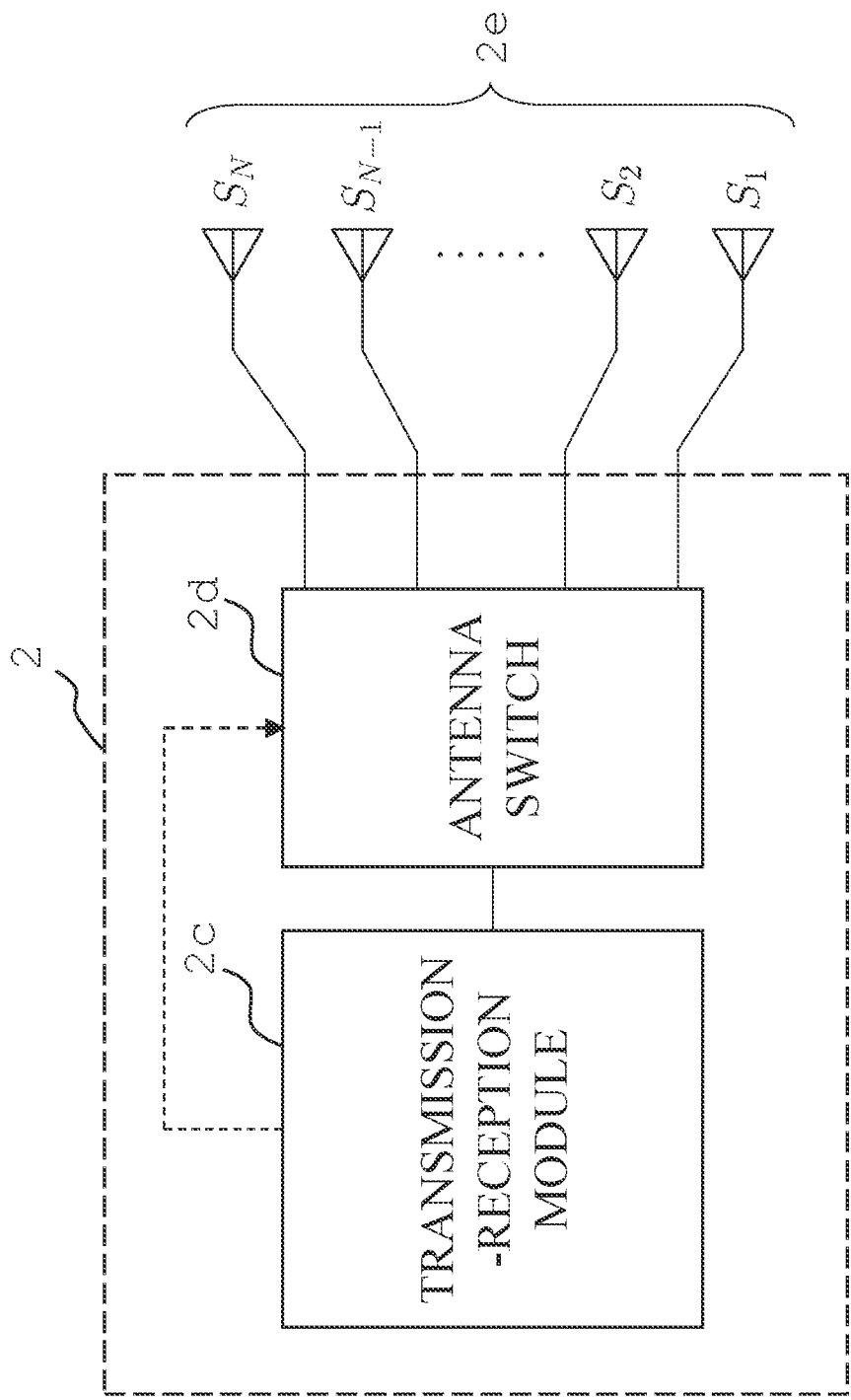

Although FIG. 43 illustrates an example configuration where the plurality of RF sensors 2 are arranged as the array RF sensor 2a, as the configuration of the array RF sensor 2a, a configuration can be employed in which a plurality of antenna elements 2e are connected to one RF sensor 2 and the antenna elements 2e are arranged in an array. FIG. 47 illustrates an example of the array RF sensor 2a in which the antenna elements 2e arranged in an array are connected to one RF sensor 2. The RF sensor 2 includes a transmission-reception module 2c that includes a circuit for transmitting a radio signal to the inundation detection device 1 and an antenna switch 2d that performs switching by selecting one from among the antenna elements 2e to be used in transmission of the radio signal. The antenna switch 2d is connected to each of the N antenna elements 2e and performs switching of the antenna element 2e to be connected to the transmission-reception module 2c. Each of the antenna elements 2e corresponds to the transmission point $S_i$ (i=1, . . . , N) in FIG. 45. The transmission-reception module 2c transmits a radio signal while the antenna element 2e via which the radio signal is transmitted is cyclically switched by the antenna switch 2d to thereby transmit the radio signal from each transmission point $S_i$ (i=1, . . . , N) to the inundation detection device 1. With this configuration, radio signals can be transmitted by the transmission-reception module 2c via the antenna elements 2e at different timings within each time band ΔT with certainty.

REFERENCE SIGNS LIST 1 inundation detection device
2 RF sensor
2a array RF sensor
2b board
2c transmission-reception module
2d antenna switch
2e antenna element
11 sensor communication antenna
11a array antenna
11b phase shifter
11c adder
12 transmission-reception I/F module
13 computer
14 high-level communication I/F module
15 high-level communication antenna
16 initialization switch
21 received signal strength detection unit
22 reception strength dispersion detection unit
23 variance threshold setting unit
24 normal reception rate detection unit
25 normal reception rate threshold setting unit
26 received signal strength variation detection unit
26a strength variation threshold setting unit
27 flood determination unit
28 flood caution determination unit
29 determination signal transmission unit
30 weight setting unit
31 azimuth spectrum detection unit
32 water level estimation unit
33 water level signal transmission unit
35 interference waveform detection unit
36 interference waveform shift amount detection unit

The invention claimed is:

1. An inundation detection device comprising:
a reception antenna that receives, from an RF sensor installed at a location where flood detection is performed and transmitting a radio signal intermittently by radio, the transmitted radio signal and outputs the radio signal as a received signal;
received signal strength detection means for detecting, at each time t, a received signal strength I(t) that is a strength of the received signal output from the reception antenna;
received signal strength dispersion detection means for detecting, at each time t, a dispersion $D(I;[t-\Delta t_1, t])$, within a specific time $\Delta t_1$, of the received signal strength I(t) detected by the received signal strength detection means;
normal reception rate detection means for detecting, at each time t, a normal reception rate $R[(t-\Delta t_2, t])$ that is a rate of normal reception of the received signal within a specific time $\Delta t_2$; and
flood detection determination means for outputting a flood detection signal in a case where the dispersion $D(I;[t-\Delta t_1, t])$ output by the received signal strength dispersion detection means is greater than or equal to a specific threshold $D_{th1}$ and the normal reception rate $R[(t-\Delta t_2, t])$ output by the normal reception rate detection means is less than or equal to a specific threshold $R_{th1}$.

2. An inundation detection system comprising:
- an RF sensor that is installed at a location where flood detection is performed and transmits a radio signal intermittently by radio; and
- the inundation detection device according to claim 1, the inundation detection device being installed apart from the RF sensor at a height higher than the RE sensor.

3. The inundation detection system according to claim 2, wherein the reception antenna is installed in an orientation in which a received signal strength of an electric field component in a horizontal direction is maximized.

4. The inundation detection device according to claim 1, comprising flood caution determination means for outputting a flood caution signal in a case where the dispersion $D(I;[t-\Delta t_1, t])$ output by the received signal strength dispersion detection means is greater than or equal to a specific threshold $D_{th2}$.

5. An inundation detection system comprising:
- an RF sensor that is installed at a location where flood detection is performed and transmits a radio signal intermittently by radio; and
- the inundation detection device according to claim 4, the inundation detection device being installed apart from the RF sensor at a height higher than the RF sensor.

6. The inundation detection system according to claim 5, wherein the reception antenna is installed in an orientation in which a received signal strength of an electric field component in a horizontal direction is maximized.

7. The inundation detection device according to claim 1, comprising:
- received signal strength variation detection means for detecting, at each time t, a received signal strength variability $|DI(t)|$ that is an absolute value of a temporal change value $DI(t)=I(t)-I(t-\delta t)$ or $I(t)/I(t-\delta t)$ of the received signal strength $I(t)$; and
- flood caution determination means for outputting a flood caution signal in a case where the number of times $N_{DI}$ the received signal strength variability $|DI(t)|$ exceeds a specific threshold $DI_{th}$ within a specific time $\Delta t_3$ exceeds a specific threshold $N_{DIth}$.

8. An inundation detection system comprising:
- an RF sensor that is installed at a location where flood detection is performed and transmits a radio signal intermittently by radio; and
- the inundation detection device according to claim 7, the inundation detection device being installed apart from the RF sensor at a height higher than the RF sensor.

9. The inundation detection system according to claim 8, wherein the reception antenna is installed in an orientation in which a received signal strength of an electric field component in a horizontal direction is maximized.

10. An inundation detection method for detecting whether a flood detection location is flooded, the inundation detection method comprising:
- receiving a radio signal transmitted from an RF sensor installed at the flood detection location, by a reception antenna installed at a height higher than the RE sensor;
- generating a received signal that is an electric signal from the radio signal;
- detecting, at each time t, a received signal strength $I(t)$ that is a strength of the received signal, a dispersion $D(I;[t-\Delta t_1, t])$, within a specific time $\Delta t_1$, of the received signal strength $I(t)$, and a normal reception rate $R[(t-\Delta t_2, t])$ that is a rate of normal reception of the received signal within a specific time $\Delta t_2$; and
- determining that flooding is detected in a case where the dispersion $D(I;[t-\Delta t_1, t])$ is greater than or equal to a specific threshold $D_{th1}$ and the normal reception rate $R[(t-\Delta t_2, t])$ is less than or equal to a specific threshold $R_{th1}$.

11. The inundation detection method according to claim 10, comprising determining that the flooding reaches a flood caution level in a case where the dispersion $D(I;[t-\Delta t_1, t])$ is greater than or equal to a specific threshold $D_{th2}$.

12. The inundation detection method according to claim 10, comprising:
- detecting, at each time t, a received signal strength variability $|DI(t)|$ that is an absolute value of a temporal change value $DI(t)=I(t)-(t-\delta t)$ or $I(t)/I(t-\delta t)$ of the received signal strength $I(t)$; and
- determining that the flooding reaches a flood caution level in a case where the number of times $N_{DI}$ the received signal strength variability $|DI(t)|$ exceeds a specific threshold $DI_{th}$ within a specific time $\Delta t_3$ exceeds a specific threshold $N_{DIth}$.

* * * * *